(12) United States Patent
Iwazumi et al.

(10) Patent No.: US 8,304,507 B2
(45) Date of Patent: Nov. 6, 2012

(54) POLYMERIZABLE COMPOSITION FOR POLYTHIOURETHANE OPTICAL MATERIAL, POLYTHIOURETHANE OPTICAL MATERIAL OBTAINED FROM THE POLYMERIZABLE COMPOSITION, AND POLYMERIZATION CATALYST FOR POLYTHIOURETHANE OPTICAL MATERIAL

(75) Inventors: Masanori Iwazumi, Irvine, CA (US); Mamoru Tanaka, Fukuoka (JP)

(73) Assignee: Mitsui Chemicals, Inc., Minato-Ku, Tokyo (JP)

( * ) Notice: Subject to any disclaimer, the term of this patent is extended or adjusted under 35 U.S.C. 154(b) by 0 days.

(21) Appl. No.: 13/001,648

(22) PCT Filed: Jun. 24, 2009

(86) PCT No.: PCT/JP2009/002892
§ 371 (c)(1),
(2), (4) Date: Dec. 28, 2010

(87) PCT Pub. No.: WO2010/001550
PCT Pub. Date: Jan. 7, 2010

(65) Prior Publication Data
US 2011/0112269 A1    May 12, 2011

(30) Foreign Application Priority Data

Jun. 30, 2008  (JP) .................................. 2008-171289
Jun. 30, 2008  (JP) .................................. 2008-171294

(51) Int. Cl.
*C08G 18/22*    (2006.01)
(52) U.S. Cl. ...................................................... 528/71
(58) Field of Classification Search ........................ None
See application file for complete search history.

(56) References Cited

U.S. PATENT DOCUMENTS

2010/0016517 A1*   1/2010  Iwazumi et al. ............. 525/452

FOREIGN PATENT DOCUMENTS

| EP | 1988109 A1 | * | 2/2007 |
|---|---|---|---|
| EP | 1988109 A1 | | 11/2008 |
| JP | 62-16484 A | | 1/1987 |
| JP | 63-77918 A | | 4/1988 |
| JP | 3-84021 A | | 4/1991 |
| JP | 9-77850 A | | 3/1997 |
| JP | 2000-256571 A | | 9/2000 |
| JP | 2005-105084 A | | 4/2005 |
| JP | 2008-074957 | * | 9/2006 |
| JP | 2008-074957 A | | 4/2008 |
| WO | WO 2007/097116 A1 | | 8/2007 |
| WO | WO 2007/105355 A1 | | 9/2007 |
| WO | WO2008/105138 A1 | * | 4/2008 |

OTHER PUBLICATIONS

International Search Report (PCT/ISA/210) issued on Oct. 13, 2009, by Japanese Patent Office as the International Searching Authority for International Application No. PCT/JP2009/002892.
Latest Polyurethane Applied Technology, p. 26-31, CMC, 1983, with English translation.

* cited by examiner

*Primary Examiner* — Randy Gulakowski
*Assistant Examiner* — Jeffrey Washville
(74) *Attorney, Agent, or Firm* — Buchanan Ingersoll & Rooney PC

(57) ABSTRACT

The polymerizable composition for a polythiourethane optical material of the present invention includes (A) a polymerization catalyst for a polythiourethane optical material, (B) at least one compound selected from an isocyanate compound and an isothiocyanate compound, and (C) a compound containing one or more mercapto groups, wherein said polymerization catalyst for a polythiourethane optical material (A) includes (a1) a zinc compound, (a2) a compound represented by the following general formula (1), and (a3) a sulfonic acid represented by the following general formula (2):

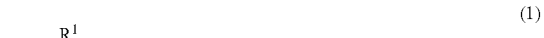

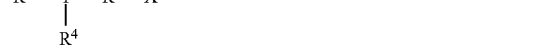

15 Claims, No Drawings

POLYMERIZABLE COMPOSITION FOR POLYTHIOURETHANE OPTICAL MATERIAL, POLYTHIOURETHANE OPTICAL MATERIAL OBTAINED FROM THE POLYMERIZABLE COMPOSITION, AND POLYMERIZATION CATALYST FOR POLYTHIOURETHANE OPTICAL MATERIAL

TECHNICAL FIELD

The present invention relates to a polymerizable composition for a polythiourethane optical material, a polythiourethane optical material obtained from the polymerizable composition, and a polymerization catalyst for a polythiourethane optical material.

BACKGROUND ART

In recent years, balance with the global environment and reduction of the impact on the environmental have become significant goals in the industrial fields. Thus, development of products or technologies in consideration of the environment has accelerated. Such a movement is also shown in the technical field of the present invention, and particularly, an organic tin catalyst which has been widely used as a catalyst for a polythiourethane resin has been a problem in that it is harmful in human bodies due to the severity of its toxicity, environmental hormones and the like. In this regard, regulation of the use of organic tin compounds has been strengthened with advanced countries taking the lead. In the industrial field of spectacle lenses in which a polythiourethane resin is used, there has been a demand for development of a catalyst which replaces the organic tin catalyst. As a tin-free non-metal catalyst to be used for providing a general thermocurable resin, amine compounds, amine carboxylates, phosphine, and the like are known (Patent Documents 1, 2, 3, 4, and 5). Further, for use in combination with carboxylic acid metal compounds, quaternary ammonium salt compounds are known (Patent Document 6).

Furthermore, in order to prepare a polythiourethane resin as a material for a plastic lens, a cast-polymerization method is adopted in which a polymerizable composition is generally injected into a mold, and then cured by heating. In this method, a polymerization reaction is carried out while the temperature is gradually increased from a low temperature to a high temperature over several hours to several tens of hours. At that time, in order to obtain an optically homogeneous plastic lens, addition of a catalyst so as to slowly carry out a polythiourethanization reaction controlled by heat is required so that thermal inhomogeneity does not occur while raising the temperature. Furthermore, in order to sufficiently achieve resin properties including optical properties, heat resistance, and strength, it is necessary to complete the polymerization. In order to complete the polymerization, a catalyst with strong polymerization activity is used or a method for increasing the amount of a catalyst can be cited. However, such a method has a problem such that the polymerization reaction continues while the prepared polymerizable composition is injected into a mold, that is, a sufficient pot life cannot be secured. Further, there is also a problem such that during the polymerization, exothermic heat is locally generated so that it is easy for optical inhomogeneity to occur in the lenses. As a method to solve this problem, for example, a case has been reported in which the low-temperature activity is suppressed by using a Lewis acid in combination with a tertiary amine with strong activity (Patent Document 6).

Furthermore, in Patent Document 7, an internal mold release agent is described which is to be used in the preparation of a polythiourethane optical material, and which is obtained by mixing an acidic phosphoric acid ester compound and at least one kind of metal selected from the group consisting of Zn, Cu, Fe, Ga, Bi, Al, and Zr.

In Patent Document 8, dithiocarbamic acid metal salts and the like are described as non-tin catalysts for the preparation of a polythiourethane resin. In this document, it is described that such a catalyst has a catalytic activity equivalent to or higher than that of organic tin. In addition, in Patent Document 8, a catalyst is described which uses thiocarbamic acid metal salts in combination with ammonium salts. In this document, it is described that the catalytic activity of dithiocarbamic acid metal salts is improved by using it in combination with ammonium salts.

[Patent Document 1] Japanese Laid-Open Patent Publication No. 03-084021
[Patent Document 2] Japanese Laid-Open Patent Publication No. 63-077918
[Patent Document 3] Japanese Laid-Open Patent Publication No. 62-016484
[Patent Document 4] Japanese Laid-Open Patent Publication No. 09-077850
[Patent Document 5] Japanese Laid-Open Patent Publication No. 2000-256571
[Patent Document 6] Japanese Laid-Open Patent Publication No. 2005-105084
[Patent Document 7] Pamphlet of International Publication No. 2007/105355
[Patent Document 8] Pamphlet of International Publication No. 2007/97116
[Non-Patent Document 1] "Recent Application Technology of Polyurethane", published by CMC Publishing Co., Ltd., 1983, p. 27-31

DISCLOSURE OF THE INVENTION

However, the related arts described in the documents above have scope for improvement in the following terms.

In the case where the catalysts described in Patent Documents 1 to 6 are used as a catalyst for the synthesis of a polythiourethane resin, the catalytic activity in a low-temperature region is too high, which causes explosive polymerization, and as a result, sufficient heat resistance cannot be obtained with some resins to be cured. Also, in a molded product thus obtained, white turbidity may occur or polymerizability may be inhomogeneous to cause striation or the like to occur in some cases, which is problematic in terms of appearance. As a result, the catalyst was not sufficient as a catalyst for a transparent resin used for optical applications, such as plastic lens for spectacles, and the like.

In the case where a mixture of a dithiocarbamic acid metal salt or a dithiocarbamic acid metal salt and an ammonium salt described in Patent Document 8 is used as a catalyst for the preparation of a polythiourethane resin, curing by polymerization of the polymerizable composition in the molding in a low-temperature region is not sufficient and uncured states remains in some places in the molding in a high-temperature region. As a result, there have been some cases where a material, which is eluted from a mold due to an effect of components contained in the composition and the like, causes the molded product to have partial white turbidity in the molding in a high-temperature region. Moreover, there have been some cases where the molded product does not have sufficient hardness and deformation is observed in a molded product due to deficiency of the heat resistance of a mold in the molding in a high-temperature region.

The present invention will be presented below.

[1] A polymerizable composition for a polythiourethane optical material, including:

(A) a polymerization catalyst for a polythiourethane optical material, (B) at least one compound selected from an isocyanate compound and an isothiocyanate compound, and (C) a compound containing one or more mercapto groups, wherein the polymerization catalyst for a polythiourethane optical material (A) is (a1) one or two or more kinds of zinc compound selected from the group consisting of zinc dithiocarbamates, zinc sulfonates, zinc salts of mono- or di-alkyl phosphoric acid esters, bis(substituted acetylacetonato) zinc, and zinc halides, (a2) a compound represented by the following general formula (1), and (a3) a sulfonic acid represented by the following general formula (2):

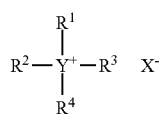

(1)

(wherein $R^1$, $R^2$, $R^3$, and $R^4$ each independently represent hydrogen, or linear-chained aliphatic residue, cyclic aliphatic residue, or aromatic organic residue which is monovalent or higher valent. $R^1$, $R^2$, $R^3$, and $R^4$ may be bonded to each other to form a ring. X represents a halogen atom. Y represents a nitrogen or phosphorous atom.)

(2)

(wherein n represents an integer of 1 or 2, and $R^5$ represents linear-chained aliphatic residue, branched aliphatic residue, cyclic aliphatic residue, or aromatic organic residue, which is monovalent or higher valent and which may contain a hydroxyl group or an amino group).

[2] The polymerizable composition for a polythiourethane optical material as set forth in [1], wherein the zinc dithiocarbamate is represented by the following general formula (3):

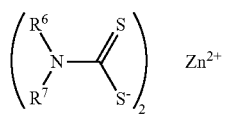

(3)

(wherein $R^6$ and $R^7$ represent an alkyl group having 1 to 10 carbon atoms, a phenylalkyl group having 7 to 10 carbon atoms, or an aryl group having 6 to 10 carbon atoms, and may be the same as or different from each other. Further, $R^6$ and $R^7$ may be bonded to each other to form a ring).

[3] The polymerizable composition for a polythiourethane optical material as set forth in [2], wherein $R^6$ and $R^7$ in the general formula (3) each independently represent an alkyl group having 1 to 8 carbon atoms.

[4] The polymerizable composition for a polythiourethane optical material as set forth in any one of [1] to [3], wherein the zinc dithiocarbamate is one or two or more kinds selected from the group consisting of zinc dimethyl dithiocarbamate, zinc diethyl dithiocarbamate, and zinc di-n-butyl dithiocarbamate.

[5] The polymerizable composition for a polythiourethane optical material as set forth in any one of [1] to [4], wherein in the general formula (1), Y is nitrogen, and $R^1$, $R^2$, $R^3$, and $R^4$ are each independently selected from the group consisting of an alkyl group having 1 to 18 carbon atoms, a hydroxyalkyl group having 1 to 18 carbon atoms, a phenyl group, a phenylalkyl group having 7 to 18 carbon atoms, and an aminoalkyl group having 1 to 18 carbon atoms.

[6] The polymerizable composition for a polythiourethane optical material as set forth in [5], wherein $R^1$, $R^2$, $R^3$, and $R^4$ in the general formula (1) are each independently selected from the group consisting of an alkyl group having 1 to 8 carbon atoms and a phenylalkyl group having 7 to 10 carbon atoms.

[7] The polymerizable composition for a polythiourethane optical material as set forth in [6], wherein the compound (a2) represented by the general formula (1) is one or two or more kinds selected from the group consisting of a tetramethylammonium salt, a tetraethylammonium salt, a tetrapropylammonium salt, a tetrabutylammonium salt, a trioctylmethylammonium salt, and a tributylbenzylammonium salt.

[8] The polymerizable composition for a polythiourethane optical material as set forth in [7], wherein the compound (a2) represented by the general formula (1) is one or two or more kinds selected from the group consisting of tetrabutylammonium chloride, tetrabutylammonium bromide, tetraethylammonium bromide, trioctylmethylammonium chloride, and tributylbenzylammonium chloride.

[9] The polymerizable composition for a polythiourethane optical material as set forth in any one of [1] to [8], wherein the sulfonic acid (a3) represented by the general formula (2) is alkylsulfonic acid having 1 to 16 carbon atoms, benzenesulfonic acid, toluenesulfonic acid, or dodecylbenzenesulfonic acid.

[10] The polymerizable composition for a polythiourethane optical material as set forth in [9], wherein the sulfonic acid (a3) represented by the general formula (2) is methanesulfonic acid, toluenesulfonic acid, or dodecylbenzenesulfonic acid.

[11] The polymerizable composition for a polythiourethane optical material as set forth in any one of [1] to [10], wherein the molar ratio of the compound (a2) represented by the general formula (1) to the zinc compound (a1) is 0.01 to 100, and the molar ratio of the compound (a3) represented by the general formula (2) to the compound (a2) represented by the general formula (1) is 0.01 to 100.

[12] A polymerizable composition for a polythiourethane optical material, including:

(A) a polymerization catalyst for a polythiourethane optical material, (B) at least one compound selected from an isocyanate compound and an isothiocyanate compound, and (C) a compound containing one or more mercapto groups, wherein the polymerization catalyst for a polythiourethane optical material (A) includes:

(a1) one or two or more kinds of zinc compound selected from the group consisting of zinc dithiocarbamates, zinc sulfonates, zinc salts of mono- or di-alkyl phosphoric acid esters, bis(substituted acetylacetonato) zinc, and zinc halides, and (a4) a compound represented by the following general formula (4):

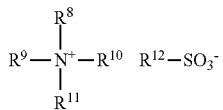
(4)

(wherein $R^8$, $R^9$, $R^{10}$, and $R^{11}$ each independently represent hydrogen, or linear-chained aliphatic residue, cyclic aliphatic residue, or aromatic organic residue which is a monovalent or higher valent. $R^8$, $R^9$, $R^{10}$, and $R^{11}$ may be bonded to each other to form a ring. $R^{12}$ represents a hydrogen atom, an alkyl group having 1 to 16 carbon atoms, or an aromatic hydrocarbon group which may have a substituent).

[13] The polymerizable composition for a polythiourethane optical material as set forth in [12], wherein the zinc compound (a1) is zinc chloride.

[14] The polymerizable composition for a polythiourethane optical material as set forth in [12] or [13], wherein in the general formula (4), $R^8$, $R^9$, $R^{10}$, and $R^{11}$ each independently represent an alkyl group having 1 to 8 carbon atoms or a benzyl group, and $R^{12}$ represents an alkyl group having 1 to 3 carbon atoms.

[15] The polymerizable composition for a polythiourethane optical material as set forth in [14], wherein the compound (a4) represented by the general formula (4) is one or two or more kinds selected from the group consisting of tetramethylammonium sulfonates, tetraethylammonium sulfonates, tetrapropylammonium sulfonates, tetrabutylammonium sulfonates, trioctylmethylammonium sulfonates, and tributylbenzylammonium sulfonates.

[16] The polymerizable composition for a polythiourethane optical material as set forth in [15], wherein the compound (a4) represented by the general formula (4) is tetrabutylammonium methane sulfonate.

[17] The polymerizable composition for a polythiourethane optical material as set forth in any one of [12] to [16], wherein the molar ratio of the compound (a4) represented by the general formula (4) to the zinc compound (a1) is 0.1 to 1000.

[18] The polymerizable composition for a polythiourethane optical material as set forth in any one of [1] to [17], wherein the compound (B) is an isocyanate compound.

[19] The polymerizable composition for a polythiourethane optical material as set forth in [18], wherein the isocyanate compound is m-xylylene diisocyanate, 2,5-bis(isocyanatomethyl)-bicyclo[2.2.1]heptane, 2,6-bis(isocyanatomethyl)-bicyclo[2.2.1]heptane, bis(isocyanatomethyl)cyclohexane or hexamethylene diisocyanate, and the compound (C) is 4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, pentaerythritol tetrakis(3-mercaptopropionate), 1,1,3,3-tetrakis(mercaptomethylthio)propane, 1,1,2,2-tetrakis(mercaptomethylthio)ethane, 4,6-bis(mercaptomethylthio)-1,3-dithiane, or 2-(2,2-bis(mercaptodimethylthio)ethyl)-1,3-dithietane.

[20] A polythiourethane optical material obtained by curing the polymerizable composition as set forth in any one of [1] to [19].

[21] A plastic lens comprising the polythiourethane optical material as set forth in [20].

[22] A method for preparing a polythiourethane optical material, including cast-polymerizing the polymerizable composition as set forth in any one of [1] to [19].

[23] The preparation method as set forth in [22], wherein cast-polymerizing the polymerizable composition includes cast-polymerizing a polymerizable composition for a polythiourethane optical material containing 0.0005 parts by weight to 5 parts by weight of the sum of the zinc compound (a1), the compound (a2), and the sulfonic acid (a3), based on 100 parts by weight of the total amount of the compound (B) and the compound (C).

[24] The preparation method as set forth in [22], wherein cast-polymerizing the polymerizable composition includes cast-polymerizing a polymerizable composition for a polythiourethane optical material containing 0.0005 parts by weight to 5 parts by weight of the sum of the zinc compound (a1) and the compound (a4), based on 100 parts by weight of the total amount of the compound (B) and the compound (C).

[25] A polymerization catalyst for a polythiourethane optical material including:

(a1) one or two or more kinds of zinc compound selected from the group consisting of zinc dithiocarbamates, zinc sulfonates, zinc salts of mono- or di-alkyl phosphoric acid esters, bis(substituted acetylacetonato) zinc, and zinc halides, (a2) a compound represented by the following general formula (1), and (a3) a sulfonic acid represented by the following general formula (2):

(1)

(wherein $R^1$, $R^2$, $R^3$, and $R^4$ each independently represent hydrogen, or linear-chained aliphatic residue, cyclic aliphatic residue, or aromatic organic residue which is a monovalent or higher valent. $R^1$, $R^2$, $R^3$, and $R^4$ may be bonded to each other to form a ring. X represents a halogen atom. Y represents a nitrogen or phosphorous atom.)

(2)

(wherein n represents an integer of 1 or 2, and $R^5$ represents linear-chained aliphatic residue, branched aliphatic residue, cyclic aliphatic residue, or aromatic organic residue, which is a monovalent or higher valent and which may include a hydroxyl group or an amino group).

[26] The polymerization catalyst for a polythiourethane optical material as set forth in [25], wherein the zinc dithiocarbamate is represented by the following general formula (3):

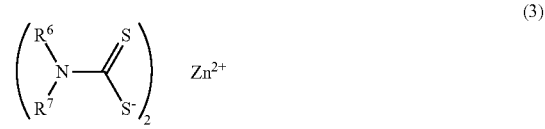
(3)

(wherein $R^6$ and $R^7$ represent an alkyl group having 1 to 10 carbon atoms, a phenylalkyl group having 7 to 10 carbon atoms, or an aryl group having 6 to 10 carbon atoms, and may be the same as or different from each other. Further, $R^6$ and $R^7$ may be bonded to each other to form a ring).

[27] The polymerization catalyst for a polythiourethane optical material as set forth in [26], wherein in the general formula (3), $R^6$ and $R^7$ each independently represent an alkyl group having 1 to 8 carbon atoms.

[28] The polymerization catalyst for a polythiourethane optical material as set forth in any one of [25] to [27], wherein the zinc dithiocarbamate is one or two or more kinds selected from the group consisting of zinc dimethyl dithiocarbamate, zinc diethyl dithiocarbamate, and zinc di-n-butyl dithiocarbamate.

[29] The polymerization catalyst for a polythiourethane optical material as set forth in any one of [25] to [28], wherein in the general formula (1), Y is nitrogen, and $R^1$, $R^2$, $R^3$, and $R^4$ are each independently selected from the group consisting of an alkyl group having 1 to 18 carbon atoms, a hydroxyalkyl group having 1 to 18 carbon atoms, a phenyl group, a phenylalkyl group having 7 to 18 carbon atoms, and an aminoalkyl group having 1 to 18 carbon atoms.

[30] The polymerization catalyst for a polythiourethane optical material as set forth in [29], wherein in the general formula (1), $R^1$, $R^2$, $R^3$, and $R^4$ are each independently selected from the group consisting of an alkyl group having 1 to 8 carbon atoms and a phenylalkyl group having 7 to 10 carbon atoms.

[31] The polymerization catalyst for a polythiourethane optical material as set forth in [30], wherein the compound (a2) represented by the general formula (1) is one or two or more kinds selected from the group consisting of a tetramethylammonium salt, a tetraethylammonium salt, a tetrapropylammonium salt, a tetrabutylammonium salt, a trioctylmethylammonium salt, and a tributylbenzylammonium salt.

[32] The polymerization catalyst for a polythiourethane optical material as set forth in [31], wherein the compound (a2) represented by the general formula (1) is one or two or more kinds selected from the group consisting of tetrabutylammonium chloride, tetrabutylammonium bromide, tetraethylammonium bromide, trioctylmethylammonium chloride, and tributylbenzylammonium chloride.

[33] The polymerization catalyst for a polythiourethane optical material as set forth in any one of [25] to [32], wherein the sulfonic acid (a3) represented by the general formula (2) is alkylsulfonic acid having 1 to 16 carbon atoms, benzenesulfonic acid, toluenesulfonic acid, or dodecylbenzenesulfonic acid.

[34] The polymerization catalyst for a polythiourethane optical material as set forth in [33], wherein the sulfonic acid (a3) represented by the general formula (2) is methanesulfonic acid, toluenesulfonic acid, or dodecylbenzenesulfonic acid.

[35] The polymerization catalyst for a polythiourethane optical material as set forth in any one of [25] to [34], wherein the molar ratio of the compound (a2) to the zinc compound (a1) is 0.01 to 100, and the molar ratio of the compound (a3) to the compound (a2) is 0.01 to 100.

[36] A polymerization catalyst for a polythiourethane optical material including:

(a1) one or two or more kinds of zinc compound selected from the group consisting of zinc dithiocarbamates, zinc sulfonates, zinc salts of mono- or di-alkyl phosphoric acid esters, bis(substituted acetylacetonato) zinc, and zinc halides, and (a4) a compound represented by the following general formula (4):

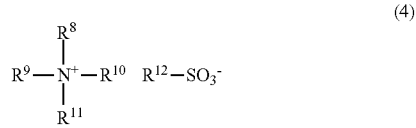

(wherein $R^8$, $R^9$, $R^{10}$, and $R^{11}$ each independently represent hydrogen, or linear-chained aliphatic residue, cyclic aliphatic residue, or aromatic organic residue which is a monovalent or higher valent. $R^8$, $R^9$, $R^{10}$, and $R^{11}$ may be bonded to each other to form a ring. $R^{12}$ represents a hydrogen atom, an alkyl group having 1 to 16 carbon atoms, or an aromatic hydrocarbon group which may have a substituent).

[37] The polymerization catalyst for a polythiourethane optical material as set forth in [36], wherein the zinc compound (a1) is zinc chloride.

[38] The polymerization catalyst for a polythiourethane optical material as set forth in [36] or [37], wherein in the general formula (4), $R^8$, $R^9$, $R^{10}$, and $R^{11}$ each independently represent an alkyl group having 1 to 8 carbon atoms or a benzyl group, and $R^{12}$ represents an alkyl group having 1 to 3 carbon atoms.

[39] The polymerization catalyst for a polythiourethane optical material as set forth in [38], wherein the compound (a4) is one or two or more kinds selected from the group consisting of tetramethylammonium sulfonates, tetraethylammonium sulfonates, tetrapropylammonium sulfonates, tetrabutylammonium sulfonates, trioctylmethylammonium sulfonates, and tributylbenzylammonium sulfonates.

[40] The polymerization catalyst for a polythiourethane optical material as set forth in [39], wherein the compound (a4) is tetrabutylammonium methane sulfonate.

Furthermore, in the present invention, the "compound (C) containing one or more mercapto groups" refers to a polyvalent compound containing two or more groups including a mercapto group.

The polymerization catalyst for a polythiourethane optical material of the present invention has excellent catalytic activity in a low-temperature region as well as excellent balance in catalytic activities in the low-temperature region and high-temperature region, as compared with an organic tin catalyst. Through the polymerizable composition for a polythiourethane optical material of the present invention including this catalyst, occurrence of white turbidity due to a material eluted from a tape used in a mold, deformation due to deficiency of the heat resistance of a mold, and striation or the like are suppressed, whereby a molded product having a desired shape with excellent transparency, heat-yellowing resistance, and light resistance can be obtained.

Furthermore, a molded product including a polythiourethane resin obtained by the polymerizable composition for a polythiourethane optical material of the present invention has the above-described characteristics, and accordingly, can be suitably used as an optical material.

As such, the catalyst of the present invention has excellent catalytic activity which is a substitute for an organic tin catalyst conventionally used as a polymerization catalyst for a polythiourethane optical material, and recently has become useful as a novel catalyst which is a substitutes for an organic tin catalyst, where the regulations on the use of such organic tin catalysts have been strengthened.

BEST MODE FOR CARRYING OUT THE INVENTION

Hereinbelow, the embodiments of the present invention will be described.

First, the catalyst contained in the polymerizable composition for a polythiourethane optical material of the present invention is described in the first embodiment and the second embodiment.

Polymerization Catalyst for Polythiourethane Optical Material

First Embodiment

The polymerization catalyst for a polythiourethane optical material of the present embodiment includes a zinc compound (a1), compound (a2) represented by the general formula (1), and sulfonic acid (a3) represented by the general formula (2).

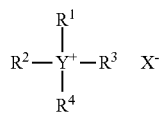

In the general formula (1), $R^1$, $R^2$, $R^3$, and $R^4$ each independently represent hydrogen, or linear-chained aliphatic residue, cyclic aliphatic residue, or aromatic organic residue which is a monovalent or higher valent. $R^1$, $R^2$, $R^3$, and $R^4$ may be bonded to each other to form a ring. X represents a halogen atom. Y represents a nitrogen or phosphorous atom.

In the general formula (2), n represents an integer of 1 or 2, and $R^5$ represents linear-chained aliphatic residue, branched aliphatic residue, cyclic aliphatic residue, or aromatic organic residue, which is a monovalent or higher valent and which may include a hydroxyl group or an amino group.

The catalyst including such components has excellent catalytic activity in a low-temperature region as well as excellent balance in catalytic activities in a low-temperature region and in a high-temperature region, as compared with an organic tin catalyst. The polymerizable composition for a polythiourethane optical material of the present embodiment including such a catalyst allows the polymerization to proceed uniformly, and accordingly, occurrence of striation or the like can be suppressed, a molded product having excellent transparency can be obtained. Further, the polymerizable composition of the present embodiment is sufficiently polymerization-cured in a mold in a low-temperature region and in a high-temperature region, and thus, the effect of the material eluted from the mold can be suppressed, and therefore, a molded product having a desired shape can be obtained even when the mold has insufficient heat resistance.

Moreover, a molded product comprising a polythiourethane resin obtained by the polymerizable composition for a polythiourethane optical material of the present embodiment has excellent heat resistance and transparency as well as a desired shape, and as a result, it can be suitably used as an optical material.

(Zinc Compound (a1))

As the zinc compound (a1) used in the polymerization catalyst for a polythiourethane optical material of the present embodiment, one or a combination of two or more kinds selected from the group consisting of a zinc dithiocarbamate, a zinc sulfonate, a zinc salt of a mono- or di-alkyl phosphoric acid ester, a zinc bis(substituted acetylacetonato), and a zinc halide can be used.

In the present embodiment, it is more preferable to use a zinc dithiocarbamate represented by the general formula (3) from the viewpoint of solubility into monomer of isocyanates, active hydrogen compounds, and the like, or the resin properties of the obtained resin that are required for a plastic spectacle lens.

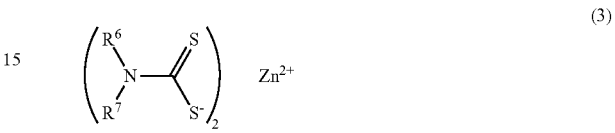

In the general formula (3), $R^6$ and $R^7$ represent an alkyl group having 1 to 10 carbon atoms, a phenylalkyl group having 7 to 10 carbon atoms, or an aryl group having 6 to 10 carbon atoms, and may be the same as or different from each other. Further, $R^6$ and $R^7$ may be bonded to each other to form a ring. $R^6$ and $R^7$ preferably each independently represent an alkyl group having 1 to 8 carbon atoms.

Here, specific examples of the alkyl group having 1 to 10 carbon atoms include alkyl groups such as a methyl group, an ethyl group, a propyl group, a butyl group, a pentyl group, a hexyl group, a heptyl group, an octyl group, a nonyl group, a decyl group, and the like. Specific examples of the phenylalkyl group having 7 to 10 carbon atoms include a benzyl group, a phenylethyl group, a phenylpropyl group, and a phenylbutyl group. Specific examples of the aryl group having 6 to 10 carbon atoms include aryl groups such as a phenyl group, a tolyl group, a xylyl group, a mesityl group, a naphthyl group, and the like. Further, $R^6$ and $R^7$ may be bonded to each other to form a pyrrolidine ring or a piperidine ring.

Examples of the compound represented by the general formula (3) include zinc salts of dithiocarbamic acids such as N,N-dimethyl dithiocarbamic acid, N,N-diethyl dithiocarbamic acid, N,N-dipropyl dithiocarbamic acid, N,N-dibutyl dithiocarbamic acid, N-ethyl-N-phenyl dithiocarbamic acid, N,N-dibenzyl dithiocarbamic acid, and the like, and derivatives thereof, and others.

Examples of the sulfonic acid groups of the zinc sulfonates include the following sulfonic acid groups of the sulfonic acids. Specific examples thereof include sulfonic acids such as methanesulfonic acid, ethanesulfonic acid, propanesulfonic acid, butanesulfonic acid, pentanesulfonic acid, hexanesulfonic acid, heptanesulfonic acid, octanesulfonic acid, nonanesulfonic acid, decanesulfonic acid, undecanesulfonic acid, dodecanesulfonic acid, tetradecanesulfonic acid, hexadecanesulfonic acid, benzenesulfonic acid, toluenesulfonic acid, dodecylbenzenesulfonic acid, trifluoromethanesulfonic acid, fluorosulfonic acid, and the like, and derivatives thereof, and others.

Examples of the ester alkyl groups of the mono- or di-alkyl phosphoric acid ester groups of the zinc salts of the mono- or di-alkyl phosphoric acid ester include the following alkyl groups. Specific examples thereof include alkyl groups such as a methyl group, an ethyl group, a propyl group, a butyl group, a dipentyl group, a hexyl group, a heptyl group, an octyl group, a 2-ethylhexyl group, a decyl group, a dodecyl group, a tetradecyl group, a hexadecyl group, and the like, oxyethylene groups such as a methoxyethyl group, an ethoxyethyl group, a propoxyethyl group, a butoxyethyl group, and the like, polyoxyethylene groups, and others. The ester alkyl groups of the dialkyl phosphoric acid ester may be the same as or different from each other.

Examples of the substituted acetylacetonato group of the bis(substituted acetylacetonato) zinc include a 2,2,6,6-tetramethyl-3,5-heptanedionato group and the like.

Examples of the halogen of the zinc halide include fluorine, chlorine, bromine and iodine.

When one or two or more kinds of isocyanates selected from the group consisting of isocyanate compounds and isothiocyanate compounds are reacted with one or two or more kinds of active hydrogen compounds each having a mercapto group to prepare polythiourethane optical materials, preferable examples of the zinc compound include zinc dialkyl dithiocarbamates, zinc alkylphenyl dithiocarbamates, zinc diaryl dithiocarbamates, and zinc acetylacetonates, and more preferably, zinc N,N-dimethyl dithiocarbamate, zinc N,N-diethyl dithiocarbamate, zinc N,N-di-n-butyl dithiocarbamate, zinc N-ethyl-N-phenyl dithiocarbamate, and zinc N,N-dibenzyl dithiocarbamate. These compounds can be used singly or in combination of two or more kinds thereof.

Furthermore, in view of solubility into monomer isocyanates, active hydrogen compounds, and the like or resin properties of the generated resin that are required for a plastic spectacle lens, among the foregoing compounds, particularly preferred are zinc N,N-dimethyl dithiocarbamate, zinc N,N-diethyl dithiocarbamate, and zinc N,N-di-n-butyl dithiocarbamate. When these compounds are used as catalysts, the polymerization speeds up at a low temperature, whereby it is possible to suppress elution from the tape used in a mold, and among the resin properties of the polythiourethane optical material, heat-yellowing resistance or light resistance are particularly improved. Due to the improvement of heat-yellowing resistance or light resistance, it is possible to provide a plastic lens in which the deterioration of color is suppressed when the lens is used for a long time.

(Compound (a2) Represented by General Formula (1))

By using the compound (a2) represented by the following general formula (1), the catalytic activity of zinc compound (a1) is improved drastically, and thus, it is possible to obtain a molded product having excellent transparency. Further, it is possible to allow the compound (a3) represented by the general formula (2) to be dissolved in isocyanates by mixing it with the compound (a2) represented by the general formula (1) in advance.

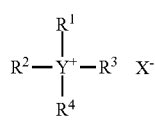

(1)

Examples of $R^1$, $R^2$, $R^3$ and $R^4$ in the compound (a2) represented by the general formula (1) include hydrogen or monovalent or higher valent organic residues derived from linear-chained aliphatic compounds such as methane, ethane, propane, butane, pentane, hexane, heptane, octane, nonane, decane, undecane, dodecane, tetradecane, hexadecane, octadecane, ethylene, propylene, 1-butene, 2-butene, butadiene, and the like, monovalent or higher valent organic residues derived from cyclic aliphatic compounds such as cyclopentane, cyclopentene, cyclopentadiene, cyclohexane, 1,2-dimethylcyclohexane, 1,3-dimethylcyclohexane, 1,4-dimethylcyclohexane, cyclohexene, 1,3-cyclohexadiene, 1,4-cyclohexadiene, norbornane, 2,3-dimethylnorbornane, 2,5-dimethylnorbornane, 2,6-dimethylnorbornane, bis(4-methylcyclohexyl)methane, and the like, monovalent or higher valent organic residues derived from aromatic compounds such as benzene, toluene, o-xylene, m-xylene, p-xylene, naphthalene, biphenyl, anthracene, perylene, styrene, ethylbenzene, and the like, monovalent or higher valent organic residues derived from alcohol compounds such as methanol, ethanol, propanol, isopropanol, butanol, isobutanol, pentanol, hexanol, heptanol, octanol, nonanol, decanol, undecanol, dodecanol and the like, monovalent or higher valent organic residues derived from primary amine compounds such as ethylamine, n-propylamine, isopropylamine, n-butylamine, sec-butylamine, tert-butylamine, pentylamine, hexylamine, heptylamine, octylamine, decylamine, laurylamine, myristylamine, 3-pentylamine, 2-ethylhexylamine, 1,2-dimethylhexylamine, and the like, monovalent or higher valent organic residues derived from secondary amine compounds such as diethylamine, dipropylamine, di-n-butylamine, di-sec-butylamine, diisobutylamine, di-n-pentylamine, di-3-pentylamine, dihexylamine, dioctylamine, di(2-ethylhexyl)amine, methylhexylamine, and the like, monovalent or higher valent organic residues derived from tertiary amine compounds such as triethylamine, tri-n-butylamine, tri-n-hexylamine, N,N-diisopropylethylamine, triethylene diamine, triphenylamine, N,N-dimethylethanolamine, N,N-diethylethanolamine, N,N-dibutylethanolamine, triethanolamine, N-ethyldiethanolamine, N,N-dimethylbenzylamine, N,N-diethylbenzylamine, tribenzylamine, N-methyldibenzylamine, and the like, and others. Further, $R^1$, $R^2$, $R^3$, and $R^4$ may be bonded to each other to form a ring.

Furthermore, it is more preferable that the above-mentioned $R^1$, $R^2$, $R^3$, and $R^4$ each independently be an alkyl group having 1 to 18 carbon atoms, a hydroxyalkyl group having 1 to 18 carbon atoms, or an aminoalkyl group having 1 to 18 carbon atoms.

When Y in the general formula (1) is a nitrogen atom, specific examples of the compound (a2) represented by the general formula (1) include quaternary ammonium compounds such as tetramethylammonium chloride, tetraethylammonium chloride, tetrapropylammonium chloride, tetrabutylammonium chloride, tetrahexylammonium chloride, tetraoctylammonium chloride, trimethyloctylammonium chloride, trimethylphenylammonium chloride, trimethylbenzylammonium chloride, triethyl-n-octylammonium chloride, triethylbenzylammonium chloride, tri-n-butyl-n-octylammonium chloride, tri-n-butylbenzylammonium chloride, methyltriphenylammonium chloride, ethyltriphenylammonium chloride, n-butyltriphenylammonium chloride, trimethylcetylammonium chloride, trimethylstearylammonium chloride, dimethylethylcetylammonium chloride, dimethyldidecylammonium chloride, dimethyl di-n-dodecylammonium chloride, dimethyldistearylammonium chloride, n-octyldimethylbenzylammonium chloride, n-dodecyldimethylbenzylammonium chloride, stearyldimethylbenzylammonium chloride, triethyl-n-dodecylammonium chloride, tri-n-hexylmethylammonium chloride, tri-n-octylmethylammonium chloride, tri-n-decylmethylammonium chloride, tri-n-dodecylmethylammonium chloride, tri-n-octyl-n-dodecylammonium chloride, diethyldicyclohexylammonium chloride, 1-methylpyridinium chloride, 1-ethylpyridinium chloride, 1-n-butylpyridinium chloride, 1-n-hexylpyridinium chloride, 1-n-octylpyridinium chloride, 1-n-dodecylpyridinium chloride, 1-phenylpyridinium chloride, 1-methyl-4- methylpyridinium chloride, 1-ethyl-4-methylpyridinium chloride, 1-n-butyl-4-methylpyridinium chloride, 1-n-hexyl-4-methylpyridinium chloride, 1-n-octyl-4-methylpyridinium chloride, 1-n-dodecyl-4-methylpyridinium chloride, 1-phenyl-4-methylpyridinium chloride, tetramethylammonium bromide, tetraethylammonium bromide, tetrapropylammonium bromide, tetrabutylammonium bromide, tetrahexylammonium bromide, tetraoctylammonium bromide, trimethyloctylammonium bromide, trimethylphenylammonium bromide, trimethylbenzylammonium bromide, triethyl-n-octylammonium bromide, triethylbenzylammonium bromide, tri-n-butyl-n-octylammonium bromide, tri-n-butylbenzylammonium bromide, methyltriphenylammonium bromide, ethyltriphenylammonium bromide, n-butyltriphenylammonium bromide, trimethylcetylammonium bromide, trimethylstearylammonium bromide, dimethylethylcetylammonium bromide, dimethyldidecylammonium bromide, dimethyl di-n-dodecylammonium bromide, dimethyldistearylammonium bromide, n-octyldimethylbenzylammonium bromide, n-dodecyldimethylbenzylammonium bromide, stearyldimethylbenzylammonium bromide, triethyl-n-dodecylammonium bromide, tri-n-hexylmethylammonium bromide, tri-n-octylmethylammonium bromide, tri-n-decylmethylammonium bromide, tri-n-dodecylmethylammonium bromide, tri-n-octyl-n-dodecylammonium bromide, diethyldicyclohexylammonium bromide, 1-methylpyridinium bromide, 1-ethylpyridinium bromide, 1-n-butylpyridinium bromide, 1-n-hexylpyridinium bromide, 1-n-octylpyridinium bromide, 1-n-dodecylpyridinium bromide, 1-phenylpyridinium bromide, 1-methyl-4-methylpyridinium bromide, 1-ethyl-4-methylpyridinium bromide, 1-n-butyl-4-methylpyridinium bromide, 1-n-hexyl-4-methylpyridinium bromide, 1-n-octyl-4-methylpyridinium bromide, 1-n-dodecyl-4-methylpyridinium bromide, 1-phenyl-4-methylpyridinium bromide, tetramethylammonium fluoride, tetraethylammonium fluoride, tetrapropylammonium fluoride, tetrabutylammonium fluoride, tetrahexylammonium fluoride, tetraoctylammonium fluoride, trimethyloctylammonium fluoride, trimethylphenylammonium fluoride, trimethylbenzylammonium fluoride, triethyl-n-octylammonium fluoride, triethylbenzylammonium fluoride, tri-n-butyl-n-octylammonium fluoride, tri-n-butylbenzylammonium fluoride, methyltriphenylammonium fluoride, ethyltriphenylammonium fluoride, n-butyltriphenylammonium fluoride, trimethylcetylammonium fluoride, trimethylstearylammonium fluoride, dimethylethylcetylammonium fluoride, dimethyldidecylammonium fluoride, dimethyl di-n-dodecylammonium fluoride, dimethyldistearylammonium fluoride, n-octyldimethylbenzylammonium fluoride, n-dodecyldimethylbenzylammonium fluoride, stearyldimethylbenzylammonium fluoride, triethyl-n-dodecylammonium fluoride, tri-n-hexylmethylammonium fluoride, tri-n-octylmethylammonium fluoride, tri-n-decylmethylammonium fluoride, tri-n-dodecylmethylammonium fluoride, tri-n-octyl-n-dodecylammonium fluoride, diethyldicyclohexylammonium fluoride, 1-methylpyridinium fluoride, 1-ethylpyridinium fluoride, 1-n-butylpyridinium fluoride, 1-n-hexylpyridinium fluoride, 1-n-octylpyridinium fluoride, 1-n-dodecylpyridinium fluoride, 1-phenylpyridinium fluoride, 1-methyl-4-methylpyridinium fluoride, 1-ethyl-4-methylpyridinium fluoride, 1-n-butyl-4-methylpyridinium fluoride, 1-n-hexyl-4-methylpyridinium fluoride, 1-n-octyl-4-methylpyridinium fluoride, 1-n-dodecyl-4-methylpyridinium fluoride, 1-phenyl-4-methylpyridinium fluoride, tetramethylammonium iodide, tetraethylammonium iodide, tetrapropylammonium iodide, tetrabutylammonium iodide, tetrahexylammonium iodide, tetraoctylammonium iodide, trimethyloctylammonium iodide, trimethylphenylammonium iodide, trimethylbenzylammonium iodide, triethyl-n-octylammonium iodide, triethylbenzylammonium iodide, tri-n-butyl-n-octylammonium iodide, tri-n-butylbenzylammonium iodide, methyltriphenylammonium iodide, ethyltriphenylammonium iodide, n-butyltriphenylammonium iodide, trimethylcetylammonium iodide, trimethylstearylammonium iodide, dimethylethylcetylammonium iodide, dimethyldidecylammonium iodide, dimethyl di-n-dodecylammonium iodide, dimethyldistearylammonium iodide, n-octyldimethylbenzylammonium iodide, n-dodecyldimethylbenzylammonium iodide, stearyldimethylbenzylammonium iodide, triethyl-n-dodecylammonium iodide, tri-n-hexylmethylammonium iodide, tri-n-octylmethylammonium iodide, tri-n-decylmethylammonium iodide, tri-n-dodecylmethylammonium iodide, tri-n-octyl-n-dodecylammonium iodide, diethyldicyclohexylammonium iodide, 1-methylpyridinium iodide, 1-ethylpyridinium iodide, 1-n-butylpyridinium iodide, 1-n-hexylpyridinium iodide, 1-n-octylpyridinium iodide, 1-n-dodecylpyridinium iodide, 1-phenylpyridinium iodide, 1-methyl-4-methylpyridinium iodide, 1-ethyl-4-methylpyridinium iodide, 1-n-butyl-4-methylpyridinium iodide, 1-n-hexyl-4-methylpyridinium iodide, 1-n-octyl-4-methylpyridinium iodide, 1-n-dodecyl-4-methylpyridinium iodide, 1-phenyl-4-methylpyridinium iodide, (2-hydroxypropyl)trimethylammonium chloride, hydroxyethyltrimethylammonium chloride, trimethylaminoethoxyethanol chloride, (2-hydroxypropyl)trimethylammonium bromide, hydroxyethyltrimethylammonium bromide, trimethylaminoethoxyethanol bromide, (2-hydroxypropyl)trimethylammonium fluoride, hydroxyethyltrimethylammonium fluoride, trimethylaminoethoxyethanol fluoride, (2-hydroxypropyl)trimethylammonium iodide, hydroxyethyltrimethylammonium iodide, trimethylaminoethoxyethanol iodide, and 1-methyl-1-azania-4-azabicyclo[2,2,2]octanium chloride, 1,1-dimethyl-4-methylpiperidinium chloride, 1-methylmorpholinium chloride, 1-methylpiperidinium chloride, 1-methyl-1-azania-4-azabicyclo[2,2,2]octanium bromide, 1,1-dimethyl-4-methylpiperidinium bromide, 1-methylmorpholinium bromide, 1-methylpiperidinium bromide, 1-methyl-1-azania-4-azabicyclo[2,2,2]octanium fluoride, 1,1-dimethyl-4-methylpiperidinium fluoride, 1-methylmorpholinium fluoride, 1-methylpiperidinium fluoride, 1-methyl-1-azania 4-azabicyclo[2,2,2]octanium iodide, 1,1-dimethyl-4-methylpiperidinium iodide, 1-methylmorpholinium iodide, 1-methylpiperidinium iodide, and the like.

Further, when Y in the general formula (1) is a phosphorous atom, specific examples of the compound (a2) represented by the general formula (1) include quaternary phosphonium salt compounds such as tetramethylphosphonium chloride, tetraethylphosphonium chloride, tetrapropylphosphonium chloride, tetrabutylphosphonium chloride, tetrahexylphosphonium chloride, tetraoctylphosphonium chloride, ethyltriphenylphosphonium chloride, tetraphenylphosphonium chloride, butyltriphenylphosphonium chloride, benzyltriphenylphosphonium chloride, methoxymethyltriphenylphosphonium chloride, tetramethylphosphonium bromide, tetraethylphosphonium bromide, tetrapropylphosphonium bromide, tetrabutylphosphonium bromide, tetrahexylphosphonium bromide, tetraoctylphosphonium bromide, ethyltriphenylphosphonium bromide, tetraphenylphosphonium bromide, butyltriphenylphosphonium bromide, benzyltriphenylphosphonium bromide, methoxymethyltriphenylphosphonium bromide, and the like.

Among these exemplified compounds, as the compound (a2) represented by the general formula (1), preferred are a tetramethylammonium salt, a tetraethylammonium salt, a tetrapropylammonium salt, a tetrabutylammonium salt, a trioctylmethylammonium salt, a tributylbenzylammonium salt, a tetramethylphosphonium salt, a tetraethylphosphonium salt, a tetrapropylphosphonium salt, a tetrabutylphosphonium salt, and a methoxymethyltriphenylphosphonium salt, more preferred are tetraethylammonium chloride, tetrabutylammonium fluoride, tetrabutylammonium chloride, tetrabutylammonium bromide, tetrabutylammonium iodide, trioctylmethylammonium chloride or tributylbenzylammonium chloride, tetrabutylphosphonium chloride, tetrabutylphosphonium bromide, and methoxymethyltriphenylphosphonium chloride, and even more preferred are tetrabutylammonium chloride, tetrabutylammonium bromide, tetraethylammonium bromide, trioctylmethylammonium chloride, tributylbenzylammonium chloride, tetrabutylphosphonium chloride, and tetrabutylphosphonium bromide. These quaternary ammonium salt compounds and quaternary phosphonium salt compounds may be used singly or in combination of two or more kinds thereof.

As the compound (a2) represented by the general formula (1) used in the present embodiment, from the viewpoint of drastically improving the catalytic activity of the zinc compound to obtain a molded product having excellent transparency, it is preferable to use a compound in which Y is nitrogen, $R^1$, $R^2$, $R^3$, and $R^4$ are each independently selected from the group consisting of an alkyl group having 1 to 18 carbon atoms, a hydroxyalkyl group having 1 to 18 carbon atoms, a phenyl group, a phenylalkyl group having 7 to 18 carbon atoms, and an aminoalkyl group having 1 to 18 carbon atoms. It is more preferable to use the compound in which $R^1$, $R^2$, $R^3$, and $R^4$ are each independently selected from the group consisting of an alkyl group having 1 to 8 carbon atoms and a phenylalkyl group having 7 to 10 carbon atoms.

As the compound, one or two or more kinds selected from the group consisting of a tetramethylammonium salt, a tetraethylammonium salt, a tetrapropylammonium salt, a tetrabutylammonium salt, a trioctylmethylammonium salt, and a tributylbenzylammonium salt can be used. Specifically, one or two or more kinds selected from the group consisting of tetrabutylammonium chloride, tetrabutylammonium bromide, tetraethylammonium bromide, trioctylmethylammonium chloride, and tributylbenzylammonium chloride are preferably used.

Furthermore, in the present embodiment, as for the ratios of the zinc compound (a1) and the compound (a2) represented by the general formula (1) to be used, the molar ratio of the compound (a2) represented by the general formula (1) to the zinc compound (a1) is preferably in the range 0.01 to 100, more preferably in the range 0.05 to 100, and particularly preferably in the range 0.5 to 50. If the molar ratio of the compound (a2) represented by the general formula (1) is in this range, the catalytic activity of the zinc compound (a1) is drastically improved and sufficient dissolution of the compound (a2) represented by the general formula (1) into a polymerizable composition is secured, and as a result, a resin having high transparency is obtained.

(Sulfonic Acid (a3))

The sulfonic acid (a3) used in the present embodiment is represented by the general formula (2).

$$R^5\text{--}(SO_3H)_n \qquad (2)$$

By using the present compound, it is possible to improve activity at a high temperature and suppress deformation due to deficiency in the heat resistance of a mold, and it is also possible to obtain a molded product having excellent heat resistance.

n is an integer of 1 or 2. $R^5$ represents a monovalent or higher valent linear-chained aliphatic, branched aliphatic residue, cyclic aliphatic residue, or aromatic organic residue, which may include a hydroxyl group or an amino group.

Specific examples of the sulfonic acid (a3) used in the present embodiment include sulfonic acids such as alkylsulfonic acid having 1 to 16 carbon atoms, such as methanesulfonic acid, ethanesulfonic acid, propanesulfonic acid, butanesulfonic acid, pentanesulfonic acid, hexanesulfonic acid, heptanesulfonic acid, octanesulfonic acid, nonanesulfonic acid, decanesulfonic acid, undecanesulfonic acid, dodecanesulfonic acid, tetradecanesulfonic acid, hexadecanesulfonic acid, and the like, benzenesulfonic acid, toluenesulfonic acid, dodecylbenzenesulfonic acid, and the like, and derivatives thereof.

Among these exemplified compounds, preferred are methanesulfonic acid, ethanesulfonic acid, propanesulfonic acid, benzenesulfonic acid, toluenesulfonic acid, and dodecylbenzenesulfonic acid, and more preferred are methanesulfonic acid, toluenesulfonic acid, and dodecylbenzenesulfonic acid. These sulfonic acids can be used singly or in combination of two or more kinds thereof.

As for the ratios of the compound (a2) represented by the general formula (1) and the sulfonic acid (a3) represented by the general formula (2) to be used, the molar ratio of the sulfonic acid (a3) represented by the general formula (2) to the compound (a2) represented by the general formula (1) is preferably in the range 0.01 to 100, more preferably in the range 0.05 to 100, particularly preferably in the range 0.5 to 10. If the molar ratio of the compound (a2) represented by the general formula (1) is in the above-described range, a resin having high transparency and high heat resistance is obtained.

As for the amounts of the zinc compound (a1) and the compound (a2) represented by the general formula (1) to be used, the total amount of the zinc compound (a1), the compound (a2) represented by the general formula (1), and the sulfonic acid (a3) represented by the general formula (2) is preferably in the range 0.0005 parts by weight to 5 parts by weight, more preferably in the range 0.0010 parts by weight to 3 parts by weight, and particularly preferably in the range 0.0010 parts by weight to 2 parts by weight, based on 100 parts by weight of the total amount of at least one compound (B) selected from an isocyanate compound and an isothiocyanate compound, and the compound (C) containing one or more mercapto groups. The amounts of these to be used can be appropriately determined depending on the type of catalysts, the type of monomers to be used (the compound (B), the compound (C), a resin modifier as described later, and the like), the type and amount of additives used, and the shape of molded products.

Second Embodiment

The polymerization catalyst for a polythiourethane optical material of the present embodiment includes the zinc compound (a1), and the compound (a4) represented by the general formula (4).

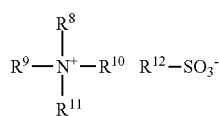

(4)

In the general formula (4), $R^8$, $R^9$, $R^{10}$, and $R^{11}$ each independently represent hydrogen, or linear-chained aliphatic residue, cyclic aliphatic residue, or aromatic organic residue which is a monovalent or higher valent. $R^8$, $R^9$, $R^{10}$, and $R^{11}$ may be bonded to each other to form a ring. $R^{12}$ represents a hydrogen atom, an alkyl group having 1 to 16 carbon atoms, or an aromatic hydrocarbon group which may have a substituent.

The catalyst including such components has excellent catalytic activity in a low-temperature region as well as excellent balance in catalytic activities in a low-temperature region and in a high-temperature region, as compared with an organic tin catalyst. The polymerizable composition for a polythiourethane optical material of the present embodiment including such a catalyst allows the polymerization to proceed uniformly, and accordingly, occurrence of striation or the like can be suppressed, a molded product having excellent transparency can be obtained. Further, the polymerizable composition of the present embodiment is sufficiently polymerized and cured in a mold in a low-temperature region and in a high-temperature region, and the effect of the material eluted from the mold can be thus suppressed, and therefore, a molded product having a desired shape can be obtained even when the mold has insufficient heat resistance.

Moreover, a molded product comprising a polythiourethane resin obtained by the polymerizable composition for a polythiourethane optical material of the present embodiment has excellent heat resistance and transparency as well as a desired shape and excellent appearance, and as a result, it can be suitably used as an optical material.

(Zinc Compound (a1))

As the zinc compound (a1) used in the polymerization catalyst for a polythiourethane optical material of the present embodiment, one or a combination of two or more kinds selected from the group consisting of a zinc dithiocarbamate, a zinc sulfonate, a zinc salt of a mono- or di-alkyl phosphoric acid ester, a zinc bis(substituted acetylacetonato), and a zinc halide can be used.

In the present embodiment, it is more preferable to use zinc chloride. If zinc chloride is used as a catalyst, the polymerization speeds up at a low temperature, whereby an effect is obtained where elution from the tape used in a mold is suppressed.

(Compound (a4) Represented by General Formula (4))

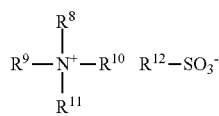

(4)

A catalyst including the compound (a4) represented by the general formula (4) and the zinc compound (a1) can be contained in the polymerizable composition for a polythiourethane optical material at a smaller addition amount than that of a conventional organic tin catalyst, without the use of a high-activity tertiary amine in combination therewith. In addition, a polythiourethane resin obtained by curing the polymerizable composition sufficiently satisfies the physical properties for an optical material. Further, the catalyst of the present embodiment has high balance in catalytic activities in a low-temperature region and in a high-temperature region, as compared with an organic tin catalyst, and thus, the polymerizable composition can be sufficiently polymerized and cured in the mold. Therefore, from the viewpoint of obtaining a molded product having excellent heat resistance, transparency, and appearance, it can be used as a novel catalyst replacing an organic tin-based catalyst.

Examples of $R^8$, $R^9$, $R^{10}$, and $R^{11}$ in the compound (a4) represented by the general formula (4) include hydrogen or monovalent or higher valent organic residues derived from linear-chained aliphatic compounds such as methane, ethane, propane, butane, pentane, hexane, heptane, octane, nonane, decane, undecane, dodecane, tetradecane, hexadecane, octadecane, ethylene, propylene, 1-butene, 2-butene, butadiene, and the like, monovalent or higher valent organic residues derived from cyclic aliphatic compounds such as cyclopentane, cyclopentene, cyclopentadiene, cyclohexane, 1,2-dimethylcyclohexane, 1,3-dimethylcyclohexane, 1,4-dimethylcyclohexane, cyclohexene, 1,3-cyclohexadiene, 1,4-cyclohexadiene, norbornane, 2,3-dimethylnorbornane, 2,5-dimethylnorbornane, 2,6-dimethylnorbornane, bis(4-methylcyclohexyl)methane, and the like, monovalent or higher valent organic residues derived from aromatic compounds such as benzene, toluene, o-xylene, m-xylene, p-xylene, naphthalene, biphenyl, anthracene, perylene, styrene, ethylbenzene, and the like, monovalent or higher valent organic residues derived from alcohol compounds such as methanol, ethanol, propanol, isopropanol, butanol, isobutanol, pentanol, hexanol, heptanol, octanol, nonanol, decanol, undecanol, dodecanol, and the like;

monovalent or higher valent organic residues derived from primary amine compounds such as ethylamine, n-propylamine, isopropylamine, n-butylamine, sec-butylamine, tert-butylamine, pentylamine, hexylamine, heptylamine, octylamine, decylamine, laurylamine, myristylamine, 3-pentylamine, 2-ethylhexylamine, 1,2-dimethylhexylamine, and the like, monovalent or higher valent organic residues derived from secondary amine compounds such as diethylamine, dipropylamine, di-n-butylamine, di-sec-butylamine, diisobutylamine, di-n-pentylamine, di-3-pentylamine, dihexylamine, dioctylamine, di(2-ethylhexyl)amine, methylhexylamine, and the like, monovalent or higher valent organic residues derived from tertiary amine compounds such as triethylamine, tri-n-butylamine, tri n-hexylamine, N,N-diisopropylethylamine, triethylene diamine, triphenylamine, N,N-dimethylethanolamine, N,N-diethylethanolamine, N,N-dibutylethanolamine, triethanolamine, N-ethyldiethanolamine, N,N-dimethylbenzylamine, N,N-diethylbenzylamine, tribenzylamine, N-methyldibenzylamine, and the like, and others, but are not limited to these exemplified compounds. Further, $R^8$, $R^9$, $R^{10}$, and $R^{11}$ may be bonded to each other to form a ring.

Furthermore, the above-mentioned $R^8$, $R^9$, $R^{10}$, and $R^{11}$ are preferably each independently an alkyl group having 1 to 18 carbon atoms, a hydroxyalkyl group having 1 to 18 carbon atoms, an aminoalkyl group having 1 to 18 carbon atoms, or a benzyl group, and more preferably an alkyl group having 1 to 8 carbon atoms or a benzyl group.

$R^{12}$ represents a hydrogen atom, an alkyl group having 1 to 16 carbon atoms, or an aromatic hydrocarbon group which may have a substituent, and more preferably an alkyl group having 1 to 3 carbon atoms.

Examples of the aromatic hydrocarbon group of the aromatic hydrocarbon group which may have a substituent include benzene, toluene, dodecylbenzene, and the like.

In the present embodiment, $R^8$, $R^9$, $R^{10}$, and $R^{11}$ of the general formula (4) each independently represent an alkyl group having 1 to 8 carbon atoms or a benzyl group, and further, $R^{12}$ more preferably represents an alkyl group having 1 to 3 carbon atoms.

Specific examples of the compound (a4) represented by the general formula (4) include tetramethylammonium methane sulfonate, tetraethylammonium methane sulfonate, tetrapropylammonium methane sulfonate, tetrabutylammonium methane sulfonate, tetrahexylammonium methane sulfonate, tetraoctylammonium methane sulfonate, trimethyloctylammonium methane sulfonate, trimethylphenylammonium methane sulfonate, trimethylbenzylammonium methane sulfonate, triethyl-n-octylammonium methane sulfonate, triethylbenzylammonium methane sulfonate, tri-n-butyl-n-octylammonium methane sulfonate, tri-n-butylbenzylammonium methane sulfonate, methyltriphenylammonium methane sulfonate, ethyltriphenylammonium methane sulfonate, n-butyltriphenylammonium methane sulfonate, trimethylcetylammonium methane sulfonate, trimethylstearylammonium methane sulfonate, dimethylethylcetylammonium methane sulfonate, dimethyldidecylammonium methane sulfonate, dimethyl di-n-dodecylammonium methane sulfonate, dimethyl distearylammonium, n-octyldimethylbenzylammonium methane sulfonate, n-dodecyl dimethyl benzylammonium methane sulfonate, stearyl dimethyl benzylammonium methane sulfonate, triethyl-n-dodecylammonium methane sulfonate, tri-n-hexyl methylammonium methane sulfonate, tri-n-octyl methylammonium methane sulfonate, tri-n-decyl methylammonium methane sulfonate, tri-n-dodecyl methylammonium methane sulfonate, tri-n-octyl-n-dodecylammonium methane sulfonate, diethyldicyclohexylammonium methane sulfonate, tetramethylammonium ethane sulfonate, tetraethylammonium ethane sulfonate, tetrapropylammonium ethane sulfonate, tetrabutylammonium ethane sulfonate, tetrahexylammonium ethane sulfonate, tetraoctylammonium ethane sulfonate, trimethyloctylammonium ethane sulfonate, trimethylphenylammonium ethane sulfonate, trimethylbenzylammonium ethane sulfonate, triethyl-n-octylammonium ethane sulfonate, triethylbenzylammonium ethane sulfonate, tri-n-butyl-n-octylammonium ethane sulfonate, tri-n-butylbenzylammonium ethane sulfonate, methyltriphenylammonium ethane sulfonate, ethyltriphenylammonium ethane sulfonate, n-butyltriphenylammonium ethane sulfonate, trimethylcetylammonium ethane sulfonate, trimethylstearylammonium ethane sulfonate, dimethylethylcetylammonium ethane sulfonate, dimethyldidecylammonium ethane sulfonate, dimethyl di-n-dodecylammonium ethane sulfonate, dimethyldistearylammonium, n-ootyldimethylbenzylammonium ethane sulfonate, n-dodecyldimethylbenzylammonium ethane sulfonate, stearyldimethylbenzylammonium ethane sulfonate, triethyl-n-dodecylammonium ethane sulfonate, tri-n-hexylmethylammonium ethane sulfonate, tri-n-octylmethylammonium ethane sulfonate, tri-n-decylmethylammonium ethane sulfonate, tri-n-dodecylmethylammonium ethane sulfonate, tri-n-octyl-n-dodecylammonium ethane sulfonate, diethyldicyclohexylammonium ethane sulfonate, tetramethylammonium propane sulfonate, tetraethylammonium propane sulfonate, tetrapropylammonium propane sulfonate, tetrabutylammonium propane sulfonate, tetrahexylammonium propane sulfonate, tetraoctylammonium propane sulfonate, trimethyloctylammonium propane sulfonate, trimethylphenylammonium propane sulfonate, trimethylbenzylammonium propane sulfonate, triethyl-n-octylammonium propane sulfonate, triethylbenzylammonium propane sulfonate, tri-n-butyl-n-octylammonium propane sulfonate, tri-n-butylbenzylammonium propane sulfonate, methyltriphenylammonium propane sulfonate, ethyltriphenylammonium propane sulfonate, n-butyltriphenylammonium propane sulfonate, trimethylcetylammonium propane sulfonate, trimethylstearylammonium propane sulfonate, dimethylethylcetylammonium propane sulfonate, dimethyldidecylammonium propane sulfonate, dimethyl di-n-dodecylammonium propane sulfonate, dimethyldistearylammonium, n-octyldimethylbenzylammonium propane sulfonate, n-dodecyldimethylbenzylammonium propane sulfonate, stearyldimethylbenzylammonium propane sulfonate, triethyl-n-dodecylammonium propane sulfonate, tri-n-hexylmethylammonium propane sulfonate, tri-n-octylmethylammonium propane sulfonate, tri-n-decylmethylammonium propane sulfonate, tri-n-dodecylmethylammonium propane sulfonate, tri-n-octyl-n-dodecylammonium propane sulfonate, diethyldicyclohexylammonium propane sulfonate, tetramethylammonium benzene sulfonate, tetraethylammonium benzene sulfonate, tetrapropylammonium benzene sulfonate, tetrabutylammonium benzene sulfonate, tetrahexylammonium benzene sulfonate, tetraoctylammonium benzene sulfonate, trimethyloctylammonium benzene sulfonate, trimethylphenylammonium benzene sulfonate, trimethylbenzylammonium benzene sulfonate, triethyl-n-octylammonium benzene sulfonate, triethylbenzylammonium benzene sulfonate, tri-n-butyl-n-octylammonium benzene sulfonate, tri-n-butylbenzylammonium benzene sulfonate, methyltriphenylammonium benzene sulfonate, ethyltriphenylammonium benzene sulfonate, n-butyltriphenylammonium benzene sulfonate, trimethylcetylammonium benzene sulfonate, trimethylstearylammonium benzene sulfonate, dimethylethylcetylammonium benzene sulfonate, dimethyldidecylammonium benzene sulfonate, dimethyl di-n-dodecylammonium benzene sulfonate, dimethyldistearylammonium, n-octyldimethylbenzylammonium benzene sulfonate, n-dodecyldimethylbenzylammonium benzene sulfonate, stearyldimethylbenzylammonium benzene sulfonate, triethyl-n-dodecylammonium benzene sulfonate, tri-n-hexylmethylammonium benzene sulfonate, tri-n-octylmethylammonium benzene sulfonate, tri-n-decylmethylammonium benzene sulfonate, tri-n-dodecylmethylammonium benzene sulfonate, tri-n-octyl-n-dodecylammonium benzene sulfonate, diethyldicyclohexylammonium benzene sulfonate, tetramethylammonium p-toluene sulfonate, tetraethylammonium p-toluene sulfonate, tetrapropylammonium p-toluene sulfonate, tetrabutylammonium p-toluene sulfonate, tetrahexylammonium p-toluene sulfonate, tetraoctylammonium p-toluene sulfonate, trimethyloctylammonium p-toluene sulfonate, trimethylphenylammonium p-toluene sulfonate, trimethylbenzylammonium p-toluene sulfonate, triethyl-n-octylammonium p-toluene sulfonate, triethylbenzylammonium p-toluene sulfonate, tri-n-butyl-n-octylammonium p-toluene sulfonate, tri-n-butylbenzylammonium p-toluene sulfonate, methyltriphenylammonium p-toluene sulfonate, ethyltriphenylammonium p-toluene sulfonate, n-butyltriphenylammonium p-toluene sulfonate, trimethylcetylammonium p-toluene sulfonate, trimethylstearylammonium p-toluene sulfonate, dimethylethylcetylammonium p-toluene sulfonate, dimethyldidecylammonium p-toluene sulfonate, dimethyl di-n-dodecylammonium p-toluene sulfonate, dimethyldistearylammonium, n-octyldimethylbenzylammonium p-toluene sulfonate, n-dodecyldimethylbenzylammonium p-toluene sulfonate, stearyldimethylbenzylammonium p-toluene sulfonate, triethyl-n-dodecylammonium p-toluene sulfonate, tri-n-hexylmethylammonium p-toluene sulfonate, tri-n-octylmethylammonium p-toluene sulfonate, tri-n-decylmethylammonium p-toluene sulfonate, tri-n-dodecylmethylammonium p-toluene sulfonate, tri-n-octyl-n-dodecylammonium p-toluene sulfonate, diethyldicyclohexylammonium p-toluene sulfonate, tetramethylammonium dodecylbenzene sulfonate, tetraethylammonium dodecylbenzene sulfonate, tetrapropylammonium dodecylbenzene sulfonate, tetrabutylammonium dodecylbenzene sulfonate, tetrahexylammonium dodecylbenzene sulfonate, tetraoctylammonium dodecylbenzene sulfonate, trimethyloctylammonium dodecylbenzene sulfonate, trimethylphenylammonium dodecylbenzene sulfonate, trimethylbenzylammonium dodecylbenzene sulfonate, triethyl-n-octylammonium dodecylbenzene sulfonate, triethylbenzylammonium dodecylbenzene sulfonate, tri-n-butyl-n-octylammonium dodecylbenzene sulfonate, tri-n-butylbenzylammonium dodecylbenzene sulfonate, methyltriphenylammonium dodecylbenzene sulfonate, ethyltriphenylammonium dodecylbenzene sulfonate, n-butyltriphenylammonium dodecylbenzene sulfonate, trimethylcetylammonium dodecylbenzene sulfonate, trimethylstearylammonium dodecylbenzene sulfonate, dimethylethylcetylammonium dodecylbenzene sulfonate, dimethyldidecylammonium dodecylbenzene sulfonate, dimethyl di-n-dodecylammonium dodecylbenzene sulfonate, dimethyldistearylammonium, n-octyldimethylbenzylammonium dodecylbenzene sulfonate, n-dodecyldimethylbenzylammonium dodecylbenzene sulfonate, stearyldimethylbenzylammonium dodecylbenzene sulfonate, triethyl-n-dodecylammonium dodecylbenzene sulfonate, tri-n-hexylmethylammoniumdodecylbenzene sulfonate, tri-n-octylmethylammonium dodecylbenzene sulfonate, tri-n-decylmethylammonium dodecylbenzene sulfonate, tri-n-dodecylmethylammonium dodecylbenzene sulfonate, tri-n-octyl-n-dodecylammonium dodecylbenzene sulfonate, diethyldicyclohexylammonium dodecylbenzene sulfonate, and the like, but are not limited to these exemplified compounds.

As the compound (a4) represented by the general formula (4), it is preferable to use one or two or more kinds selected from the group consisting of tetramethylammonium sulfonates, tetraethylammonium sulfonates, tetrapropylammonium sulfonates, tetrabutylammonium sulfonates, trioctylmethylammonium sulfonates, and tributylbenzylammonium sulfonates, it is more preferable to use tetrabutylammonium sulfonates, and it is particularly preferable to use tetrabutylammonium methane sulfonate.

Furthermore, in the present embodiment, the ratio of the zinc compound (a1) and the compound (a4) represented by the general formula (4) to be used is not particularly limited, and any mixing ratio may be available. However, the molar ratio of the compound (a4) represented by the general formula (4) to the zinc compound (a1) is preferably in the range 0.1 to 1000, more preferably in the range 0.5 to 500, and particularly preferably in the range 0.5 to 50. If the molar ratio of the compound (a4) represented by the general formula (4) to the zinc compound (a1) is in the above-described range, a sufficient polymerization speed at a low temperature is obtained, and thus, the elution from the tape used in a mold is suppressed, whereby a molded product having a desired shape can be obtained even when the heat resistance is low. Moreover, a sufficient catalytic activity is also obtained at a high temperature, and thus, a resin having high heat resistance and high transparency is obtained.

When the zinc compound (a1) and the compound (a4) represented by the general formula (4) are used in combination, the amount of these compounds to be used may be such that a total amount of the zinc compound (a1) and the compound (a4) represented by the general formula (4) is preferably in the range 0.0005 to 5 parts by weight, more preferably in the range 0.0010 to 3 parts by weight, and particularly preferably in the range 0.0010 to 2 parts by weight, based on 100 parts by weight of the total amount of at least one isocyanate (B) selected from the group consisting of an isocyanate compound and an isothiocyanate compound and the active hydrogen compounds (C) having one or more mercapto groups. The amounts of these used can be appropriately determined depending on the type of catalysts, the type of monomers to be used (the compound (B), the compound (C), a resin modifier as described later, and the like), the type and amount of additives used, and the shape of molded products.

(Polymerizable Composition for Polythiourethane Optical Material)

The polymerizable composition for a polythiourethane optical material of the present embodiment includes:

(A) a polymerization catalyst for a polythiourethane optical material, (B) at least one compound selected from an isocyanate compound and an isothiocyanate compound, and (C) a compound containing one or more mercapto groups.

Hereinbelow, the polymerizable composition for a polythiourethane optical material, including the polymerization catalyst for a polythiourethane optical material according to the first embodiment will be described as the "first embodiment", and the polymerizable composition for a polythiourethane optical material, including the polymerization catalyst for a polythiourethane optical material according to the second embodiment will be described as the "second embodiment".

Polymerizable Composition for Polythiourethane Optical Material

First Embodiment

The polymerizable composition for a polythiourethane optical material of the present embodiment includes the polymerization catalyst for a polythiourethane optical material according to the first embodiment (A) and monomers. The monomers include at least one compound (B) selected from an isocyanate compound and an isothiocyanate compound (hereinafter sometimes referred to as an "isocyanates (B)") and a compound (C) containing one or more mercapto groups (hereinafter sometimes referred to as an "active hydrogen compounds (C)").

The method for adding the catalyst into the monomers is not particularly limited, and the zinc compound (a1), the compound (a2) represented by the general formula (1), and the sulfonic acid (a3) represented by the general formula (2) may be appropriately added to the monomers, resin modifiers, or the like to be used.

For example, there can be mentioned a method including adding each of the zinc compound (a1), the compound (a2) represented by the general formula (1) and the sulfonic acid (a3) represented by the general formula (2), a mixture of the zinc compound (a1), the compound (a2) represented by the general formula (1), and the sulfonic acid (a3) represented by the general formula (2), or the zinc compound (a1), a mixture of each of the compound (a2) represented by the general formula (1), and the sulfonic acid (a3) represented by the general formula (2), to each of the isocyanates (B), the active hydrogen compounds (C), and a resin modifier such as a hydroxy compound and the like, to a mixture of the isocyanates (B) and the active hydrogen compounds (C), to a mixture of the isocyanates (B) and a resin modifier such as a hydroxy compound and the like, to a mixture of the active hydrogen compounds (C) and a resin modifier such as a hydroxy compound and the like, or to a mixture of the isocyanates (B), the active hydrogen compounds (C), and a resin modifier such as a hydroxy compound and the like, but are not limited to these exemplified methods. It may be properly selected depending on the solubility, operability, safety, expediency, or the like of the catalyst.

The polymerizable composition for a polythiourethane optical material of the present embodiment includes at least one compound (B) selected from an isocyanate compound and an isothiocyanate compound, and the compound (C) containing one or more mercapto groups as main ingredients. However, for the purpose of modification of the polythiourethane resin, a hydroxy compound may further be added.

In the present embodiment, specific examples of preferred isocyanate compound which is used as a raw material for the polythiourethane resin include monofunctional isocyanate compounds such as methyl isocyanate, ethyl isocyanate, n-propyl isocyanate, isopropyl isocyanate, n-butyl isocyanate, sec-butyl isocyanate, tert-butyl isocyanate, pentyl isocyanate, hexyl isocyanate, heptyl isocyanate, octyl isocyanate, decyl isocyanate, lauryl isocyanate, myristyl isocyanate, octadecyl isocyanate, 3-pentyl isocyanate, 2-ethylhexyl isocyanate, 2,3-dimethylcyclohexyl isocyanate, 2-methoxyphenyl isocyanatecyanate, 4-methoxyphenyl isocyanate, α-methylbenzyl isocyanate, phenylethyl isocyanate, phenyl isocyanate, o-, m-, p-tolyl isocyanate, cyclohexyl isocyanate, benzyl isocyanate, isocyanatomethyl bicycloheptane, and the like, aliphatic polyisocyanate compounds such as hexamethylene diisocyanate, 2,2-dimethyl pentane diisocyanate, 2,2,4-trimethyl hexane diisocyanate, butene diisocyanate, 1,3-butadiene-1,4-diisocyanate, 2,4,4-trimethylhexamethylene diisocyanate, 1,6,11-undecatriisocyanate, 1,3,6-hexamethylene triisocyanate, 1,8-diisocyanato-4-isocyanatomethyloctane, bis(isocyanatoethyl)carbonate, bis(isocyanatoethyl) ether, lysine diisocyanatomethyl ester, lysine triisocyanate, and the like, alicyclic polyisocyanate compounds such as isophorone diisocyanate, 1,3-bis(isocyanatomethyl)cyclohexane, 1,4-bis(isocyanatomethyl)cyclohexane, dicyclohexylmethane diisocyanate, cyclohexane diisocyanate, methylcyclohexane diisocyanate, dicyclohexyldimethylmethaneisocyanate, 2,2-dimethyldicyclohexylmethaneisocyanate, 2,5-bis(isocyanatomethyl)bicyclo[2,2,1]-heptane, 2,6-bis(isocyanatomethyl)bicyclo[2,2,1]-heptane, 3,8-bis(isocyanatomethyl)tricyclodecane, 3,9-bis(isocyanatomethyl)tricyclodecane, 4,8-bis(isocyanatomethyl)tricyclodecane, 4,9-bis(isocyanatomethyl)tricyclodecane, and the like, aromatic polyisocyanate compounds such as o-xylylene diisocyanate, p-xylylene diisocyanate, m-xylylene diisocyanate, bis(isocyanatoethyl)benzene, bis(isocyanatopropyl)benzene, α,α,α',α'-tetramethyl xylylene diisocyanate, bis(isocyanatobutyl)benzene, bis(isocyanatomethyl) naphthalene, bis(isocyanatomethyl)diphenyl ether, phenylene diisocyanate, tolylene diisocyanate, ethylphenylene diisocyanate, isopropylphenylene diisocyanate, dimethylphenylene diisocyanate, diethylphenylene diisocyanate, diisopropylphenylene diisocyanate, trimethylbenzenetriisocyanate, benzenetriisocyanate, biphenyldiisocyanate, toluidine diisocyanate, 4,4-diphenylmethane diisocyanate, 3,3-dimethyldiphenylmethane-4,4-diisocyanate, bibenzyl-4,4-diisocyanate, bis(isocyanatophenyl)ethylene, 3,3-dimethoxybiphenyl-4,4-diisocyanate, phenyl isocyanatoethyl isocyanate, hexahydrobenzene diisocyanate, hexahydrodiphenylmethane-4,4-diisocyanate, bis(isocyanatoethyl)phthalate, mesitylylene triisocyanate, 2,6-di(isocyanatomethyl)furan, and the like, sulfur-containing aliphatic polyisocyanate compounds such as bis(isocyanatoethyl)sulfide, bis(isocyanatopropyl)sulfide, bis(isocyanatohexyl)sulfide, bis(isocyanatomethyl)sulfone, bis(isocyanatomethyl)disulfide, bis(isocyanatopropyl)disulfide, bis(isocyanatomethylthio)methane, bis(isocyanatoethylthio)methane, bis(isocyanatoethylthio)ethane, bis(isocyanatomethylthio)ethane, 1,5-diisocyanato-2-isocyanatomethyl-3-thiapentane, and the like, sulfur-containing aromatic polyisocyanate compounds such as diphenyl sulfide-2,4-diisocyanate, diphenyl sulfide-4,4-diisocyanate, 3,3-dimethoxy-4,4-diisocyanatodibenzyl thioether, bis(4-isocyanatomethyl benzene)sulfide, 4,4-methoxy benzene thio ethylene glycol-3,3-diisocyanate, diphenyldisulfide 4,4-diisocyanate, 2,2-dimethyldiphenyldisulfide 5,5-diisocyanate, 3,3-dimethyldiphenyldisulfide 5,5-diisocyanate, 3,3-dimethyldiphenyldisulfide 6,6-diisocyanate, 4,4-dimethyldiphenyldisulfide 5,5-diisocyanate, 3,3-dimethoxydiphenyldisulfide 4,4-diisocyanate, 4,4-dimethoxydiphenyldisulfide 3,3-diisocyanate, and the like, sulfur-containing heterocyclic polyisocyanate compounds such as 2,5-diisocyanatothiophene, 2,5-bis(isocyanatomethyl)thiophene, 2,5-diisocyanatotetrahydrothiophene, 2,5-bis(isocyanatomethyl)tetrahydrothiophene, 3,4-bis(isocyanatomethyl)tetrahydrothiophene, 2,5-diisocyanato-1,4-dithiane, 2,5-bis(isocyanatomethyl)-1,4-dithiane, 4,5-diisocyanato-1,3-dithiolane, 4,5-bis(isocyanatomethyl)-1,3-dithiolane, 4,5-bis(isocyanatomethyl)-2-methyl-1,3-dithiolane, and the like, and others, but are not limited to these exemplified compounds.

Their halogen substituted compounds such as chlorine substituted compounds, bromine substituted compounds, and the like, alkyl substituted compounds, alkoxy substituted compounds, nitro substituted compounds, prepolymer type modified products modified with polyhydric alcohols, carbodiimide modified products, urea modified products, biuret modified products, dimerization or trimerization reaction products, or the like may be employed. These isocyanate compounds may be used singly or in combination of two or more kinds thereof.

In the present embodiment, an isothiocyanate compound which is used as a raw material of the polythiourethane resin is selected from an isothiocyanate compound and an isothiocyanate compound having an isocyanate group.

Specific examples of preferable examples of the isothiocyanate compound used in the present embodiment include monofunctional isothiocyanate compounds such as methyl isothiocyanate, ethyl isothiocyanate, n-propyl isothiocyanate, isopropyl isothiocyanate, n-butyl isothiocyanate, sec-butyl isothiocyanate, tert-butyl isothiocyanate, pentyl isothiocyanate, hexyl isothiocyanate, heptyl isothiocyanate, octyl isothiocyanate, decyl isothiocyanate, lauryl isothiocyanate, myristyl isothiocyanate, octadecyl isothiocyanate, 3-pentyl isothiocyanate, 2-ethylhexyl isothiocyanate, 2,3-dimethylcyclohexyl isothiocyanate, 2-methoxyphenyl isothiocyanate, 4-methoxyphenyl isothiocyanate, α-methylbenzyl isothiocyanate, phenylethyl isothiocyanate, phenyl isothiocyanate, o-, m-, p-tolylisothiocyanate, cyclohexyl isothiocyanate, benzyl isothiocyanate, isothiocyanatomethylbicycloheptane, and the like, aliphatic polyisothiocyanate compounds such as hexamethylene diisothiocyanate, 2,2-dimethylpentane diisothiocyanate, 2,2,4-trimethylhexane diisothiocyanate, butene diisothiocyanate, 1,3-butadiene-1,4-diisothiocyanate, 2,4,4-trimethylhexamethylene diisothiocyanate, 1,6,11-undecatriisothiocyanate, 1,3,6-hexamethylenetriisothiocyanate, 1,8-diisothiocyanato-4-isothiocyanatemethyloctane, bis(isothiocyanatoethyl)carbonate, bis(isothiocyanatoethyl) ether, lysine diisothiocyanatomethylester, lysine triisothiocyanate, xylylene diisothiocyanate, bis(isothiocyanatoethyl)benzene, bis(isothiocyanatopropyl)benzene, α,α,α',α'-tetramethylxylylene diisothiocyanate, bis(isothiocyanatobutyl)benzene, bis(isothiocyanatomethyl)naphthalene, bis(isothiocyanatomethyl)diphenyl ether, bis(isothiocyanatoethyl)phthalate, mesitylylene triisothiocyanate, 2,6-di(isothiocyanatomethyl)furan, and the like, alicyclic polyisothiocyanate compounds such as isophorone diisothiocyanate, bis(isothiocyanatomethyl)cyclohexane, dicyclohexylmethane diisothiocyanate, cyclohexane diisothiocyanate, methylcyclohexane diisothiocyanate, dicyclohexyldimethylmethaneisothiocyanate, 2,2-dimethyldicyclohexylmethaneisothiocyanate, 2,5-bis(isothiocyanatomethyl)bicyclo[2,2,1]-heptane, 2,6-bis(isothiocyanatomethyl)bicyclo[2,2,1]-heptane, 3,8-bis(isothiocyanatomethyl)tricyclodecane, 3,9-bis(isothiocyanatomethyl)tricyclodecane, 4,8-bis(isothiocyanatomethyl)tricyclodecane, 4,9-bis(isothiocyanatomethyl)tricyclodecane, and the like, aromatic polyisothiocyanate compounds such as phenylene diisothiocyanate, tolylene diisothiocyanate, ethylphenylene diisothiocyanate, isopropylphenylene diisothiocyanate, dimethylphenylene diisothiocyanate, diethylphenylene diisothiocyanate, diisothiopropylphenylene diisothiocyanate, trimethylbenzenetriisothiocyanate, benzenetriisothiocyanate, biphenyldiisothiocyanate, toluidine diisothiocyanate, 4,4-diphenylmethane diisothiocyanate, 3,3-dimethyldiphenylmethane-4,4-diisothiocyanate, bibenzyl-4,4-diisothiocyanate, bis(isothiocyanatophenyl)ethylene, 3,3-dimethoxybiphenyl 4,4-diisothiocyanate, phenyl isothiocyanatoethyl isothiocyanate, hexahydrobenzene diisothiocyanate, hexahydrodiphenylmethane-4,4-diisothiocyanate, and the like, sulfur-containing aliphatic polyisothiocyanate compounds such as bis(isothiocyanatoethyl)sulfide, bis(isothiocyanatopropyl)sulfide, bis(isothiocyanatohexyl)sulfide, bis(isothiocyanatomethyl)sulfone, bis(isothiocyanatomethyl)disulfide, bis(isothiocyanatopropyl)disulfide, bis(isothiocyanatomethylthio)methane, bis(isothiocyanatoethylthio)methane, bis(isothiocyanatoethylthio)ethane, bis(isothiocyanatomethylthio)ethane, 1,5-diisothiocyanato-2-isothiocyanatomethyl 3-thiopentane, and the like, sulfur-containing aromatic polyisothiocyanate compounds such as diphenyl sulfide-2,4-diisothiocyanate, diphenyl sulfide-4,4-diisothiocyanate, 3,3-dimethoxy-4,4-diisothiocyanatodibenzyl thioether, bis(4-isothiocyanatomethylbenzene)sulfide, 4,4-methoxy benzene thio ethylene glycol-3,3-diisothiocyanate, diphenyldisulfide 4,4-diisothiocyanate, 2,2-dimethyldiphenyldisulfide 5,5-diisothiocyanate, 3,3-dimethyldiphenyldisulfide 5,5-diisothiocyanate, 3,3-dimethyldiphenyldisulfide 6,6-diisothiocyanate, 4,4-dimethyldiphenyldisulfide 5,5-diisothiocyanate, 3,3-dimethoxydiphenyldisulfide 4,4-diisothiocyanate, 4,4-dimethoxydiphenyldisulfide 3,3-diisothiocyanate, and the like, sulfur-containing heterocyclic polyisothiocyanate compounds such as 2,5-diisothiocyanatothiophene, 2,5-bis(isothiocyanatomethyl)thiophene, 2,5-diisothiocyanatotetrahydrothiophene, 2,5-bis(isothiocyanatomethyl)tetrahydrothiophene, 3,4-bis(isothiocyanatomethyl)tetrahydrothiophene, 2,5-diisothiocyanato-1,4-dithiane, 2,5-bis(isothiocyanatomethyl)-1,4-dithiane, 4,5-diisothiocyanato-1,3-dithiolane, 4,5-bis(isothiocyanatomethyl)-1,3-dithiolane, 4,5-bis(isothiocyanatomethyl)-2-methyl-1,3-dithiolane, and the like, and others, but are not limited to these exemplified compounds.

Their halogen substituted compounds such as chlorine substituted compounds, bromine substituted compounds, and the like, alkyl substituted compounds, alkoxy substituted compounds, nitro substituted compounds, prepolymer type modified products modified with polyhydric alcohols, carbodiimide modified products, urea modified products, biuret modified products, dimerization or trimerization reaction products, or the like may be employed. These isothiocyanate compounds may be used singly or in combination of two or more kinds thereof.

Examples of the isothiocyanate compound having an isocyanate group which is used as a raw material in the present embodiment include aliphatic or alicyclic compounds such as 1-isocyanato-3-isothiocyanatopropane, 1-isocyanato-5-isothiocyanatopentane, 1-isocyanato-6-isothiocyanatohexane, isocyanatocarbonyl isothiocyanate, 1-isocyanato-4-isothiocyanatocyclohexane, and the like, aromatic compounds such as 1-isocyanato-4-isothiocyanatobenzene, 4-methyl-3-isocyanato-1-isothiocyanatobenzene and the like; heterocyclic compounds such as 2-isocyanato-4,5-diisothiocyanato-1,3,5-triazine, and the like, isothiocyanato groups such as 4-isocyanato-4'-isothiocyanato diphenylsulfide, 2-isocyanato-2'-isothiocyanatodiethyl disulfide, and the like, and their sulfur-substituted compounds.

Furthermore, their halogen substituted compounds such as chlorine substituted compounds, bromine substituted compounds or the like, alkyl substituted compounds, alkoxy substituted compounds, nitro substituted compounds, prepolymer type modified products modified with polyhydric alcohols, carbodiimide modified products, urea modified products, biuret modified products, dimerization or trimerization reaction products or the like may be employed.

These isocyanates may be each used singly, or as a mixture of two or more kinds thereof. As isocyanates, more preferred are m-xylylene diisocyanate, 2,5-bis(isocyanatomethyl)-bicyclo[2.2.1]heptane, 2,6-bis(isocyanatomethyl)-bicyclo[2.2.1]heptane, 1,3-bis(isocyanatomethyl)cyclohexane, 1,4-bis(isocyanatomethyl)cyclohexane, and hexamethylene diisocyanate, and particularly preferred are m-xylylene diisocyanate, 2,5-bis(isocyanatomethyl)-bicyclo[2.2.1]heptane, and 2,6-bis(isocyanatomethyl)-bicyclo[2.2.1]heptane.

The compound (C) containing one or more mercapto groups (active hydrogen compounds (C)) which is used as a raw material of the polythiourethane resin of the present embodiment is selected from a mercapto compound and a polyvalent mercapto compound having a hydroxy group.

Examples of the mercapto compound used in the present embodiment include aliphatic polythiol compounds such as methanedithiol, 1,2-ethanedithiol, 1,1-propanedithiol, 1,2-propanedithiol, 1,3-propanedithiol, 2,2-propanedithiol, 1,4-butanedithiol, 2,3-butanedithiol, 1,5-pentanedithiol, 1,6-hexanedithiol, 1,2,3-propanetrithiol, 1,1-cyclohexanedithiol, 1,2-cyclohexanedithiol, 2,2-dimethylpropane-1,3-dithiol, 3,4-dimethoxybutane-1,2-dithiol, 2-methylcyclohexane-2,3-dithiol, 1,1-bis(mercaptomethyl)cyclohexane, 1,2-dimercaptopropylmethyl ether, 2,3-dimercaptopropylmethyl ether, 2,2-bis(mercaptomethyl)-1,3-propanedithiol, bis(2-mercaptoethyl)ether, tetrakis(mercaptomethyl)methane, and the like, ester bond-containing aliphatic polythiol compounds such as 2,3-dimercaptosuccinic acid (2-mercaptoethyl ester), thiomalic acid bis(2-mercaptoethyl ester), 2,3-dimercapto-1-propanol(2-mercaptoacetate), 2,3-dimercapto-1-propanol(3-mercaptopropionate), 3-mercapto-1,2-propanediol bis(2-mercaptoacetate), 3-mercapto-1,2-propanediol bis(3-mercaptopropionate), diethylene glycol bis(2-mercaptoacetate), diethylene glycol bis(3-mercaptopropionate), ethylene glycol bis(2-mercaptoacetate), ethylene glycol bis(3-mercaptopropionate), trimethylolpropane tris(2-mercaptoacetate), trimethylolpropane tris(3-mercaptopropionate), trimethylolethane tris(2-mercaptoacetate), trimethylolethane tris(3-mercaptopropionate), pentaerythritol tetrakis(2-mercaptoacetate), pentaerythritol tetrakis(3-mercaptopropionate), glycerine tris(2-mercaptoacetate), glycerine tris(3-mercaptopropionate), 1,4-cyclohexanediol bis(2-mercaptoacetate), 1,4-cyclohexanediol bis(3-mercaptopropionate), and the like aromatic polythiol compounds such as 1,2-dimercaptobenzene, 1,3-dimercaptobenzene, 1,4-dimercaptobenzene, 1,2-bis(mercaptomethyl)benzene, 1,3-bis(mercaptomethyl)benzene, 1,4-bis(mercaptomethyl)benzene, 1,2-bis(mercaptoethyl)benzene, 1,3-bis(mercaptoethyl)benzene, 1,4-bis(mercaptoethyl)benzene, 1,2-bis(mercaptomethyleneoxy)benzene, 1,3-bis(mercaptomethyleneoxy)benzene, 1,4-bis(mercaptomethyleneoxy)benzene, 1,2-bis(mercaptoethyleneoxy)benzene, 1,3-bis(mercaptoethyleneoxy)benzene, 1,4-bis(mercaptoethyleneoxy)benzene, 1,2,3-trimercaptobenzene, 1,2,4-trimercaptobenzene, 1,3,5-trimercaptobenzene, 1,2,3-tris(mercaptomethyl)benzene, 1,2,4-tris(mercaptomethyl)benzene, 1,3,5-tris(mercaptomethyl)benzene, 1,2,3-tris(mercaptoethyl)benzene, 1,2,4-tris(mercaptoethyl)benzene, 1,3,5-tris(mercaptoethyl)benzene, 1,2,3-tris(mercaptomethyleneoxy)benzene, 1,2,4-tris(mercaptomethyleneoxy)benzene, 1,3,5-tris(mercaptomethyleneoxy)benzene, 1,2,3-tris(mercaptoethyleneoxy)benzene, 1,2,4-tris(mercaptoethyleneoxy)benzene, 1,3,5-tris(mercaptoethyleneoxy)benzene, 2,5-toluenedithiol, 3,4-toluenedithiol, 1,3-di(p-methoxyphenyl)propane-2,2-dithiol, 1,3-diphenylpropane-2,2-dithiol, phenylmethane-1,1-dithiol, 2,4-di(p-mercaptophenyl)pentane, 1,4-naphthalenedithiol, 1,5-naphthalenedithiol, 2,6-naphthalenedithiol, 2,7-naphthalenedithiol, 2,4-dimethylbenzene-1,3-dithiol, 4,5-dimethylbenzene-1,3-dithiol, 9,10-anthracenedimethanethiol, 1,2,3,4-tetramercaptobenzene, 1,2,3,5-tetramercaptobenzene, 1,2,4,5-tetramercaptobenzene, 1,2,3,4-tetrakis(mercaptomethyl)benzene, 1,2,3,5-tetrakis(mercaptomethyl)benzene, 1,2,4,5-tetrakis(mercaptomethyl)benzene, 1,2,3,4-tetrakis(mercaptoethyl)benzene, 1,2,3,5-tetrakis(mercaptoethyl)benzene, 1,2,4,5-tetrakis(mercaptoethyl)benzene, 1,2,3,4-tetrakis(mercaptomethyleneoxy)benzene, 1,2,3,5-tetrakis(mercaptomethyleneoxy)benzene, 1,2,4,5-tetrakis(mercaptomethyleneoxy)benzene, 1,2,3,4-tetrakis(mercaptoethyleneoxy)benzene, 1,2,3,5-tetrakis(mercaptoethyleneoxy)benzene, 1,2,4,5-tetrakis(mercaptoethyleneoxy)benzene, 2,2'-dimercaptobiphenyl, 4,4'-dimercaptobiphenyl, 4,4'-dimercaptobibenzyl, 2,5-dichlorobenzene-1,3-dithiol, 1,3-di(p-chlorophenyl)propane-2,2-dithiol, 3,4,5-tribromo-1,2-dimercaptobenzene, 2,3,4,6-tetrachloro-1,5-bis(mercaptomethyl)benzene, and the like, heterocyclic thiol compounds such as 2-methylamino-4,6-dithiol-sym-triazine, 2-ethylamino-4,6-dithiol-sym-triazine, 2-amino-4,6-dithiol-sym-triazine, 2-morpholino-4,6-dithiol-sym-triazine, 2-cyclohexylamino-4,6-dithiol-sym-triazine, 2-methoxy-4,6-dithiol-sym-triazine, 2-phenoxy-4,6-dithiol-sym-triazine, 2-thiobenzeneoxy-4,6-dithiol-sym-triazine, 2-thiobutyloxy-4,6-dithiol-sym-triazine, and the like, halogen substituted compounds thereof, and the like, but are not limited to these exemplified compounds.

Furthermore, their halogen substituted compounds such as chlorine substituted compounds, bromine substituted compounds, and the like may be employed. These mercapto compounds may be used singly or in combination of two or more kinds thereof.

Examples of the mercapto compound having one or more sulfide bonds in one molecule include aliphatic polythiol compounds such as bis(mercaptomethyl)sulfide, bis(mercaptomethyl)disulfide, bis(mercaptoethyl)sulfide, bis(mercaptoethyl)disulfide, bis(mercaptopropyl)sulfide, bis(mercaptomethylthio)methane, bis(2-mercaptoethylthio)methane, bis(3-mercaptopropylthio)methane, 1,2-bis(mercaptomethylthio)ethane, 1,2-bis(2-mercaptoethylthio)ethane, 1,2-bis(3-mercaptopropylthio)ethane, 1,3-bis(mercaptomethylthio)propane, 1,3-bis(2-mercaptoethylthio)propane, 1,3-bis(3-mercaptopropylthio)propane, 1,2,3-tris(mercaptomethylthio)propane, 1,2,3-tris(2-mercaptoethylthio)propane, 1,2,3-tris(3-mercaptopropylthio)propane, 4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, tetrakis(mercaptomethylthiomethyl)methane, tetrakis(2-mercaptoethylthiomethyl)methane, tetrakis(3-mercaptopropylthiomethyl)methane, bis(2,3-dimercaptopropyl)sulfide, 2,5-dimercapto-1,4-dithiane, 2,5-dimercaptomethyl-2,5-dimethyl-1,4-dithiane, and the like, thioglycolic acid ester and mercaptopropionic acid ester thereof, ester bond-containing aliphatic polythiols such as hydroxymethylsulfide bis(2-mercaptoacetate), hydroxymethylsulfide bis(3-mercaptopropionate), hydroxyethylsulfide bis(2-mercaptoacetate), hydroxyethylsulfide bis(3-mercaptopropionate), hydroxypropylsulfide bis(2-mercaptoacetate), hydroxypropylsulfide bis(3-mercaptopropionate), hydroxymethyldisulfide bis(2-mercaptoacetate), hydroxymethyldisulfide bis(3-mercaptopropionate), hydroxyethyldisulfide bis(2-mercaptoacetate), hydroxyethyldisulfide bis(3-mercaptopropionate), hydroxypropyldisulfide bis(2-mercaptoacetate), hydroxypropyldisulfide bis(3-mercaptopropionate), 2-mercaptoethyl ether bis(2-mercaptoacetate), 2-mercaptoethyl ether bis(3-mercaptopropionate), 1,4-dithiane-2,5-diol bis(3-mercaptopropionate), thiodiglycolic acid bis(2-mercaptoethyl ester), thiodipropionic acid bis(2-mercaptoethyl ester), 4,4-thiodibutyric acid bis(2-mercaptoethyl ester), dithiodiglycolic acid bis(2-mercaptoethyl ester), dithiodipropionic acid bis(2-mercaptoethyl ester), 4,4-dithiodibutyric acid bis(2-mercaptoethyl ester), thiodiglycolic acid bis(2,3-dimercaptopropyl ester), thiodipropionic acid bis(2,3-dimercaptopropyl ester), dithiodiglycolic acid bis(2,3-dimercaptopropyl ester), thiodipropionic acid bis(2,3- dimercaptopropyl ester), dithiodipropionic acid bis(2,3-dimercaptopropyl ester), and the like, heterocyclic polythiol compounds such as 3,4-thiophenedithiol, bismuthiol, and the like, 1,1,3,3-tetrakis(mercaptomethylthio)propane, 1,1,2,2-tetrakis(mercaptomethylthio)ethane, 4,6-bis(mercaptomethylthio)-1,3-dithiane, 1,1,5,5-tetrakis(mercaptomethylthio)-3-thiapentane, 1,1,6,6-tetrakis(mercaptomethylthio)-3,4-dithiahexane, 2,2-bis(mercaptomethylthio)ethanethiol, 2-(4,5-dimercapto-2-thiapentyl)-1,3-dithiacyclopentane, 2,5-bis(4,4-bis(mercaptomethylthio)-2-thiabutyl)-1,4-dithiane, 2,2-bis(mercaptomethylthio)-1,3-propanedithiol, 3-mercaptomethylthio-1,7-dimercapto-2,6-dithiaheptane, 3,6-bis(mercaptomethylthio)-1,9-dimercapto-2,5,8-trithianonane, 3-mercaptomethylthio-1,6-dimercapto-2,5-dithiahexane, 2-(2,2-bis(mercaptodimethylthio)ethyl)-1,3-dithietane, 1,1,9,9-tetrakis(mercaptomethylthio)-5-(3,3-bis(mercaptomethylthio)-1-thiapropyl)-3,7-dithianonane, tris(2,2-bis(mercaptomethylthio)ethyl)methane, tris(4,4-bis(mercaptomethylthio)-2-thiabutyl)methane, tetrakis(2,2-bis(mercaptomethylthio)ethyl)methane, tetrakis(4,4-bis(mercaptomethylthio)-2-thiabutyl)methane, 3,5,9,11-tetrakis(mercaptomethylthio)-1,13-dimercapto-2,6,8,12-tetrathiamidecane, 3,5,9,11,15,17-hexakis(mercaptomethylthio)-1,19-dimercapto-2,6,8,12,14,18-hexathianonadecane, 9-(2,2-bis(mercaptomethylthio)ethyl)-3,5,13,15-tetrakis(mercapto methylthio)-1,17-dimercapto-2,6,8,10,12,16-hexathiaheptadecane, 3,4,8,9-tetrakis(mercaptomethylthio)-1,1'-dimercapto-2,5,7,10-tetrathiaundecane, 3,4,8,9,13,14-hexakis(mercaptomethylthio)-1,16-dimercapto-2,5,7,10,12,15-hexathiahexadecane, 8-[bis(mercaptomethylthio)methyl]-3,4,12,13-tetrakis(mercaptomethylthio)-1,15-dimercapto-2,5,7,9,11,14-hexathiapentadecane, 4,6-bis[3,5-bis(mercaptomethylthio)-7-mercapto-2,6-dithiaheptylthio]-1,3-dithiane, 4-[3,5-bis(mercaptomethylthio)-7-mercapto-2,6-dithiaheptylthio]-6-mercaptomethylthio-1,3-dithiane, 1,1-bis[4-(6-mercaptomethylthio)-1,3-dithianylthio]-1,3-bis(mercaptomethylthio)propane, 1-[4-(6-mercaptomethylthio)-1,3-dithianylthio]-3-[2,2-bis(mercaptomethylthio)ethyl]-7,9-bis(mercaptomethylthio)-2,4,6,10-tetrathiaundecane, 1,5-bis[4-(6-mercaptomethylthio)-1,3-dithianylthio]-3-[2-(1,3-dithietanyl)]methyl-2,4-dithiapentane, 4,6-bis{3-[2-(1,3-dithietanyl)]methyl-5-mercapto-2,4-dithiapentylthio}-1,3-dithiane, 4,6-bis[4-(6-mercaptomethylthio)-1,3-dithianylthio]-6-[4-(6-mercaptomethylthio)-1,3-dithianylthio]-1,3-dithiane, 3-[2-(1,3-dithietanyl)]methyl-7,9-bis(mercaptomethylthio)-1,11-dimercapto-2,4,6,10-tetrathiaundecane, 9-[2-(1,3-dithietanyl)]methyl-3,5,13,15-tetrakis(mercaptomethylthio)-1,17-dimercapto-2,6,8,10,12,16-hexathiaheptadecane, 3-[2-(1,3-dithietanyl)]methyl-7,9,13,15-tetrakis(mercaptomethylthio)-1,17-dimercapto-2,4,6,10,12,16-hexathiaheptadecane, 3,7-bis[2-(1,3-dithietanyl)]methyl-1,9-dimercapto-2,4,6,8-tetrathianonane, 4-[3,4,8,9-tetrakis(mercaptomethylthio)-11-mercapto-2,5,7,10-tetrathiaundecyl]-5-mercaptomethylthio-1,3-dithiolane, 4,5-bis[3,4-bis(mercaptomethylthio)-6-mercapto-2,5-dithiahexylthio]-1,3-dithiolane, 4-[3,4-bis(mercaptomethylthio)-6-mercapto-2,5-dithiahexylthio]-5-mercaptomethylthio-1,3-dithiolane, 4-[3-bis(mercaptomethylthio)methyl-5,6-bis(mercaptomethylthio)-8-mercapto-2,4,7-trithiaoctyl]-5-mercaptomethylthio-1,3-dithiolane, 2-{bis[3,4-bis(mercaptomethylthio)-6-mercapto-2,5-dithiahexylthio]methyl}-1,3-dithietane, 2-[3,4-bis(mercaptomethylthio)-6-mercapto-2,5-dithiahexylthio]mercaptomethylthiomethyl-1,3-dithietane, 2-[3,4,8,9-tetrakis(mercaptomethylthio)-11-mercapto-2,5,7,10-tetrathiaundecylthio]mercaptomethylthiomethyl-1,3-dithietane, 2-[3-bis(mercaptomethylthio)methyl-5,6-bis(mercaptomethylthio)-8-mercapto-2,4,7-trithiaoctyl]mercaptomethylthiomethyl-1,3-dithietane, 4,5-bis{1-[2-(1,3-dithietanyl)]-3-mercapto-2-thiapropylthio}-1,3-dithiolane, 4-{1-[2-(1,3-dithietanyl)]-3-mercapto-2-thiapropylthio}-5-[1,2-bis(mercaptomethylthio)-4-mercapto-3-thiabutylthio]-1,3-dithiolane, 2-{bis[4-(5-mercaptomethylthio-1,3-dithioranyl)thio]methyl}-1,3-dithietane, 4-[4-(5-mercaptomethylthio-1,3-dithioranyl)thio]-5-{1-[2-(1,3-dithietanyl)]-3-mercapto-2-thiapropylthio}-1,3-dithiolane, and their polythiol compounds having dithioacetal or dithioketal skeletons such as their oligomers, and the like, tris(mercaptomethylthio)methane, tris(mercaptoethylthio)methane, 1,1,5,5-tetrakis(mercaptomethylthio)-2,4-dithiapentane, bis[4,4-bis(mercaptomethylthio)-1,3-dithiabutyl]-(mercaptomethylthio)methane, tris[4,4-bis(mercaptomethylthio)-1,3-dithiabutyl]methane, 2,4,6-tris(mercaptomethylthio)-1,3,5-trithiacyclohexane, 2,4-bis(mercaptomethylthio)-1,3,5-trithiacyclohexane, 1,1,3,3-tetrakis(mercaptomethylthio)-2-thiapropane, bis(mercaptomethyl)methylthio-1,3,5-trithiacyclohexane, tris[(4-mercaptomethyl-2,5-dithiacyclohexyl-1-yl)methylthio]methane, 2,4-bis(mercaptomethylthio)-1,3-dithiacyclopentane, 2-mercaptoethylthio-4-mercaptomethyl-1,3-dithiacyclopentane, 2-(2,3-dimercaptopropylthio)-1,3-dithiacyclopentane, 4-mercaptomethyl-2-(2,3-dimercaptopropylthio)-1,3-dithiacyclopentane, 4-mercaptomethyl-2-(1,3-dimercapto-2-propylthio)-1,3-dithiacylcopentane, tris[2,2-bis(mercaptomethylthio)-2-thiapropyl]methane, tris[4,4-bis(mercaptomethylthio)-3-thiabutyl]methane, 2,4,6-tris[3,3-bis(mercaptomethylthio)-2-thiapropyl]-1,3,5-trithiacyclohexane, tetrakis[3,3-bis(mercaptomethylthio)-2-thiapropyl]methane, and polythiol compounds having ortho trithioformic ester skeletons such as their oligomers and the like, and others, but are not limited to these exemplified compounds. Furthermore, their halogen substituted compounds such as chlorine substituted compounds, bromine substituted compounds, and the like may be employed. These sulfide bond-containing mercapto compounds may be used singly or in combination of two or more kinds thereof.

Furthermore, examples of the hydroxy group-containing mercapto compound include 2-mercaptoethanol, 3-mercapto-1,2-propanediol, glycerine di(mercaptoacetate), 1-hydroxy-4-mercaptocyclohexane, 2,4-dimercaptophenol, 2-mercaptohydroquinone, 4-mercaptophenol, 1,3-dimercapto-2-propanol, 2,3-dimercapto-1-propanol, 1,2-dimercapto-1,3-butanediol, pentaerythritol tris(3-mercaptopropionate), pentaerythritol mono(3-mercaptopropionate), pentaerythritol bis(3-mercaptopropionate), pentaerythritol tris(thioglycolate), pentaerythritol pentakis(3-mercaptopropionate), hydroxymethyl-tris(mercaptoethylthiomethyl)methane, 1-hydroxyethylthio-3-mercaptoethylthiobenzene, 4-hydroxy-4'-mercaptodiphenylsulfone, 2-(2-mercaptoethylthio)ethanol, dihydroxyethylsulfide mono(3-mercaptopropionate), dimercaptoethane mono(salicylate), hydroxyethylthiomethyl-tris(mercaptoethylthio)methane, and the like, but are not limited to these exemplified compounds. Furthermore, their halogen substituted compounds such as chlorine substituted compounds, bromine substituted compounds, and the like may be employed. These mercapto compounds each having a hydroxy group may be used singly or in combination of two or more kinds thereof.

These active hydrogen compounds (C) may be used singly or in combination of two or more kinds thereof. As the active hydrogen compound, preferred are 4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, pentaerythritol tetrakis(3-mercaptopropionate), 1,1,3,3-tetrakis(mercaptomethylthio)propane, 1,1,2,2-tetrakis(mercaptomethylthio)ethane, 4,6-bis(mercaptomethylthio)-1,3-dithiane and 2-(2,2-bis(mercaptodimethylthio)ethyl)-1,3-dithietane, and further preferably used are 4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, and pentaerythritol tetrakis(3-mercaptopropionate).

The polythiourethane resin of the present embodiment contains at least one compound (B) selected from an isocyanate compound and an isothiocyanate compound, and the compound (C) containing one or more mercapto groups as main ingredients. However, for the purpose of modification of the polythiourethane resin, a resin modifier such as a hydroxy compound, an amine compound, an epoxy resin, an organic acid and an anhydride thereof, an olefin compound containing a (meth)acrylate compound, and the like may be added. Herein, the resin modifier refers to a compound for adjusting or improving the physical properties such as a refractive index, an Abbe number, heat resistance, specific gravity, and the like, mechanical strength such as impact resistance and the like, and others of the polythiourethane resin.

Examples of the hydroxy compound which can be added as a resin modifier include diethylene glycol, triethylene glycol, 1,3-propanediol, dipropylene glycol, tripropylene glycol, 1,4-butanediol, 1,3-butanediol, 1,5-pentanediol, 1,4-pentanediol, 1,3-pentanediol, 1,6-hexanediol, 1,5-hexanediol, 1,4-hexanediol, 1,3-hexanediol, 1,7-heptanediol, 1,8-octanediol, thiodiethanol, dithiodiethanol, thiodipropanol, dithiodipropanol, and oligomers thereof, and the like, but are not limited to these exemplified compounds. These alcohol compounds may be used singly or in combination of two or more kinds thereof.

Examples of the amine compound which can be added as a resin modifier include monofunctional primary amine compounds such as ethylamine, n-propylamine, isopropylamine, n-butylamine, sec-butylamine, tert-butylamine, pentylamine, hexylamine, heptylamine, octylamine, decylamine, laurylamine, myristylamine, 3-pentylamine, 2-ethylhexylamine, 1,2-dimethylhexylamine, allylamine, aminomethyl bicycloheptane, cyclopentylamine, cyclohexylamine, 2,3-dimethylcyclohexylamine, aminomethylcyclohexane, aniline, benzylamine, phenethylamine, 2-, 3-, or 4-methylbenzylamine, o-, m-, or p-methylaniline, o-, m-, or p-ethylaniline, aminomorpholine, naphthylamine, furfurylamine, α-aminodiphenylmethane, toluidine, aminopyridine, aminophenol, aminoethanol, 1-aminopropanol, 2-aminopropanol, aminobutanol, aminopentanol, aminohexanol, methoxyethylamine, 2-(2-aminoethoxy)ethanol, 3-ethoxypropylamine, 3-propoxypropylamine, 3-butoxypropylamine, 3-isopropoxypropylamine, 3-isobutoxypropylamine, 2,2-diethoxyethylamine, and the like, primary polyamine compounds such as ethylenediamine, 1,2- or 1,3-diaminopropane, 1,2-, 1,3-, or 1,4-diaminobutane, 1,5-diaminopentane, 1,6-diaminohexane, 1,7-diaminoheptane, 1,8-diaminooctane, 1,10-diaminodecane, 1,2-, 1,3-, or 1,4-diaminocyclohexane, o-, m-, or p-diaminobenzene, 3,4- or 4,4'-diaminobenzophenone, 3,4- or 4,4'-diaminodiphenyl ether, 4,4'-diaminodiphenylmethane, 4,4'-diaminodiphenyl sulfide, 3,3'- or 4,4'-diaminodiphenyl sulfone, 2,7-diaminofluorene, 1,5-, 1,8-, or 2,3-diaminonaphthalene, 2,3-, 2,6-, or 3,4-diaminopyridine, 2,4- or 2,6-diaminotoluene, m- or p-xylylenediamine, isophorone diamine, diaminomethyl bicycloheptane, 1,3- or 1,4-diaminomethylcyclohexane, 2- or 4-aminopiperidine, 2- or 4-aminomethylpiperidine, 2- or 4-aminoethylpiperidine, N-aminoethylmorpholine, N-aminopropylmorpholine, and the like, monofunctional secondary amine compounds such as diethylamine, dipropylamine, di-n-butylamine, di-sec-butylamine, diisobutylamine, di-n-pentylamine, di-3-pentylamine, dihexylamine, dioctylamine, di(2-ethylhexyl)amine, methylhexylamine, diallylamine, N-methylallylamine, piperidine, pyrrolidine, diphenylamine, N-methylamine, N-ethylamine, dibenzylamine, N-methylbenzylamine, N-ethylbenzylamine, dicyclohexylamine, N-methylaniline, N-ethylaniline, dinaphthylamine, 1-methylpiperazine, morpholine, and the like, secondary polyamine compounds such as N,N'-dimethylethylenediamine, N,N'-dimethyl-1,2-diaminopropane, N,N'-dimethyl-1,3-diaminopropane, N,N'-dimethyl-1,2-diaminobutane, N,N'-dimethyl-1,3-diaminobutane, N,N'-dimethyl-1,4-diaminobutane, N,N'-dimethyl-1,5-diaminopentane, N,N'-dimethyl-1,6-diaminohexane, N,N'-dimethyl-1,7-diaminoheptane, N,N'-diethylethylenediamine, N,N'-diethyl-1,2-diaminopropane, N,N'-diethyl-1,3-diaminopropane, N,N'-diethyl-1,2-diaminobutane, N,N'-diethyl-1,3-diaminobutane, N,N'-diethyl-1,4-diaminobutane, N,N'-diethyl-1,5-diaminopentane, N,N'-diethyl-1,6-diaminohexane, N,N'-diethyl-1,7-diaminoheptane, piperazine, 2-methylpiperazine, 2,5-dimethylpiperazine, 2,6-dimethylpiperazine, homopiperazine, 1,1-di-(4-piperidyl)methane, 1,2-di-(4-piperidyl)ethane, 1,3-di-(4-piperidyl)propane, 1,4-di-(4-piperidyl)butane, tetramethylguanidine, and the like, and others, but are not limited to these exemplified compounds. These amine compounds may be used singly or in combination of two or more kinds thereof.

Examples of the epoxy resin which can be added as a resin modifier include a phenol type epoxy compound obtained by the condensation reaction of a polyhydric phenol compound such as bisphenol A glycidyl ether or the like with an epihalohydrin compound, an alcohol type epoxy compound obtained by condensation of a polyhydric alcohol compound such as hydrogenated bisphenol A glycidyl ether or the like with an epihalohydrin compound, a glycidyl ester type epoxy compound obtained by condensation of a multivalent organic acid compound such as 3,4-epoxycyclohexylmethyl-3',4'-epoxycyclohexane carboxylate, 1,2-hexahydrophthalic acid diglycidyl ester, and the like with an epihalohydrin compound, an amine type epoxy compound obtained by condensation of a primary or secondary diamine compound with an epihalohydrin compound, and an aliphatic multivalent epoxy compound such as vinylcyclohexene diepoxide and the like, and others, but are not limited to these exemplified compounds. These epoxy resins may be used singly or in combination of two or more kinds thereof.

Examples of the organic acid and its anhydride which can be added as a resin modifier include thiodiglycolic acid, thiodipropionic acid, dithiodipropionic acid, phthalic anhydride, hexahydrophthalic anhydride, methylhexahydrophthalic anhydride, methyltetrahydrophthalic anhydride, methylnorbornene anhydride, methylnorbornene anhydride, maleic anhydride, trimellitic anhydride, pyromellitic anhydride, and the like, but are not limited to these exemplified compounds.

These organic acids and anhydrides thereof may be used singly or in combination of two or more kinds thereof.

Examples of the olefin compound which can be added as a resin modifier include (meth)acrylate compounds such as benzyl acrylate, benzyl methacrylate, butoxyethyl acrylate, butoxymethyl methacrylate, cyclohexyl acrylate, cyclohexyl methacrylate, 2-hydroxyethyl acrylate, 2-hydroxymethyl methacrylate, glycidyl acrylate, glycidyl methacrylate, phenoxyethyl acrylate, phenoxyethyl methacrylate, phenyl methacrylate, ethylene glycol diacrylate, ethylene glycol dimethacrylate, diethylene glycol diacrylate, diethylene glycol dimethacrylate, triethylene glycol diacrylate, triethylene glycol dimethacrylate, tetraethylene glycol diacrylate, tetraethylene glycol dimethacrylate, polyethylene glycol diacrylate, polyethylene glycol dimethacrylate, neopentylglycol diacrylate, neopentylglycol dimethacrylate, ethylene glycol bisglycidyl acrylate, ethylene glycol bisglycidyl methacrylate, bisphenol A diacrylate, bisphenol A dimethacrylate, 2,2-bis(4-acroxyethoxyphenyl)propane, 2,2-bis(4-methacroxyethoxyphenyl)propane, 2,2-bis(4-acroxydiethoxyphenyl) propane, 2,2-bis(4-methacroxydiethoxyphenyl)propane, bisphenol F diacrylate, bisphenol F dimethacrylate, 1,1-bis(4-acroxyethoxyphenyl)methane, 1,1-bis(4-methacroxyethoxyphenyl)methane, 1,1-bis(4-acroxydiethoxyphenyl) methane, 1,1-bis(4-methacroxydiethoxyphenyl)methane, dimethyloltricyclodecane diacrylate, trimethylolpropane triacrylate, trimethylolpropane trimethacrylate, glycerol diacrylate, glycerol dimethacrylate, pentaerythritol triacrylate, pentaerythritol tetraacrylate, pentaerythritol tetramethacrylate, methylthio acrylate, methylthio methacrylate, phenylthio acrylate, benzylthio methacrylate, xylylenedithiol diacrylate, xylylenedithiol dimethacrylate, mercaptoethyl sulfide diacrylate, mercaptoethylsulfide dimethacrylate, and the like, allyl compounds such as allyl glycidyl ether, diallyl phthalate, diallyl terephthalate, diallyl isophthalate, diallyl carbonate, diethylene glycol bisallylcarbonate, and the like, vinyl compounds such as styrene, chlorostyrene, methylstyrene, bromostyrene, dibromostyrene, divinylbenzene, 3,9-divinylspirobi (m-dioxane) and the like, and others, but are not limited to these exemplified compounds. These olefin compounds may be used singly or in combination of two or more kinds thereof.

Second Embodiment

The polymerizable composition for a polythiourethane optical material of the second embodiment includes the polymerization catalyst for a polythiourethane optical material according to the second embodiment and monomers. As the monomers, the same compounds as in the first embodiment can be used.

The method for adding the catalyst into the monomers is not particularly limited, and as in the first embodiment, the zinc compound (a1) and the compound (a4) represented by the general formula (4) may be appropriately added to the monomers, resin modifiers, or the like to be used.

For example, there can be mentioned a method including adding the zinc compound (a1) and the compound (a4) represented by the general formula (4), respectively, or a mixture of the zinc compound (a1) and the compound (a4) represented by the general formula (4) to each of the isocyanates (B), the active hydrogen compounds (C), and a resin modifier such as a hydroxy compound and the like, to a mixture of the isocyanates (B) and the active hydrogen compounds (C), to a mixture of the isocyanates (B) and a resin modifier such as a hydroxy compound and the like, to a mixture of the active hydrogen compounds (C) and a resin modifier such as a hydroxy compound and the like, or to a mixture of the isocyanates (B), the active hydrogen compounds (C), and a resin modifier such as a hydroxy compound and the like, but are not limited to these exemplified methods. It may be properly selected depending on the solubility, operability, safety, expediency, or the like of the catalyst.

Further, as the raw material for the polythiourethane resin or the other additives, the same ones as in the first embodiment can be used, and thus, description thereof is not repeated here.

Next, a process for producing the polythiourethane resin according to the present embodiment will be described.

In the present embodiment, the ratio of the raw materials including the isocyanates (B), the active hydrogen compounds (C), and a hydroxy compound as a modifier, each used as the raw materials, may be such that the molar ratio of functional groups, (NCO+NCS)/(SH+OH), is usually in the range 0.5 to 3.0, preferably in the range 0.6 to 2.0, and more preferably in the range 0.8 to 1.3.

At the time of molding the polythiourethane resin of the present embodiment, a variety of substances such as a chain extender, a cross-linking agent, a light stabilizer, an ultraviolet absorber, an anti-oxidant, an anti-coloring agent, an oil-soluble dye, a filler, an external or internal mold release agent, an adhesion improving agent, or the like may be added, depending on the purpose, as in the known molding methods. When a plastic lens is prepared by using the polythiourethane resin of the present embodiment, it is usually obtained by cast-polymerization. However, it is preferable that an internal mold release agent including typical examples of phosphoric acid esters is added in advance to the polymerizable composition after the polymerization in order to accelerate releasing of the lens from the mold. Alternatively, the mold may be treated with an external mold release agent in advance.

In the case of the polythiourethane resin, since an inorganic compound having a sulfur atom or a selenium atom easily causes marked deterioration of color or turbidity, the content of these inorganic compounds in the polymerizable composition for a polythiourethane optical material is preferably not more than 1% by weight.

Next, the method for mixing the monomers will be described. In the present invention, when the isocyanates (B), the active hydrogen compounds (C), a reaction catalyst, a mold release agent, and other additives are mixed before the polymerization to prepare a polymerizable composition, the procedure of the catalyst, the mold release agent, and other additives to be added is different depending on the solubility into monomers. However, they may be previously added to the isocyanates (B) and dissolved therein, added to the active hydrogen compounds (C) and dissolved therein, or added to a mixture of the isocyanates (B) and the active hydrogen compounds (C) and dissolved therein. Alternatively, they may be dissolved in a part of the monomers to be used to prepare a master solution, and then the master solution may be added. The procedure of addition is not limited to these exemplified methods, and may be properly selected depending on the operability, safety, expediency, or the like.

Furthermore, for example, when zinc N,N-dibutyl dithiocarbamate as the zinc compound, trioctylmethylammonium chloride as the compound (a2) represented by the general formula (1), and methanesulfonic acid as the sulfonic acid (a3) represented by the general formula (2) are used in the first embodiment, the following preparation procedures can be cited, but are not limited to these exemplified methods.

(1) a preparation procedure of mixing zinc N,N-dibutyl dithiocarbamate, trioctylmethylammonium chloride, and methanesulfonic acid with the isocyanates (B), a resin modifier, and other additives, and then adding the active hydrogen compounds (C) thereto.

(2) a preparation procedure of mixing zinc N,N-dibutyl dithiocarbamate, a resin modifier, and other additives with the isocyanates (B), and then adding the active hydrogen compounds (C) having trioctylmethylammonium chloride and methanesulfonic acid dissolved therein.

(3) a preparation procedure of mixing zinc N,N-dibutyl dithiocarbamate, a resin modifier, and other additives with the isocyanates (B), and then adding the active hydrogen compounds (C), and finally dissolving a mixture of trioctylmethylammonium chloride and methanesulfonic acid or adding a master solution with a mixture of trioctylmethylammonium chloride and methanesulfonic acid dissolved in a part of the monomers.

(4) a preparation procedure of mixing a mixture of trioctylmethylammonium chloride and methanesulfonic acid, a resin modifier, and other additives with the isocyanates (B), and then adding the active hydrogen compounds (C) having zinc N,N-dibutyl dithiocarbamate dissolved therein.

(5) a preparation procedure of mixing a mixture of trioctylmethylammonium chloride and methanesulfonic acid, a resin modifier, and other additives with the isocyanates (B), and then adding the active hydrogen compounds (C), and finally adding zinc N,N-dibutyl dithiocarbamate or a master solution having zinc N,N-dibutyl dithiocarbamate dissolved in a part of the monomers.

(6) a preparation procedure of mixing a resin modifier and other additives with the isocyanates (B), and then adding the active hydrogen compounds (C) having zinc N,N-dibutyl dithiocarbamate, trioctylmethylammonium chloride, and methanesulfonic acid dissolved therein.

(7) a preparation procedure of mixing a resin modifier and other additives with the isocyanates (B), and then adding the active hydrogen compounds (C) having zinc N,N-dibutyl dithiocarbamate dissolved therein, and finally dissolving a mixture of trioctylmethylammonium chloride and methanesulfonic acid or adding a master solution having a mixture of trioctylmethylammonium chloride and methanesulfonic acid dissolved in a part of the monomers.

(8) a preparation procedure of mixing a resin modifier and other additives with the isocyanates (B), and then adding the active hydrogen compounds (C) having trioctylmethylammonium chloride and methanesulfonic acid dissolved therein, and finally adding zinc N,N-dibutyl dithiocarbamate or a master solution having zinc N,N-dibutyl dithiocarbamate in a part of the monomers.

(9) a preparation procedure of mixing a resin modifier and other additives with the isocyanates (B), and then adding the active hydrogen compounds (C), and finally dissolving a mixture of zinc N,N-dibutyl dithiocarbamate, trioctylmethylammonium chloride, and methanesulfonic acid, or adding a master solution having a mixture of zinc N,N-dibutyl dithiocarbamate, trioctylmethylammonium chloride, and methanesulfonic acid dissolved in a part of the monomers.

(10) a preparation procedure of mixing the isocyanates (B), the active hydrogen compounds (C), zinc N,N-dibutyl dithiocarbamate, trioctylmethylammonium chloride, methanesulfonic acid, a resin modifier, and other additives without conducting the aforementioned mixing procedure step by step.

As a form of catalyst addition, a catalyst itself may be added, and a master solution may be prepared by dissolving the catalyst in a part of the monomers to be used and then the master solution may be added.

When the isocyanates (B), the active hydrogen compounds (C), a reaction catalyst, a mold release agent, and other additives are mixed to prepare a polymerizable composition, the temperature at that time is usually not higher than 25° C. From the viewpoint of the pot life of the composition, it is sometimes preferable to employ a still lower temperature. However, when the solubility of a reaction catalyst, a mold release agent or additives into the monomers is not good, the mold release agent or additives can be dissolved in the isocyanates (B) or the active hydrogen compounds (C) as the monomers or a monomer mixture thereof by heating in advance.

Furthermore, for example, when zinc chloride as the zinc compound (a1) and tetrabutylammonium methane sulfonate as the compound (a4) represented by the general formula (4) are used in the second embodiment, the following preparation procedures can be cited, but are not limited to these exemplified methods.

(1) a preparation procedure of mixing tetrabutylammonium methane sulfonate, a resin modifier, and other additives with the isocyanates (B), and then adding the active hydrogen compounds (C) having zinc chloride dissolved therein.

(2) a preparation procedure of mixing a resin modifier and other additives with the isocyanates (B), and then adding the active hydrogen compounds (C) having zinc chloride and tetrabutylammonium methane sulfonate dissolved therein.

(3) a preparation procedure of mixing a resin modifier and other additives with the isocyanates (B), then adding the active hydrogen compounds (C) having zinc chloride dissolved therein, and finally adding tetrabutylammonium methane sulfonate or a master solution having tetrabutylammonium methane sulfonate dissolved in a part of the monomers.

(4) a preparation procedure of mixing a resin modifier and other additives with the isocyanates (B), then adding the active hydrogen compounds (C) having tetrabutylammonium methane sulfonate dissolved therein, and finally adding zinc chloride or a master solution having zinc chloride dissolved in a part of the monomers.

(5) a preparation procedure of mixing a resin modifier and other additives with the isocyanates (B), then adding the active hydrogen compounds (C), and finally adding zinc chloride and tetrabutylammonium methane sulfonate or a master solution having zinc chloride and tetrabutylammonium methane sulfonate dissolved in a part of the monomers.

As a form of catalyst addition, a catalyst itself may be added, and a master solution may be prepared by dissolving the catalyst in a part of the monomers to be used and then the master solution may be added.

When the isocyanates (B), the active hydrogen compounds (C), a reaction catalyst, a mold release agent, and other additives are mixed to prepare a polymerizable composition, the temperature at that time is usually not higher than 25° C. From the viewpoint of the pot life of the composition, it is sometimes preferable to employ a still lower temperature. However, when the solubility of a reaction catalyst, a mold release agent or additives into the monomers is not good, the mold release agent or additives can be dissolved in the isocyanates (B) or the active hydrogen compounds (C) as the monomers or a monomer mixture thereof by heating in advance.

As a typical polymerization method for obtaining the polythiourethane resin (for example, plastic lens) of the present embodiment from the thus obtained monomer mixed composition, cast-polymerization can be cited. Namely, the polymerizable composition according to the present embodiment is injected into a tape mold in which the periphery of glass is held as wrapped with a tape or a gasket mold in which glass is inserted to a gasket and clipped at both sides. At this time, depending on the requirement for the physical properties of the obtained plastic lens, a degassing process under a reduced pressure or a filtration process such as under an applied pressure, a reduced pressure, and or the like may be preferably employed, as necessary in many cases. Subsequently, the mold can be subjected to curing by heating in a heating apparatus such as an oven or in water, and then the resin can be removed therefrom. In the present curing by heating, if the curing by polymerization of the polymerizable composition is not sufficient at a time of elevation of the temperature in the heating apparatus, inhomogeneous white turbidity may occur in the periphery of the plastic lens due to elution of the adhesive components from a tape in some cases, and further, sufficient hardness may be not obtained in a molded product and deformation may occur in the molded product due to deficiency in the heat resistance of the mold in some cases.

In order to obtain a transparent resin, the type or amount of reaction catalysts or the like, and the type or ratio of monomers are different depending on the configuration of the composition to be polymerized, and are thus not absolutely restricted. However, the aforementioned conditions are preferred in many cases.

Heat polymerization conditions of the composition of the present embodiment injected into the shaping mold significantly vary depending on composition of the polymerizable composition of the present invention, the type of reaction catalysts, the shape of molds or the like and are thus not restricted. However, polymerization is conducted at a temperature of about −50 to 200° C. over 1 to 100 hours. In some cases, the composition is preferably polymerized by keeping or gradually raising the temperature in the range of 10 to 130° C. for 1 to 24 hours.

In addition, the resin which has been removed may be, if necessary, subjected to a treatment such as annealing and the like. The annealing is usually carried out at a temperature from 50 to 200° C., preferably from 90 to 150° C., and more preferably from 100 to 130° C.

The resin obtained by curing the composition for an optical material according to the present embodiment is a resin excellent in color. The transparent resin of the present embodiment can be obtained as a molded product in various shapes by changing the mold at the time of cast-polymerization and can be used for various applications such as optical resins for spectacle lenses, camera lenses, light emitting diodes (LED), and the like. In particular, the transparent resins are suitable as optical materials, optical elements, or the like for spectacle lenses, camera lenses, light emitting diodes, and the like.

In the plastic lens using the polythiourethane resin of the present embodiment, for purposes of improving anti-reflection, imparting hardness, improving wear resistance, improving chemical resistance, imparting an anti-clouding property, imparting fashionability and photochromic properties, or the like, physical or chemical treatments such as surface polishing, an antistatic treatment, a coating treatment on one surface or both surfaces, a tinting treatment, a photochromic treatment, and the like can be performed as necessary.

Examples of a coating layer formed by the coating process include a primer layer, a hard coat layer, an anti-reflection film layer, an anti-clouding coating film layer, an anti-fouling layer, a water repelling layer and the like. These coating layers may each be used singly or a plurality of coating layers may be used in a multi-layered structure. When the coating layers are applied on both surfaces of the lens, the same coating layer or different coating layers may be applied on each surface.

These coating layers may be each used together with an ultraviolet absorber for the purpose of protecting lenses or eyes from ultraviolet rays, an infrared ray absorber for the purpose of protecting eyes from infrared rays, a light stabilizer or an anti-oxidant for the purpose of improving heat-yellowing resistance or light resistance of lenses, a dye or a pigment for the purpose of enhancing fashionability of lenses, and a photochromic dye or a photochromic pigment, an antistatic agent and other known additives for improving the property of lenses. For the layer to be coated by the coating process, various leveling agents may be used for the purpose of improving the coating property.

The primer layer is usually formed between a hard coat layer to be described below and an optical lens. The primer layer is a coating layer for the purpose of improving adhesion between the hard coat layer to be formed thereon and the lens, and impact resistance of the lens can also be improved in some cases.

Any material can be used for the primer layer as long as it has high adhesion to the obtained optical lens. Normally, a primer composition containing a urethane-based resin, an epoxy-based resin, a polyestert-based resin, a melanin-based resin, and a polyvinyl acetal as the main component, or the like is used. A suitable solvent which does not influence the lens may be used in the primer composition for the purpose of adjusting the viscosity of the composition. Alternatively, any non-solvent procedure may be employed.

The primer layer can be formed by any method of a coating method or a dry method. When the coating method is employed, the primer composition is coated on a lens by a known coating method such as spin coating, dip coating, and the like, and then solidified to form a primer layer. When the dry method is employed, the lens is formed by a known dry method such as a CVD method, a vacuum deposition method, and the like. Upon forming a primer layer, for the purpose of improving adhesion of the primer layer, the surface of the lens may be subjected to a pre-treatment such as an alkaline treatment, a plasma treatment, an ultraviolet treatment, and the like, as necessary.

The hard coat layer refers to a coating layer for the purpose of providing the surface of the lens with functions such as abrasion resistance, wear resistance, humidity resistance, hot water resistance, heat resistance, heat-yellowing resistance, light resistance, and the like.

As the hard coat layer, in general, a hard coat composition containing an organic silicon compound having curing properties and one or more fine particles formed from one or more fine oxide particles of an element selected from the element group of Si, Al, Sn, Sb, Ta, Ce, La, Fe, Zn, W, Zr, In, and Ti, and/or composite oxides of two or more elements selected from the element group is used. It is preferable that the hard coat composition contain at least one of amines, amino acids, complexes of metal acetylacetonate, metal salts of organic acid, perchloric acids, salts of perchloric acids, acids, metal chlorides and polyfunctional epoxy compounds, in addition to the aforementioned components. A suitable solvent which does not influence the lens may be used in the hard coat composition. Alternatively, any non-solvent procedure may be employed.

The hard coat layer is usually formed by applying the hard coat composition according to a known coating method such as spin coating, dip coating, and the like, and then curing the resulting material. As a curing method, a method for curing by thermal curing, or irradiation with energy beams such as ultraviolet rays, visible rays, and the like can be cited. Since generation of interference fringes is suppressed, the difference between the refractive index of the hard coat layer and the refractive index of the lens is preferably in the range of ±0.1.

An anti-reflection layer is usually formed on the aforementioned hard coat layer as needed. As the anti-reflection layer, there are inorganic-based layers and organic-based layers. In the case of the inorganic-based layer, the layer is formed by a dry method such as a vacuum deposition method, a sputtering method, an ion plating method, an ion beam assisted deposition, a CVD method, and the like by using an inorganic oxide such as $SiO_2$, $TiO_2$, and the like. In the case of the organic-based layer, the layer is formed by a wet method using an organic silicon compound and a composition containing silica-based fine particles having internal pores.

The anti-reflection layer is composed of a single layer or multi layers. When using as a single layer, it is preferable that its refractive index is lower by at least 0.1 or more than that of the hard coat layer. In order to effectively develop an anti-reflection function, a multi-layered anti-reflection film is preferable. In this case, a low refractive index film and a high refractive index film are alternately laminated. In this case, it is also preferable that the difference between the refractive index of the low refractive index film and that of the high refractive index film is not less than 0.1. As the high refractive index film, films of ZnO, $TiO_2$, $CeO_2$, $Sb_2O_5$, $SnO_2$, $ZrO_2$, $Ta_2O_5$, and the like can be cited. Examples of the low refractive index film include $SiO_2$ films and the like.

On the anti-reflection film layer, an anti-clouding coating film layer, an anti-fouling layer or a water repelling layer may be formed as necessary. As long as a method for forming an anti-clouding coating layer, an anti-fouling layer or a water repelling layer does not adversely affect the anti-reflection function, treatment methods, treating materials, and the like are not particularly limited. Known anti-clouding coating treating methods, anti-fouling treating methods, water repelling treating methods, materials, and the like can be used. For example, for the anti-clouding coating treatment method and anti-fouling treatment method, there can be exemplified a method for covering the surface with a surface active agent, a method for adding a hydrophilic film to the surface for the water absorbent property, a method for covering the surface with a fine texture for enhancing a water absorbent property, a method for applying a water absorbent property by using photocatalytic activity, a method for conducting an ultra-water repelling treatment to prevent attachment of water drops, and the like. Furthermore, as the water repelling treatment method, there can be exemplified a method for forming a water repelling treatment layer by subjecting a fluorine-containing silane compound or the like to deposition or sputtering, a method for forming a water repelling treatment layer by dissolving the fluorine-containing silane compound in a solvent and then coating, and the like.

The lens can be tinted by a known tinting method. However, it is usually tinted in the following methods: (1) a method including immersing the lens in a dye solution, (2) a method including coating by using a coating agent containing a colorant or a method including forming a coating layer capable of tinting and tinting the coating layer, (3) a method including adding a material capable of tinting to a raw material monomer for polymerization, and (4) a method including heating a sublimation colorant for sublimation.

The method in (1) generally refers to a method including immersing a prescribed optical surface-finished lens material in a dye solution with a colorant to be used dissolved or homogeneously dispersed therein (tinting process) and then, as required, heating the lens to solidify the colorant (annealing process after tinting). The colorant used in the tinting process is not particularly limited as long as it is a known colorant. However, an oil-soluble dye or a disperse dye is usually used. The solvent used in the tinting process is not particularly limited as long as the dye to be used can be dissolved or homogeneously dispersed therein. In this tinting process, a surface active agent for dispersing a dye in the dye solution or a carrier for promoting tinting may be added as required. The tinting process includes dispersing a colorant and a surface active agent to be added as needed in water or a mixture of water and an organic solvent to prepare a dye bath, immersing the optical lens in the dye bath and tinting at a prescribed temperature for a prescribed period. The dye temperature and period vary depending on the desired coloring concentration, but are usually not higher than 120° C. and about several minutes to several tens of hours. The dye concentration of the dye bath is 0.01 to 10% by weight. Furthermore, when it is difficult to tint, it may be carried out under an applied pressure. The annealing process after tinting conducted as required is a process for heating the dyed lens material. The heating process is carried out such that water remaining on the surface of the lens material tinted in the tinting process is removed using a solvent or the like, or the solvent is air dried, and then left in an ambient atmosphere for a prescribed period, for example, in a furnace such as an infrared heating furnace, a resistance heating furnace or the like. The annealing process after tinting includes preventing the decolorization of the dyed lens material (decolorization-preventing treatment) and at the same time eliminating water which has penetrated into the inside of the lens material at the time of tinting.

The method in (2) refers to a method including applying an organic coating solution in which a colorant is dispersed or dissolved onto the plastic lens without directly tinting the plastic lens material, and then curing in order to form a dyed coating layer on the lens surface, or a method including adopting the method in (1) after forming a coating layer capable of tinting on the surface of the plastic lens, that is, immersing the plastic lens in a dye solution and heating for tinting.

The method in (3) refers to a method for previously dissolving a dye in a raw material monomer of the plastic lens for polymerization. The colorant to be used is not particularly limited as long as it is capable of being homogeneously dissolved in a raw material monomer or dispersed to the extent that optical properties are not damaged.

As the method in (4), there are (a) a method including sublimating a solid sublimation colorant for tinting the plastic lens, (b) a method including putting a base obtained by applying a solution containing the sublimation colorant opposite to the plastic lens in a non-contact state, and heating the base and the lens for tinting, and (c) a method including transferring a transfer layer composed of a coloring layer containing a sublimation colorant and an adhesive layer onto the plastic lens and then heating for tinting. The optical lens of the present embodiment may be dyed by any of these methods. The colorant to be used is not particularly limited as long as it is a colorant having a sublimation property.

EXAMPLES

Hereinbelow, the present invention will be described in more detail with reference to Example A and Example B. However, the present invention is not limited thereto.

Example A

As the tests of performance of the lens, the color, refractive index, Abbe number, heat resistance, elution from the tape, deformation of a lens, white turbidity, polymerization inhomogeneity, heat-yellowing resistance, and light resistance were evaluated by the following testing methods.

Refractive index (ne) and Abbe number (ve): Measured at 20° C. using a Pulfrich refractometer.

Heat resistance: Tg (° C.) of the TMA penetration method (load: 50 g, pinpoint: 0.5 mmφ, temperature elevation rate: 10° C./min) was measured as the heat resistance.

Color: The resin color YI value was measured using a colorimeter (CR-200) manufactured by Minolta. The resin color YI value was measured by preparing a circular plate having a thickness of 9 mm and φ75 mm.

Elution from tape (tape mold): The obtained resin was irradiated using a projector in a dark place, and the presence of non-transparent substance caused inhomogeneous at the edges of the lens was visually determined. "Presence" indicates a case where non-transparent substances were observed in the lenses.

Deformation of lens (gasket mold): The thickness of the periphery was measured, and "Presence" of deformation indicates a case where the difference between a maximum thickness and a minimum thickness is 0.5 mm or more.

White turbidity: The obtained resin was irradiated using a projector in a dark place, and the turbidity of the entire lens was visually determined. "Presence" indicates a case where the turbidity of the lens was observed.

Polymerization inhomogeneity: The lens was placed under a high pressure mercury lamp and projected on a wall surface through light. "Presence" of striation indicates a case where the shape of stripe patterns due to optical inhomogeneity was observed.

Heat yellowing resistance: The increase in the YI values (ΔYI) was measured by heating in an oven at 130° C. for 20 hours and irradiating for 20 hours, and observing the change of the resin color YI values.

Light resistance: The increase in the YI values (ΔYI) was measured by observing the change of the resin color YI values through irradiation of artificial sunlight (illuminance: 88400 lx/h) for 20 hours.

Example A1

To 70.8 g of a mixture of 2,5-bis(isocyanatomethyl)-bicyclo[2.2.1]heptane and 2,6-bis(isocyanatomethyl)-bicyclo[2.2.1]heptane were added 0.14 g (1000 ppm based on a total amount of the polymerizable monomer mixture) of a mixture of 8.5 g (15.8 mmol) of an isopropyl alcohol solution (containing 25% of IPA) of tri-n-octylmethylammonium chloride and 1.5 g (15.6 mmol) of methane sulfonate (manufactured by Tokyo Chemical Industry Co., Ltd.), which had been mixed thoroughly as a polymerization catalyst, and 0.021 g (150 ppm based on a total amount of the polymerizable monomer mixture) of zinc dibutyl dithiocarbamate, and subsequently, 0.168 g (1200 ppm based on a total amount of the polymerizable monomer mixture) of an internal mold release agent (STEPAN Company, product name, Zelec UN) and 0.070 g (500 ppm based on a total amount of the polymerizable monomer mixture) of an ultraviolet absorber (Kyodo Chemical Co., Ltd., product name, Viosorb 583), followed by mixing and dissolving them at 20° C. under a nitrogen atmosphere to give a homogeneous solution. To this homogeneous solution was added a mixed solution of 33.4 g of pentaerythritol tetrakis(3-mercaptopropionate) and 35.8 g of 4-mercaptomethyl-1,8-dimercapto-3,6-dithiaoctane, followed by mixing and dissolving them at 20° C. under a nitrogen atmosphere. This mixed solution was degassed at 20° C. under 400 Pa for 1 hour, and then filtered through a 1-μm PTFE filter. Then, a glass mold was prepared in which the periphery of two sheets of plate glass with a separation distance of 9 mm was wrapped with a tape, and a gasket mold was prepared in which two sheets of plate glass with a separation distance of 9 mm were inserted to a gasket and both sides are pinched by clips, and the above mixed solution was injected into each of these molds. These molds were put into a polymerization oven and then gradually heated from 25° C. to 130° C. for 21 hours, and polymerization was conducted. After completion of the polymerization, the molds were taken out of the oven and demolded, thereby obtaining a lens comprising the resin. The obtained lens was additionally subjected to an annealing treatment at 130° C. for 2 hours.

The obtained lens had a refractive index (ne) of 1.598, an Abbe number (ve) of 40.4, a heat resistance (Tg) of 119.6° C., and a color of 4.1. There was no significant difference in these values between the lens molded with the tape mold and the lens molded with the gasket mold. Elution from the tape was not confirmed since the presence of the non-transparent substance was not confirmed in the lens molded with the tape mold. Further, the deformation caused from the gasket deformation was not confirmed in the lens molded with the gasket mold. Also, the lens molded with any of the molds was transparent and the striation was not observed. The heat-yellowing resistance ΔYI was 1.6 and the light resistance ΔYI was 0.2 which were respectively better than 2.5 and 1.4 obtained in Comparative Example A6. A test in which a mixture of an isopropyl alcohol solution (containing 25% of IPA) of tri-n-octylmethylammonium chloride and methanesulfonic acid as a polymerization catalyst, and zinc dibutyl dithiocarbamate were mixed in advance and then added thereto was also carried out, but a significant difference could not be seen in the results. The compositions of the mixture and the evaluation results are shown in [Table 1] and [Table 2], respectively.

Example A2

To 72.8 g of m-xylylene diisocyanate were added 0.0189 g (135 ppm based on a total amount of the polymerizable monomer mixture) of a mixture of 11.5 g (21.4 mmol) of an isopropyl alcohol solution (containing 25% of IPA) of tri-n-octylmethylammonium chloride and 2.0 g (20.8 mmol) of methane sulfonate (manufactured by Tokyo Chemical Industry Co., Ltd.), which had been mixed thoroughly as a polymerization catalyst, and 0.007 g (50 ppm based on a total amount of the polymerizable monomer mixture) of zinc dibutyl dithiocarbamate, and subsequently, 0.14 g of an internal mold release agent (STEPAN Company, product name, Zelec UN) and 0.070 g of an ultraviolet absorber (Kyodo Chemical Co., Ltd., product name, Viosorb 583), followed by mixing and dissolving them at 20° C. to give a homogeneous solution. To this homogeneous solution was added a mixed solution of 67.2 g of 4-mercaptomethyl-1,8-dimercapto-3,6-dithiaoctane, followed by mixing and dissolving them at 20° C. This mixed solution was degassed at 20° C. under 400 Pa for 1 hour, then filtered through a 1-μm PTFE filter, and injected into a tape mold and a gasket mold. These molds were put into a polymerization oven and then gradually heated from 25° C. to 120° C. for 20 hours, and polymerization was conducted. After completion of the polymerization, the molds were taken out of the oven and demolded, thereby obtaining a lens comprising the resin. The obtained lens was additionally subjected to an annealing treatment at 120° C. for 2 hours.

The obtained lens had a refractive index (ne) of 1.665, an Abbe number (ve) of 31.2, a heat resistance (Tg) of 89.4° C., and a color of 4.8. There was no significant difference in these values between the lens molded with the tape mold and the lens molded with the gasket mold. Elution from the tape was not confirmed since the presence of the non-transparent substance was not confirmed in the lens molded with the tape mold. Further, the deformation caused from the gasket deformation was not confirmed in the lens molded with the gasket mold. Also, the lens molded with any of the molds was transparent and the striation was not observed. The heat-yellowing resistance ΔYI was 1.2 and the light resistance ΔYI was 0.8 which were respectively better than 3.9 and 1.1 obtained in Comparative Example A7. A test in which a mixture of an isopropyl alcohol solution (containing 25% of IPA) of tri-n-octylmethylammonium chloride and methanesulfonic acid as the polymerization catalyst, and zinc dibutyl dithiocarbamate were mixed in advance and then added thereto was also carried out, but a significant difference could not be seen in the results. The compositions of the mixture and the evaluation results are shown in [Table 1] and [Table 2], respectively.

Example A3

The procedure was carried out in the same manner as in Example A1 except that zinc chloride was used instead of ZnBTC as the zinc compound. The obtained lens had a refractive index (ne) of 1.598, an Abbe number (ve) of 40.6, a heat resistance (Tg) of 119.8° C., and a color of 4.1. There was no significant difference in these values between the lens molded with the tape mold and the lens molded with the gasket mold. Elution from the tape was not confirmed since the presence of the non-transparent substance was not confirmed in the lens molded with the tape mold. Further, the deformation caused from the gasket deformation was not confirmed in the lens molded with the gasket mold. Also, the lens molded with any of the molds was transparent and the striation was not observed. The heat-yellowing resistance ΔYI was 2.0 and the light resistance ΔYI was 0.1 which were respectively better than 2.5 and 1.4 obtained in Comparative Example A6. A test in which a mixture of an isopropyl alcohol solution (containing 25% of IPA) of tri-n-octylmethylammonium chloride and methanesulfonic acid as the polymerization catalyst, and zinc chloride were mixed in advance and then added thereto was also carried out, but a significant difference could not be seen in the results. The compositions of the mixture and the evaluation results are shown in [Table 1] and [Table 2], respectively.

Example A4

The procedure was carried out in the same manner as in Example A2 except that zinc chloride was used instead of ZnBTC as the zinc compound. The obtained lens had a refractive index (ne) of 1.665, an Abbe number (ve) of 31.3, a heat resistance (Tg) of 89.6° C., and a color of 4.9. There was no significant difference in these values between the lens molded with the tape mold and the lens molded with the gasket mold. Elution from the tape was not confirmed since the presence of the non-transparent substance was not confirmed in the lens molded with the tape mold. Further, the deformation caused from the gasket deformation was not confirmed in the lens molded with the gasket mold. Also, the lens molded with any of the molds was transparent and the striation was not observed. The heat-yellowing resistance ΔYI was 0.7 and the light resistance ΔYI was 1.0 which were respectively better than 3.9 and 1.1 obtained in Comparative Example A7. A test in which a mixture of an isopropyl alcohol solution (containing 25% of IPA) of tri-n-octylmethylammonium chloride and methanesulfonic acid as the polymerization catalyst, and zinc chloride were mixed in advance and then added thereto was also carried out, but a significant difference could not be seen in the results. The compositions of the mixture and the evaluation results are shown in [Table 1] and [Table 2], respectively.

Example A5

The procedure was carried out in the same manner as in Example A1 except that zinc diethyl dithiocarbamate (ZnETC) was used instead of ZnBTC as the zinc compound. The obtained lens had a refractive index (ne) of 1.598, an Abbe number (ve) of 40.5, a heat resistance (Tg) of 119.5° C., and a color of 4.1. There was no significant difference in these values between the lens molded with the tape mold and the lens molded with the gasket mold. Elution from the tape was not confirmed since the presence of the non-transparent substance was not confirmed in the lens molded with the tape mold. Further, the deformation caused from the gasket deformation was not confirmed in the lens molded with the gasket mold. Also, the lens molded with any of the molds was transparent and the striation was not observed. The heat-yellowing resistance ΔYI was 1.3 and the light resistance ΔYI was 0.3 which were respectively better than 2.5 and 1.4 obtained in Comparative Example A6. A test in which a mixture of an isopropyl alcohol solution (containing 25% of IPA) of tri-n-octylmethylammonium chloride and methanesulfonic acid as the polymerization catalyst, and ZnETC were mixed in advance and then added thereto was also carried out, but a significant difference could not be seen in the results. The compositions of the mixture and the evaluation results are shown in [Table 1] and [Table 2], respectively.

Example A6

The procedure was carried out in the same manner as in Example A2 except that zinc diethyl dithiocarbamate (ZnETC) was used instead of ZnBTC as the zinc compound. The obtained lens had a refractive index (ne) of 1.665, an Abbe number (ve) of 31.6, a heat resistance (Tg) of 89.6° C., and a color of 4.7. There was no significant difference in these values between the lens molded with the tape mold and the lens molded with the gasket mold. Elution from the tape was not confirmed since the presence of the non-transparent substance was not confirmed in the lens molded with the tape mold. Further, the deformation caused from the gasket deformation was not confirmed in the lens molded with the gasket mold. Also, the lens molded with any of the molds was transparent and the striation was not observed. The heat-yellowing resistance ΔYI was 1.1 and the light resistance ΔYI was 0.8 which were respectively better than 3.9 and 1.1 obtained in Comparative Example A7. A test in which a mixture of an isopropyl alcohol solution (containing 25% of IPA) of tri-n-octylmethylammonium chloride and methanesulfonic acid as the polymerization catalyst, and ZnETC were mixed in advance and then added thereto was also carried out, but a significant difference could not be seen in the results. The compositions of the mixture and the evaluation results are shown in [Table 1] and [Table 2], respectively.

Example A7

The procedure was carried out in the same manner as in Example A1 except that tetrabutylammonium bromide (TBAB) was used as a quaternary ammonium salt, and all of the catalysts were mixed and then 2,5-bis(isocyanatomethyl)-bicyclo[2.2.1]heptane and 2,6-bis(isocyanatomethyl)-bicyclo[2.2.1]heptane were added thereto to dissolve the catalysts. The obtained lens had a refractive index (ne) of 1.598, an Abbe number (ve) of 40.3, a heat resistance (Tg) of 119.9° C., and a color of 4.0. There was no significant difference in these values between the lens molded with the tape mold and the lens molded with the gasket mold. Elution from the tape was not confirmed since the presence of the non-transparent substance was not confirmed in the lens molded with the tape mold. Further, the deformation caused from the gasket deformation was not confirmed in the lens molded with the gasket mold. Also, the lens molded with any of the molds was transparent and the striation was not observed. The heat-yellowing resistance ΔYI was 0.8 and the light resistance ΔYI was 0.1 which were respectively better than 2.5 and 1.4 obtained in Comparative Example A6. The compositions of the mixture and the evaluation results are shown in [Table 1] and [Table 2], respectively.

Example A8

The procedure was carried out in the same manner as in Example A2 except that tetrabutylammonium bromide (TBAB) was used as a quaternary ammonium salt, and all of the catalysts were mixed and then m-xylylene diisocyanate was added thereto to dissolve the catalysts. The obtained lens had a refractive index (ne) of 1.665, an Abbe number (ve) of 31.3, a heat resistance (Tg) of 89.6° C., and a color of 4.7. There was no significant difference in these values between the lens molded with the tape mold and the lens molded with the gasket mold. Elution from the tape was not confirmed since the presence of the non-transparent substance was not confirmed in the lens molded with the tape mold. Further, the deformation caused from the gasket deformation was not confirmed in the lens molded with the gasket mold. Also, the lens molded with any of the molds was transparent and the striation was not observed. The heat-yellowing resistance ΔYI was 1.9 and the light resistance ΔYI was 0.6, which were respectively better than 3.9 and 1.1 obtained in Comparative Example A7. The compositions of the mixture and the evaluation results are shown in [Table 1] and [Table 2], respectively.

Comparative Example A1

To 70.8 g of a mixture of 2,5-bis(isocyanatomethyl)-bicyclo[2.2.1]heptane and 2,6-bis(isocyanatomethyl)-bicyclo[2.2.1]heptane were added 0.56 g (4000 ppm based on a total amount of the polymerizable monomer mixture) of a mixture of 7.5 g (13.9 mmol) of an isopropyl alcohol solution (containing 25% of IPA) of tri-n-octylmethylammonium chloride and 0.5 g (5.2 mmol) of methane sulfonate (manufactured by Tokyo Chemical Industry Co., Ltd.), which had been mixed thoroughly as a polymerization catalyst, and subsequently, 0.168 g (1200 ppm based on a total amount of the polymerizable monomer mixture) of an internal mold release agent (STEPAN Company, product name, Zelec UN) and 0.070 g (500 ppm based on a total amount of the polymerizable monomer mixture) of an ultraviolet absorber (Kyodo Chemical Co., Ltd., product name, Viosorb 583), followed by mixing and dissolving them at 20° C. under a nitrogen atmosphere to give a homogeneous solution. To this homogeneous solution was added a mixed solution of 33.4 g of pentaerythritol tetrakis(3-mercaptopropionate) and 35.8 g of 4-mercaptomethyl-1,8-dimercapto-3,6-dithiaoctane, followed by mixing and dissolving them at 20° C. under a nitrogen atmosphere. This mixed solution was degassed at 20° C. under 400 Pa for 1 hour, then filtered through a 1-μm PTFE filter, and injected into a tape mold and a gasket mold. These molds were put into a polymerization oven and then gradually heated from 25° C. to 130° C. for 21 hours, and polymerization was conducted. After completion of the polymerization, the molds were taken out of the oven and demolded, thereby obtaining a lens comprising the resin. The obtained lens was additionally subjected to an annealing treatment at 130° C. for 2 hours.

The obtained lens had a refractive index (ne) of 1.597, an Abbe number (ve) of 40.2, a heat resistance (Tg) of 119.0° C., and a color of 3.9. There was no significant difference in these values between the lens molded with the tape mold and the lens molded with the gasket mold. Elution from the tape was confirmed since the presence of the non-transparent substance was confirmed in the lens molded with the tape mold. Deformation caused from the gasket deformation was confirmed in the lens molded with the gasket mold. Also, white turbidity other than presence of the non-transparent substance (white turbidity) due to elution from the tape was not confirmed in the lens molded with the tape mold, and the lens molded with the gasket mold is transparence. Striation was not observed in the lens prepared by any of the molds. The compositions of the mixture and the evaluation results are shown in [Table 1] and [Table 2], respectively.

Comparative Example A2

To 72.8 g of m-xylylene diisocyanate were added 0.28 g (2000 ppm based on the total amount of the polymerizable monomer mixture) of a mixture of 1.5 g (2.8 mmol) of an isopropyl alcohol solution (containing 25% of IPA) of tri-n-octylmethylammonium chloride and 0.5 g (5.2 mmol) of methane sulfonate (manufactured by Tokyo Chemical Industry Co., Ltd.), which had been mixed thoroughly as a polymerization catalyst, and subsequently, 0.14 g of an internal mold release agent (STEPAN Company, product name, Zelec UN) and 0.070 g of an ultraviolet absorber (Kyodo Chemical Co., Ltd., product name, Viosorb 583), followed by mixing and dissolving them at 20° C. to give a homogeneous solution. To this homogeneous solution was added a mixed solution of 67.2 g of 4-mercaptomethyl-1,8-dimercapto-3,6-dithiaoctane, followed by mixing and dissolving them at 20° C. This mixed solution was degassed at 20° C. under 400 Pa for 1 hour, then filtered through a 1-μm PTFE filter, and injected into a tape mold and a gasket mold. These molds were put into a polymerization oven and then gradually heated from 25° C. to 120° C. for 20 hours, and polymerization was conducted. After completion of the polymerization, the molds were taken out of the oven and demolded, thereby obtaining a lens comprising the resin. The obtained lens was additionally subjected to an annealing treatment at 120° C. for 2 hours.

The obtained lens had a refractive index (ne) of 1.664, an Abbe number (ve) of 31.2, a heat resistance (Tg) of 88.0° C., and a color of 4.9. There was no significant difference in these values between the lens molded with the tape mold and the lens molded with the gasket mold. Elution from the tape was not confirmed since the presence of the non-transparent substance was not confirmed in the lens molded with the tape mold. Deformation accompanying the gasket deformation was not confirmed in the lens molded with the gasket mold. Also, the lens molded with any of the molds had slight white turbidity and the striation was observed therein. The compositions of the mixture and the evaluation results are shown in [Table 1] and [Table 2], respectively.

Comparative Example A3

To 70.8 g of a mixture of 2,5-bis(isocyanatomethyl)-bicyclo[2.2.1]heptane and 2,6-bis(isocyanatomethyl)-bicyclo

[2.2.1]heptane was added 0.0182 g (130 ppm based on the total amount of the polymerizable monomer mixture) of zinc dibutyl dithiocarbamate as a polymerization catalyst, and subsequently, 0.168 g (1200 ppm based on the total amount of the polymerizable monomer mixture) of an internal mold release agent (STEPAN Company, product name, Zelec UN) and 0.070 g (500 ppm based on the total amount of the polymerizable monomer mixture) of an ultraviolet absorber (Kyodo Chemical Co., Ltd., product name, Viosorb 583), followed by mixing and dissolving them at 20° C. under a nitrogen atmosphere to give a homogeneous solution. To this homogeneous solution was added a mixed solution of 33.4 g of pentaerythritol tetrakis(3-mercaptopropionate) and 35.8 g of 4-mercaptomethyl-1,8-dimercapto-3,6-dithiaoctane, followed by mixing and dissolving them at 20° C. under a nitrogen atmosphere. This mixed solution was degassed at 20° C. under 400 Pa for 1 hour, then filtered through a 1-μm PTFE filter, and injected to a tape mold and a gasket mold. These molds were put into a polymerization oven and then gradually heated from 25° C. to 130° C. for 21 hours, and polymerization was conducted. After completion of the polymerization, the molds were taken out of the oven and demolded, thereby obtaining a lens comprising the resin. The obtained lens was additionally subjected to an annealing treatment at 130° C. for 2 hours.

The obtained lens had a refractive index (ne) of 1.598, an Abbe number (ve) of 40.8, a heat resistance (Tg) of 118.5° C., and a color of 4.5. There was no significant difference in these values between the lens molded with the tape mold and the lens molded with the gasket mold. The lenses molded with any of the molds had strong white turbidity and presence of the non-transparent substance could not be observed in the lens molded with the tape mold. Deformation accompanying the gasket deformation was not confirmed in the lens molded with the gasket mold. Also, the white turbidity of the lens was remarkable and thereby the striation could not be observed. The compositions of the mixture and the evaluation results are shown in [Table 1] and [Table 2], respectively.

Comparative Example A4

To 70.8 g of a mixture of 2,5-bis(isocyanatomethyl)-bicyclo[2.2.1]heptane and 2,6-bis(isocyanatomethyl)-bicyclo[2.2.1]heptane were added 0.0091 g (65 ppm based on the total amount of the polymerizable monomer mixture) of zinc dibutyl dithiocarbamate and 0.0133 g (95 ppm based on the total amount of the polymerizable monomer mixture) of an isopropyl alcohol solution (containing 25% of IPA) of tri-n-octylmethylammonium chloride as a polymerization catalyst, and subsequently, 0.168 g (1200 ppm based on the total amount of the polymerizable monomer mixture) of an internal mold release agent (STEPAN Company, product name, Zelec UN) and 0.070 g (500 ppm based on the total amount of the polymerizable monomer mixture) of an ultraviolet absorber (Kyodo Chemical Co., Ltd., product name, Viosorb 583), followed by mixing and dissolving them at 20° C. under a nitrogen atmosphere to give a homogeneous solution. To this homogeneous solution was added a mixed solution of 33.4 g of pentaerythritol tetrakis(3-mercaptopropionate) and 35.8 g of 4-mercaptomethyl-1,8-dimercapto-3,6-dithiaoctane, followed by mixing and dissolving them at 20° C. under a nitrogen atmosphere. This mixed solution was degassed at 20° C. under 400 Pa for 1 hour, then filtered through a 1-m PTFE filter, and injected to a tape mold and a gasket mold. These molds were put into a polymerization oven and then gradually heated from 25° C. to 130° C. for 21 hours, and polymerization was conducted. After completion of the polymerization, the molds were taken out of the oven and demolded, thereby obtaining a lens comprising the resin. The obtained lens was additionally subjected to an annealing treatment at 130° C. for 2 hours.

The obtained lens had a refractive index (ne) of 1.597, an Abbe number (ve) of 41.0, a heat resistance (Tg) of 117.0° C., and a color of 4.2. There was no significant difference in these values between the lens molded with the tape mold and the lens molded with the gasket mold. Elution from the tape was not confirmed since the presence of the non-transparent substance was not confirmed in the lens molded with the tape mold. Deformation accompanying the gasket deformation was confirmed in the lens molded with the gasket mold. Also, the lens molded with any of the molds was transparent and the striation was not observed therein. The compositions of the mixture and the evaluation results are shown in [Table 1] and [Table 2], respectively.

Comparative Example A5

To 70.8 g of a mixture of 2,5-bis(isocyanatomethyl)-bicyclo[2.2.1]heptane and 2,6-bis(isocyanatomethyl)-bicyclo[2.2.1]heptane were added 0.021 g (150 ppm based on the total amount of the polymerizable monomer mixture) of zinc dibutyl dithiocarbamate, and 0.021 g (150 ppm based on the total amount of the polymerizable monomer mixture) of methane sulfonate (manufactured by Tokyo Chemical Industry Co., Ltd.) as a polymerization catalyst, and as a result, the precipitate was produced in the solution. Thus, a homogeneous solution could not be obtained.

Comparative Example A6

To 70.8 g of a mixture of 2,5-bis(isocyanatomethyl)-bicyclo[2.2.1]heptane and 2,6-bis(isocyanatomethyl)-bicyclo[2.2.1]heptane was added 0.028 g (200 ppm based on the total amount of the polymerizable monomer mixture) of dibutyltin dichloride as a polymerization catalyst, and subsequently, 0.168 g (1200 ppm based on the total amount of the polymerizable monomer mixture) of an internal mold release agent (STEPAN Company, product name, Zelec UN) and 0.070 g (500 ppm based on the total amount of the polymerizable monomer mixture) of an ultraviolet absorber (Kyodo Chemical Co., Ltd., product name, Viosorb 583), followed by mixing and dissolving them at 20° C. under a nitrogen atmosphere to give a homogeneous solution. To this homogeneous solution was added a mixed solution of 33.4 g of pentaerythritol tetrakis(3-mercaptopropionate) and 35.8 g of 4-mercaptomethyl-1,8-dimercapto-3,6-dithiaoctane, followed by mixing and dissolving them at 20° C. under a nitrogen atmosphere. This mixed solution was degassed at 20° C. under 400 Pa for 1 hour, then filtered through a 1-μm PTFE filter, and injected to a tape mold and a gasket mold. These molds were put into a polymerization oven and then gradually heated from 25° C. to 130° C. for 21 hours, and polymerization was conducted. After completion of the polymerization, the molds were taken out of the oven and demolded, thereby obtaining a lens comprising the resin. The obtained lens was additionally subjected to an annealing treatment at 130° C. for 2 hours.

The obtained lens had a refractive index (ne) of 1.598, an Abbe number (ve) of 40.6, a heat resistance (Tg) of 117.9° C., and a color of 3.8. There was no significant difference in these values between the lens molded with the tape mold and the lens molded with the gasket mold. Elution from the tape was not confirmed since the presence of the non-transparent substance was not confirmed in the lens molded with the tape mold. Deformation accompanying the gasket deformation was not confirmed in the lens molded with the gasket mold. Also, the lens molded with any of the molds had no white turbidity observed therein and was transparent, and the striation was not observed. The heat-yellowing resistance ΔYI was 2.5 and the light resistance ΔYI was 1.4. The compositions of the mixture and the evaluation results are shown in [Table 1] and [Table 2], respectively.

Comparative Example A7

To 72.8 g of m-xylylene diisocyanate was added 0.21 g (150 ppm based on the total amount of the polymerizable monomer mixture) of dibutyltin dichloride as a polymerization catalyst, and subsequently, 0.14 g of an internal mold release agent (STEPAN Company, product name, Zelec UN) and 0.070 g of an ultraviolet absorber (Kyodo Chemical Co., Ltd., product name, Viosorb 583), followed by mixing and dissolving them at 20° C. to give a homogeneous solution. To this homogeneous solution was added a mixed solution of 67.2 g of 4-mercaptomethyl-1,8-dimercapto-3,6-dithiaoctane, followed by mixing and dissolving them at 20° C. This mixed solution was degassed at 20° C. under 400 Pa for 1 hour, then filtered through a 1-μm PTFE filter, and injected into a tape mold and a gasket mold. These molds were put into a polymerization oven and then gradually heated from 25° C. to 120° C. for 20 hours, and polymerization was conducted. After completion of the polymerization, the molds were taken out of the oven and demolded, thereby obtaining a lens comprising the resin. The obtained lens was additionally subjected to an annealing treatment at 120° C. for 2 hours.

The obtained lens had a refractive index (ne) of 1.665, an Abbe number (ve) of 31.2, a heat resistance (Tg) of 88.8° C., and a color of 4.6. There was no significant difference in these values between the lens molded with the tape mold and the lens molded with the gasket mold. Elution from the tape was not confirmed since the presence of the non-transparent substance was not confirmed in the lens molded with the tape mold. Deformation accompanying the gasket deformation was not confirmed in the lens molded with the gasket mold. Also, the lens molded with any of the molds was transparent and the striation was not observed therein. The heat-yellowing resistance ΔYI was 3.9 and the light resistance ΔYI was 1.1. The compositions of the mixture and the evaluation results are shown in [Table 1] and [Table 2], respectively.

TABLE 1

| | Compound (A) (g) | Compound (B) (g) | Zinc compound (a1) | Ammonium salt (a2) | Sulfonic acid (a3) |
|---|---|---|---|---|---|
| Example A1 | Mixture of 2,5-bis(isocyanatomethyl)-bicyclo[2,2,1]heptane and 2,6-bis(isocyanatomethyl)-bicyclo[2.2.1]heptane(70.8) | 4-Mercaptomethyl-1,8-dimercapto-3,6-dithiaoctane (35.8) pentaerythritol tetrakis(3-mercaptopropionate) (33.4) | ZnBTC 150 ppm | TOMAC 850 ppm | MSA 150 ppm |
| Example A2 | m-Xylylene diisocyanate (72.8) | 4-Mercaptomethyl-1,8-dimercapto-3,6-dithiaoctane (67.2) | ZnBTC 50 ppm | TOMAC 115 ppm | MSA 20 ppm |
| Example A3 | Mixture of 2,5-bis(isocyanatomethyl)-bicyclo[2,2,1]heptane and 2,6-bis(isocyanatomethyl)-bicyclo[2.2.1]heptane (70.8) | 4-Mercaptomethyl-1,8-dimercapto-3,6-dithiaoctane (35.8) pentaerythritol tetrakis(3-mercaptopropionate) (33.4) | Zinc chloride 43 ppm | TOMAC 850 ppm | MSA 150 ppm |
| Example A4 | m-Xylylene diisocyanate (72.8) | 4-Mercaptomethyl-1,8-dimercapto-3,6-dithiaoctane (67.2) | Zinc chloride 14 ppm | TOMAC 115 ppm | MSA 20 ppm |
| Example A5 | Mixture of 2,5-bis(isocyanatomethyl)-bicyclo[2,2,1]heptane and 2,6-bis(isocyanatomethyl)-bicyclo[2.2.1]heptane (70.8) | 4-Mercaptomethyl-1,8-dimercapto-3,6-dithiaoctane (35.8) pentaerythritol tetrakis(3-mercaptopropionate) (33.4) | ZnETC 115 ppm | TOMAC 850 ppm | MSA 150 ppm |
| Example A6 | m-Xylylene diisocyanate (72.8) | 4-Mercaptomethyl-1,8-dimercapto-3,6-dithiaoctane (67.2) | ZnETC 38 ppm | TOMAC 115 ppm | MSA 20 ppm |
| Example A7 | Mixture of 2,5-bis(isocyanatomethyl)-bicyclo[2,2,1]heptane and 2,6-bis(isocyanatomethyl)-bicyclo[2.2.1]heptane (70.8) | 4-Mercaptomethyl-1,8-dimercapto-3,6-dithiaoctane (35.8) pentaerythritol tetrakis(3-mercaptopropionate) (33.4) | ZnBTC 150 ppm | TBAB 510 ppm | MSA 150 ppm |
| Example A8 | m-Xylylene diisocyanate (72.8) | 4-Mercaptomethyl-1,8-dimercapto-3,6-dithiaoctane (67.2) | ZnBTC 50 ppm | TBAB 68 ppm | MSA 20 ppm |
| Comparative Example A1 | Mixture of 2,5-bis(isocyanatomethyl)-bicyclo[2,2,1]heptane and 2,6-bis(isocyanatomethyl)-bicyclo[2.2.1]heptane (70.8) | 4-Mercaptomethyl-1,8-dimercapto-3,6-dithiaoctane (35.8) pentaerythritol tetrakis(3-mercaptopropionate) (33.4) | — | TOMAC 3750 ppm | MSA 250 ppm |
| Comparative Example A2 | m-Xylylene diisocyanate (72.8) | 4-Mercaptomethyl-1,8-dimercapto-3,6-dithiaoctane (67.2) | — | TOMAC 1500 ppm | MSA 500 ppm |
| Comparative Example A3 | Mixture of 2,5-bis(isocyanatomethyl)-bicyclo[2,2,1]heptane and 2,6-bis(isocyanatomethyl)-bicyclo[2.2.1]heptane (70.8) | 4-Mercaptomethyl-1,8-dimercapto-3,6-dithiaoctane (35.8) pentaerythritol tetrakis(3-mercaptopropionate) (33.4) | ZnBTC 130 ppm | — | — |

TABLE 1-continued

| | Compound (A) (g) | Compound (B) (g) | Zinc compound (a1) | Ammonium salt (a2) | Sulfonic acid (a3) |
|---|---|---|---|---|---|
| Comparative Example A4 | Mixture of 2,5-bis(isocyanatomethyl)-bicyclo[2,2,1]heptane and 2,6-bis(isocyanatomethyl)-bicyclo[2.2.1]heptane (70.8) | 4-Mercaptomethyl-1,8-dimercapto-3,6-dithiaoctane (35.8) pentaerythritol tetrakis(3-mercaptopropionate) (33.4) | ZnBTC 65 ppm | TOMAC 95 ppm | — |
| Comparative Example A5 | Mixture of 2,5-bis(isocyanatomethyl)-bicyclo[2,2,1]heptane and 2,6-bis(isocyanatomethyl)-bicyclo[2.2.1]heptane (70.8) | — | ZnBTC 150 ppm | — | MSA 150 ppm |
| Comparative Example A6 | Mixture of 2,5-bis(isocyanatomethyl)-bicyclo[2,2,1]heptane and 2,6-bis(isocyanatomethyl)-bicyclo[2.2.1]heptane (70.8) | 4-Mercaptomethyl-1,8-dimercapto-3,6-dithiaoctane (35.8) pentaerythritol tetrakis(3-mercaptopropionate) (33.4) | Dibutyltin dichloride 200 ppm | | |
| Comparative Example A7 | m-Xylylene diisocyanate (72.8) | 4-Mercaptomethyl-1,8-dimercapto-3,6-dithiaoctane (67.2) | Dibutyltin dichloride 150 ppm | | |

ZnBTC: Zinc dibutyl dithiocarbamate
ZnETC: Zinc diethyl dithiocarbamate
TOMAC: Trioctylmethylammonium chloride
TBAB: Tetrabutylammonium bromide
MSA: Methanesulfonic acid

TABLE 2

| | ne | ve | Tg (° C.) | Color Y.I. | Elution from tape (tape mold) | Deformation of lens (gasket mold) | White turbidity | Polymerization inhomogeneity | Heat yellowing resistance ΔY.I | Light resistance ΔY.I. |
|---|---|---|---|---|---|---|---|---|---|---|
| Example A1 | 1.598 | 40.4 | 119.6 | 4.1 | None | None | None | None | 1.6 | 0.2 |
| Example A2 | 1.665 | 31.2 | 89.4 | 4.8 | None | None | None | None | 1.2 | 0.8 |
| Example A3 | 1.598 | 40.6 | 119.8 | 4.1 | None | None | None | None | 2.0 | 0.1 |
| Example A4 | 1.665 | 31.3 | 89.6 | 4.9 | None | None | None | None | 0.7 | 1.0 |
| Example A5 | 1.598 | 40.5 | 119.5 | 4.1 | None | None | None | None | 1.3 | 0.3 |
| Example A6 | 1.665 | 31.6 | 89.6 | 4.7 | None | None | None | None | 1.1 | 0.8 |
| Example A7 | 1.598 | 40.3 | 119.9 | 4.0 | None | None | None | None | 0.8 | 0.1 |
| Example A8 | 1.665 | 31.3 | 89.6 | 4.7 | None | None | None | None | 1.9 | 0.6 |
| Comparative Example A1 | 1.597 | 40.2 | 119.0 | 3.9 | Present | Present | None | None | — | — |
| Comparative Example A2 | 1.664 | 31.2 | 88.0 | 4.9 | None | None | Trace amount | Present | — | — |
| Comparative Example A3 | 1.598 | 40.8 | 118.5 | 4.5 | — | None | Present | — | — | — |
| Comparative Example A4 | 1.597 | 41.0 | 117.0 | 4.2 | None | Present | None | None | — | — |
| Comparative Example A5 | — | — | — | — | — | — | — | — | — | — |
| Comparative Example A6 | 1.598 | 40.6 | 117.9 | 3.8 | None | None | None | None | 2.5 | 1.4 |
| Comparative Example A7 | 1.665 | 31.2 | 88.8 | 4.6 | None | None | None | None | 3.9 | 1.1 |

From the results above, it was confirmed that the polymerization catalyst for a polythiourethane optical material of the present invention has excellent catalytic activity in a low-temperature region as well as excellent balance in catalytic activities in the low-temperature region and high-temperature region, as compared with an organic tin catalyst, and thus, polymerization of the polymerizable composition in the low-temperature region proceeds sufficiently. For this reason, it was confirmed that by the polymerizable composition for a polythiourethane optical material of the present invention including this catalyst, occurrence of white turbidity, striae, or the like is suppressed, whereby a molded product (optical lens) having a desired shape with excellent transparency, heat-yellowing resistance, and light resistance can be obtained. As such, a molded product including the resin of the present invention has excellent balance in performance as an optical material, and therefore, it can be more suitably used as an optical material.

Therefore, the catalyst of the present invention is a non-metallic catalyst having excellent catalytic activity which is a substitutes for an organic tin catalyst conventionally used as a catalyst for a polythiourethane optical material, and is useful as a novel non-metallic catalyst which is a substitutes for an organic tin catalyst, where the regulations on the use of such organic tin catalysts recently have been strengthened.

Example B

As the tests of performance of the lens, the color, refractive index, Abbe number, heat resistance, elution from the tape, deformation of a lens, white turbidity, polymerization inhomogeneity, heat-yellowing resistance, and light resistance were evaluated in the same manner as in Example A.

Example B1

To 70.8 g of a mixture of 2,5-bis(isocyanatomethyl)-bicyclo[2.2.1]heptane and 2,6-bis(isocyanatomethyl)-bicyclo[2.2.1]heptane was added 0.070 g (500 ppm based on the total amount of the polymerizable monomer mixture) of tetrabutylammonium methane sulfonate as a polymerization catalyst, and subsequently, 0.168 g (1200 ppm based on the total amount of the polymerizable monomer mixture) of an internal mold release agent (STEPAN Company, product name, Zelec UN) and 0.070 g (500 ppm based on the total amount of the polymerizable monomer mixture) of an ultraviolet absorber (Kyodo Chemical Co., Ltd., product name, Viosorb 583), followed by mixing and dissolving them at 20° C. under a nitrogen atmosphere to give a homogeneous solution. To this homogeneous solution was added a mixed solution of 33.4 g of pentaerythritol tetrakis(3-mercaptopropionate) and 35.8 g of 4-mercaptomethyl-1,8-dimercapto-3,6-dithiaoctane, in which 0.0014 g (10 ppm based on the total amount of the polymerizable monomer mixture) of zinc chloride (manufactured by Wako Pure Chemical Industries Ltd.) had been dissolved overnight as a polymerization catalyst, followed by mixing and dissolving them at 20° C. under a nitrogen atmosphere. This mixed solution was degassed at 20° C. under 400 Pa for 1 hour, and then filtered through a 1-μm PTFE filter. Then, a glass mold was prepared in which the periphery of two sheets of plate glass with a separation distance of 9 mm was wrapped with a tape, and a gasket mold was prepared in which two sheets of plate glass with a separation distance of 9 mm were inserted to a gasket and both sides are pinched by clips, and the above mixed solution was injected into each of these molds. These molds were put into a polymerization oven and then gradually heated from 25° C. to 130° C. for 21 hours, and polymerization was conducted. After completion of the polymerization, the molds were taken out of the oven and demolded, thereby obtaining a lens comprising the resin. The obtained lens was additionally subjected to an annealing treatment at 130° C. for 2 hours.

The obtained lens had a refractive index (ne) of 1.598, an Abbe number (ve) of 40.4, a heat resistance (Tg) of 120.3° C., and a color of 3.9. There was no significant difference in these values between the resin molded with the tape mold and the resin molded with the gasket mold. Elution from the tape was not confirmed during the molding since the presence of the non-transparent substance was not confirmed in the lens molded with the tape mold. Further, the deformation caused from the gasket deformation was not confirmed in the lens molded with the gasket mold. Also, the lens molded with any of the molds was transparent and the striation was not observed. The heat-yellowing resistance ΔYI was 1.2 and the light resistance ΔYI was 0.1 which were respectively better than 2.5 and 1.4 obtained in Comparative Example B1. The compositions of the mixture and the evaluation results are shown in [Table 3] and [Table 4], respectively.

Example B2

The procedure was carried out in the same manner as in Example B1 except that zinc dibutyl dithiocarbamate (ZnBTC) was used instead of zinc chloride as the zinc compound.

The obtained lens had a refractive index (ne) of 1.598, an Abbe number (ve) of 40.4, a heat resistance (Tg) of 119.4° C., and a color of 4.1. There was no significant difference in these values between the resin molded with the tape mold and the resin molded with the gasket mold. Elution from the tape was not confirmed during the molding since the presence of the non-transparent substance was not confirmed in the lens molded with the tape mold. Further, the deformation caused from the gasket deformation was not confirmed in the lens molded with the gasket mold. Also, the lens molded with any of the molds was transparent and the striation was not observed. The heat-yellowing resistance ΔYI was 0.7 and the light resistance ΔYI was 0.2, which were respectively better than 2.5 and 1.4 obtained in Comparative Example B1. The compositions of the mixture and the evaluation results are shown in [Table 3] and [Table 4], respectively.

Example B3

To 72.8 g of m-xylylene diisocyanate was added 0.010 g (72 ppm based on the total amount of the polymerizable monomer mixture) of tetrabutylammonium methane sulfonate as a polymerization catalyst, and subsequently, 0.140 g (1000 ppm based on the total amount of the polymerizable monomer mixture) of an internal mold release agent (STEPAN Company, product name, Zelec UN) and 0.070 g (500 ppm based on the total amount of the polymerizable monomer mixture) of an ultraviolet absorber (Kyodo Chemical Co., Ltd., product name, Viosorb 583), followed by mixing and dissolving them at 20° C. under a nitrogen atmosphere to give a homogeneous solution. To this homogeneous solution was added a mixed solution of 67.2 g of 4-mercaptomethyl-1,8-dimercapto-3,6-dithiaoctane, in which 0.0070 g (50 ppm based on the total amount of the polymerizable monomer mixture) of zinc dibutyl dithiocarbamate (ZnBTC) had been dissolved overnight as a polymerization catalyst, followed by mixing and dissolving them at 20° C. This mixed solution was degassed at 20° C. under 400 Pa for 1 hour, then filtered through a 1-μm PTFE filter, and injected into a tape mold and a gasket mold. These molds were put into a polymerization oven and then gradually heated from 25° C. to 120° C. for 20 hours, and polymerization was conducted. After completion of the polymerization, the molds were taken out of the oven and demolded, thereby obtaining a lens comprising the resin. The obtained lens was additionally subjected to an annealing treatment at 120° C. for 2 hours.

The obtained lens had a refractive index (ne) of 1.665, an Abbe number (ve) of 31.1, a heat resistance (Tg) of 89.7° C., and a color of 4.8. There was no significant difference in these values between the resin molded with the tape mold and the resin molded with the gasket mold. Elution from the tape was not confirmed since the presence of the non-transparent substance was not confirmed in the lens molded with the tape mold. Further, the deformation caused from the gasket deformation was not confirmed in the lens molded with the gasket mold. Also, the lens molded with any of the molds was transparent and the striation was not observed. The heat-yellowing resistance ΔYI was 2.8 and the light resistance ΔYI was 0.3 which were respectively better than 3.9 and 1.1 obtained in Comparative Example B2. The compositions of the mixture and the evaluation results are shown in [Table 3] and [Table 4], respectively.

Example B4

The procedure was carried out in the same manner as in Example B1 except that zinc bromide was used instead of zinc chloride as the zinc compound. The obtained lens had a refractive index (ne) of 1.598, an Abbe number (ve) of 40.4, a heat resistance (Tg) of 119.8° C., and a color of 3.9. There was no significant difference in these values between the resin molded with the tape mold and the resin molded with the gasket mold. Elution from the tape was not confirmed during the molding since the presence of the non-transparent substance was not confirmed in the lens molded with the tape mold. Further, the deformation caused from the gasket deformation was not confirmed in the lens molded with the gasket mold. Also, the lens molded with any of the molds was transparent and the striation was not observed. The heat-yellowing resistance ΔYI was 1.2 and the light resistance ΔYI was 0.1 which were respectively better than 2.5 and 1.4 obtained in Comparative Example B1. The compositions of the mixture and the evaluation results are shown in [Table 3] and [Table 4], respectively.

Example B5

The procedure was carried out in the same manner as in Example B3 except that zinc bromide was used instead of zinc dibutyl dithiocarbamate (ZnBTC) as the zinc compound. The obtained lens had a refractive index (ne) of 1.665, an Abbe number (ve) of 31.3, a heat resistance (Tg) of 89.5° C., and a color of 4.7. There was no significant difference in these values between the resin molded with the tape mold and the resin molded with the gasket mold. Elution from the tape was not confirmed since the presence of the non-transparent substance was not confirmed in the lens molded with the tape mold. Further, the deformation caused from the gasket deformation was not confirmed in the lens molded with the gasket mold. Also, the lens molded with any of the molds was transparent and the striation was not observed.

The heat-yellowing resistance ΔYI was 2.6 and the light resistance ΔYI was 0.2 which were respectively better than 3.9 and 1.1 obtained in Comparative Example B2. The compositions of the mixture and the evaluation results are shown in [Table 3] and [Table 4], respectively.

Comparative Example B1

To 70.8 g of a mixture of 2,5-bis(isocyanatomethyl)-bicyclo[2.2.1]heptane and 2,6-bis(isocyanatomethyl)-bicyclo[2.2.1]heptane was added 0.028 g (200 ppm based on the total amount of the polymerizable monomer mixture) of dibutyltin dichloride as a polymerization catalyst, and subsequently, 0.168 g (1200 ppm based on the total amount of the polymerizable monomer mixture) of an internal mold release agent (STEPAN Company, product name, Zelec UN) and 0.070 g (500 ppm based on the total amount of the polymerizable monomer mixture) of an ultraviolet absorber (Kyodo Chemical Co., Ltd., product name, Viosorb 583), followed by mixing and dissolving them at 20° C. under a nitrogen atmosphere to give a homogeneous solution. To this homogeneous solution was added a mixed solution of 33.4 g of pentaerythritol tetrakis(3-mercaptopropionate) and 35.8 g of 4-mercaptomethyl-1,8-dimercapto-3,6-dithiaoctane, followed by mixing and dissolving them at 20° C. under a nitrogen atmosphere. This mixed solution was degassed at 20° C. under 400 Pa for 1 hour, then filtered through a 1-μm PTFE filter, and injected into a mold including a glass mold and a tape and a mold including a glass mold and a gasket. These molds were put into a polymerization oven and then gradually heated from 25° C. to 130° C. for 21 hours, and polymerization was conducted. After completion of the polymerization, the molds were taken out of the oven and demolded, thereby obtaining a lens comprising the resin. The obtained lens was additionally subjected to an annealing treatment at 130° C. for 2 hours.

The obtained lens had a refractive index (ne) of 1.598, an Abbe number (ve) of 40.6, a heat resistance (Tg) of 117.9° C., and a color of 3.8. There was no significant difference in these values between the resin molded with the tape mold and the resin molded with the gasket mold. Elution from the tape was not confirmed since the presence of the non-transparent substance was not confirmed in the lens molded with the tape mold. Further, the deformation caused from the gasket deformation was not confirmed in the lens molded with the gasket mold. Also, the lens molded with any of the molds had no white turbidity observed therein and was transparent, and the striation was not observed. The heat-yellowing resistance ΔYI was 2.5 and the light resistance ΔYI was 1.4. The compositions of the mixture and the evaluation results are shown in [Table 3] and [Table 4], respectively.

Comparative Example B2

To 72.8 g of m-xylylene diisocyanate was added 0.21 g (150 ppm based on the total amount of the polymerizable monomer mixture) of dibutyltin dichloride as a polymerization catalyst, and subsequently, 0.14 g of an internal mold release agent (STEPAN Company, product name, Zelec UN) and 0.070 g of an ultraviolet absorber (Kyodo Chemical Co., Ltd., product name, Viosorb 583), followed by mixing and dissolving them at 20° C. to give a homogeneous solution. To this homogeneous solution was added a mixed solution of 67.2 g of 4-mercaptomethyl-1,8-dimercapto-3,6-dithiaoctane, followed by mixing and dissolving them at 20° C. This mixed solution was degassed at 20° C. under 400 Pa for 1 hour, then filtered through a 1-μm PTFE filter, and injected into a tape mold and a gasket mold. These molds were put into a polymerization oven and then gradually heated from 25° C. to 120° C. for 20 hours, and polymerization was conducted. After completion of the polymerization, the molds were taken out of the oven and demolded, thereby obtaining a lens comprising the resin. The obtained lens was additionally subjected to an annealing treatment at 120° C. for 2 hours.

The obtained lens had a refractive index (ne) of 1.665, an Abbe number (ve) of 31.2, a heat resistance (Tg) of 88.8° C., and a color of 4.6. There was no significant difference in these values between the resin molded with the tape mold and the resin molded with the gasket mold. Elution from the tape was not confirmed since the presence of the non-transparent substance was not confirmed in the lens molded with the tape mold. Further, the deformation caused from the gasket deformation was not confirmed in the lens molded with the gasket mold. Also, the lens molded with any of the molds was transparent and the striation was not observed. The heat-yellowing resistance ΔYI was 3.9 and the light resistance ΔYI was 1.1. The compositions of the mixture and the evaluation results are shown in [Table 3] and [Table 4], respectively.

Comparative Example B3

To 70.8 g of a mixture of 2,5-bis(isocyanatomethyl)-bicyclo[2.2.1]heptane and 2,6-bis(isocyanatomethyl)-bicyclo[2.2.1]heptane were added 0.168 g (1200 ppm based on the total amount of the polymerizable monomer mixture) of an internal mold release agent (STEPAN Company, product name, Zelec UN) and 0.070 g (500 ppm based on the total amount of the polymerizable monomer mixture) of an ultraviolet absorber (Kyodo Chemical Co., Ltd., product name, Viosorb 583), followed by mixing and dissolving them at 20°

C. under a nitrogen atmosphere to give a homogeneous solution. To this homogeneous solution was added a mixed solution of 33.4 g of pentaerythritol tetrakis(3-mercaptopropionate) and 35.8 g of 4-mercaptomethyl-1,8-dimercapto-3,6-dithiaoctane, in which 0.0014 g (10 ppm based on the total amount of the polymerizable monomer mixture) of zinc chloride (manufactured by Wako Pure Chemical Industries Ltd.) had been dissolved overnight as a polymerization catalyst, followed by mixing and dissolving them at 20° C. under a nitrogen atmosphere. This mixed solution was degassed at 20° C. under 400 Pa for 1 hour, and then filtered through a 1-μm PTFE filter. Then, a glass mold was prepared in which the periphery of plate glass was wrapped with a tape and a gasket mold was prepared in which plate glass was inserted to a gasket and both sides are pinched by clips, and the above mixed solution was injected into each of these molds. These molds were put into a polymerization oven and then gradually heated from 25° C. to 130° C. for 21 hours, and polymerization was conducted. After completion of the polymerization, the molds were taken out of the oven and demolded, thereby obtaining a lens comprising the resin. The obtained lens was additionally subjected to an annealing treatment at 130° C. for 2 hours.

The lens molded by any of the molds had white turbidity, and thus, the presence of the non-transparent substance could not be observed in the lens molded with the tape mold. Deformation accompanying the gasket deformation was not confirmed in the lens molded with the gasket mold. Also, the striation could not be observed. The compositions of the mixture and the evaluation results are shown in [Table 3] and [Table 4], respectively.

Comparative Example B4

To 70.8 g of a mixture of 2,5-bis(isocyanatomethyl)-bicyclo[2.2.1]heptane and 2,6-bis(isocyanatomethyl)-bicyclo[2.2.1]heptane was added 0.280 g (2000 ppm based on the total amount of the polymerizable monomer mixture) of tetrabutylammonium p-toluene sulfonate, and subsequently, 0.168 g (1200 ppm based on the total amount of the polymerizable monomer mixture) of an internal mold release agent (STEPAN Company, product name, Zelec UN) and 0.070 g (500 ppm based on the total amount of the polymerizable monomer mixture) of an ultraviolet absorber (Kyodo Chemical Co., Ltd., product name, Viosorb 583) were added thereto, followed by mixing and dissolving them at 20° C. under a nitrogen atmosphere to give a homogeneous solution. To this homogeneous solution was added a mixed solution of 33.4 g of pentaerythritol tetrakis(3-mercaptopropionate) and 35.8 g of 4-mercaptomethyl-1,8-dimercapto-3,6-dithiaoctane, followed by mixing and dissolving them at 20° C. under a nitrogen atmosphere. This mixed solution was degassed at 20° C. under 400 Pa for 1 hour, and then filtered through a 1-μm PTFE filter. Then, a glass mold was prepared in which the periphery of plate glass was wrapped with a tape and a gasket mold was prepared in which plate glass was inserted to a gasket and both sides are pinched by clips, and the above mixed solution was injected into each of these molds. These molds were put into a polymerization oven and then gradually heated from 25° C. to 130° C. for 21 hours, and polymerization was conducted. After completion of the polymerization, the molds were taken out of the oven and demolded, thereby obtaining a lens comprising the resin. The obtained lens was additionally subjected to an annealing treatment at 130° C. for 2 hours.

The obtained lens had a refractive index (ne) of 1.598, an Abbe number (ve) of 40.7, a heat resistance (Tg) of 119.3° C., and a color of 4.6. There was no significant difference in these values between the resin molded with the tape mold and the resin molded with the gasket mold. Elution from the tape was confirmed since the presence of the non-transparent substance was confirmed in the lens molded with the tape mold. Further, the deformation caused from the gasket deformation was confirmed in the lens molded with the gasket mold. Also, the lens molded with any of the molds was transparent, but the striation was observed. The compositions of the mixture and the evaluation results are shown in [Table 3] and [Table 4], respectively.

TABLE 3

| | Compound (A) (g) | Compound (B) (g) | Zinc compound (a1) | Ammonium salt (a4) |
|---|---|---|---|---|
| Example B1 | Mixture of 2,5-bis(isocyanatomethyl)-bicyclo[2.2.1]heptane and 2,6-bis(isocyanatomethyl)-bicyclo[2.2.1]heptane (70.8) | 4-Mercaptomethyl-1,8-dimercapto-3,6-dithiaoctane (35.8) Pentaerythritol tetrakis(3-mercaptopropionate) (33.4) | Zinc chloride 10 ppm | TBAMS 500 ppm |
| Example B2 | Mixture of 2,5-bis(isocyanatomethyl)-bicyclo[2.2.1]heptane and 2,6-bis(isocyanatomethyl)-bicyclo[2.2.1]heptane (70.8) | 4-Mercaptomethyl-1,8-dimercapto-3,6-dithiaoctane (35.8) Pentaerythritol tetrakis(3-mercaptopropionate) (33.4) | ZnBTC 150 ppm | TBAMS 532 ppm |
| Example B3 | m-Xylylene diisocyanate (72.8) | 4-Mercaptomethyl-1,8-dimercapto-3,6-dithiaoctane (67.2) | ZnBTC 50 ppm | TBAMS 72 ppm |
| Example B4 | Mixture of 2,5-bis(isocyanatomethyl)-bicyclo[2.2.1]heptane and 2,6-bis(isocyanatomethyl)-bicyclo[2.2.1]heptane (70.8) | 4-Mercaptomethyl-1,8-dimercapto-3,6-dithiaoctane (35.8) Pentaerythritol tetrakis(3-mercaptopropionate) (33.4) | Zinc bromide 71 ppm | TBAMS 532 ppm |
| Example B5 | m-Xylylene diisocyanate (72.8) | 4-Mercaptomethyl-1,8-dimercapto-3,6-dithiaoctane (67.2) | Zinc bromide 24 ppm | TBAMS 72 ppm |
| Comparative Example B1 | Mixture of 2,5-bis(isocyanatomethyl)-bicyclo[2.2.1]heptane and 2,6-bis(isocyanatomethyl)-bicyclo[2.2.1]heptane (70.8) | 4-Mercaptomethyl-1,8-dimercapto-3,6-dithiaoctane (35.8) Pentaerythritol tetrakis(3-mercaptopropionate) (33.4) | Dibutyltin dichloride 200 ppm | |

TABLE 3-continued

|  | Compound (A) (g) | Compound (B) (g) | Zinc compound (a1) | Ammonium salt (a4) |
|---|---|---|---|---|
| Comparative Example B2 | m-Xylylene diisocyanate (72.8) | 4-Mercaptomethyl-1,8-dimercapto-3,6-dithiaoctane (67.2) | Dibutyltin dichloride 150 ppm | |
| Comparative Example B3 | Mixture of 2,5-bis(isocyanatomethyl)-bicyclo[2.2.1]heptane and 2,6-bis(isocyanatomethyl)-bicyclo[2.2.1]heptane (70.8) | 4-Mercaptomethyl-1,8-dimercapto-3,6-dithiaoctane (35.8) Pentaerythritol tetrakis(3-mercaptopropionate) (33.4) | Zinc chloride 10 ppm | — |
| Comparative Example B4 | Mixture of 2,5-bis(isocyanatomethyl)-bicyclo[2.2.1]heptane and 2,6-bis(isocyanatomethyl)-bicyclo[2.2.1]heptane (70.8) | 4-Mercaptomethyl-1,8-dimercapto-3,6-dithiaoctane (35.8) Pentaerythritol tetrakis(3-mercaptopropionate) (33.4) | — | TBAPTS 2000 ppm |

ZnBTC: Zinc dibutyl dithiocarbamate
TBAMS: Tetrabutylammonium methane sulfonate
TBAPTS: Tetrabutylammonium p-toluene sulfonate

TABLE 4

| | ne | ve | Tg (°C.) | Color Y.I. | Elution from tape (tape mold) | Deformation of lens (gasket mold) | White turbidity | Polymerization inhomogeneity | Heat yellowing resistance ΔY.I. | Light resistance ΔY.I. |
|---|---|---|---|---|---|---|---|---|---|---|
| Example B1 | 1.598 | 40.4 | 120.3 | 3.9 | None | None | None | None | 1.2 | 0.1 |
| Example B2 | 1.598 | 40.4 | 119.4 | 4.1 | None | None | None | None | 0.7 | 0.2 |
| Example B3 | 1.665 | 31.1 | 89.7 | 4.8 | None | None | None | None | 2.8 | 0.3 |
| Example B4 | 1.598 | 40.4 | 119.8 | 3.9 | None | None | None | None | 1.2 | 0.1 |
| Example B5 | 1.665 | 31.3 | 89.5 | 4.7 | None | None | None | None | 2.6 | 0.2 |
| Comparative Example B1 | 1.598 | 40.6 | 117.9 | 3.8 | None | None | None | None | 2.5 | 1.4 |
| Comparative Example B2 | 1.665 | 31.2 | 88.8 | 4.6 | None | None | None | None | 3.9 | 1.1 |
| Comparative Example B3 | — | — | — | — | — | None | Present | — | — | — |
| Comparative Example B4 | 1.598 | 40.7 | 119.3 | 4.6 | Present | Present | None | Present | — | — |

In Example B1, the lens obtained by using the catalyst of the present invention had equivalent optical properties and colors of the resin, but had improved heat resistance, as compared with the lens obtained by using di-n-butyl tin dichloride catalyst which is a conventional organic tin catalyst of Comparative Example B1. Moreover, the non-transparent substance, deformation of the resin, and the striation was confirmed in Comparative Example B4, but not confirmed in Example B1.

From the results above, it was confirmed that the polymerization catalyst for a polythiourethane optical material of the present invention has excellent catalytic activity in a low-temperature region as well as excellent balance in catalytic activities in the low-temperature region and high-temperature region, as compared with an organic tin catalyst, and thus, polymerization of the polymerizable composition in the low-temperature region proceeds sufficiently. For this reason, it was confirmed that by the polymerizable composition for a polythiourethane optical material of the present invention including this catalyst, occurrence of white turbidity, striae, or the like is suppressed, whereby a molded product (optical lens) having a desired shape with excellent transparency, heat-yellowing resistance, and light resistance can be obtained. As such, a molded product including the resin of the present invention has excellent balance in performance as an optical material, and therefore, it can be more suitably used as the optical material.

Therefore, the catalyst of the present invention is a metallic catalyst having excellent catalytic activity which is a substitutes for an organic tin catalyst conventionally used as a catalyst for a polythiourethane optical material, and recently has become useful as a novel metallic catalyst which is a substitutes for an organic tin catalyst, where the regulations on the use of such organic tin catalysts have been strengthened.

Further, the present invention may have the following embodiments.

[a1] A polymerizable composition for a polythiourethane optical material, including:
one or two or more kinds of zinc compound selected from the group consisting of zinc dithiocarbamates, zinc sulfonates, zinc salts of mono- or di-alkyl phosphoric acid esters, bis(substituted acetylacetonato) zinc, and zinc halides,
a compound represented by the following general formula (1):

(wherein $R^1$, $R^2$, $R^3$, and $R^4$ each independently represent hydrogen, or linear-chained aliphatic residue, cyclic aliphatic residue, or aromatic organic residue which is a monovalent or higher valent. $R^1$, $R^2$, $R^3$, and $R^4$ may be bonded to each other to form a ring. X represents a halogen atom. Y represents a nitrogen or phosphorous atom.)

a sulfonic acid represented by the following general formula (2):

(wherein n represents an integer of 1 or 2, and $R^5$ represents linear-chained aliphatic residue, branched aliphatic residue, cyclic aliphatic residue, or aromatic organic residue, which is a monovalent or higher valent and which may include a hydroxyl group or an amino group), one or two or more kinds of isocyanates selected from an isocyanate compound and an isothiocyanate compound, and one or two or more kinds of active hydrogen compounds each having a mercapto group.

[a2] The polymerizable composition for a polythiourethane optical material as set forth in [a1], wherein the zinc dithiocarbamate is represented by the following general formula (3):

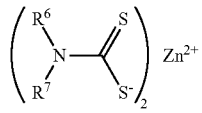

(wherein $R^6$ and $R^7$ represent an alkyl group having 1 to 10 carbon atoms, a phenylalkyl group having 7 to 10 carbon atoms, or an aryl group having 6 to 10 carbon atoms, and may be the same as or different from each other. Further, $R^6$ and $R^7$ may be bonded to each other to form a ring).

[a3] The polymerizable composition for a polythiourethane optical material as set forth in [a2], wherein $R^6$ and $R^7$ in the general formula (3) each independently represent an alkyl group having 1 to 8 carbon atoms.

[a4] The polymerizable composition for a polythiourethane optical material as set forth in any one of [a1] to [a3], wherein the zinc dithiocarbamate is one or two or more kinds selected from the group consisting of zinc dimethyl dithiocarbamate, zinc diethyl dithiocarbamate, and zinc di-n-butyl dithiocarbamate.

[a5] The polymerizable composition for a polythiourethane optical material as set forth in any one of [a1] to [a4], wherein in the general formula (1), Y is nitrogen, and $R^1$, $R^2$, $R^3$, and $R^4$ are each independently selected from the group consisting of an alkyl group having 1 to 18 carbon atoms, a hydroxyalkyl group having 1 to 18 carbon atoms, a phenyl group, a phenylalkyl group having 7 to 18 carbon atoms, and an aminoalkyl group having 1 to 18 carbon atoms.

[a6] The polymerizable composition for a polythiourethane the general formula (1) are each independently selected from the group consisting of an alkyl group having 1 to 8 carbon atoms and a phenylalkyl group having 7 to 10 carbon atoms.

[a7] The polymerizable composition for a polythiourethane optical material as set forth in [a6], wherein the compound of the general formula (1) is one or two or more kinds selected from the group consisting of a tetramethylammonium salt, a tetraethylammonium salt, a tetrapropylammonium salt, a tetrabutylammonium salt, a trioctylmethylammonium salt, and a tributylbenzylammonium salt.

[a8] The polymerizable composition for a polythiourethane optical material as set forth in [a7], wherein the compound of the general formula (1) is one or two or more kinds selected from the group consisting of tetrabutylammonium chloride, tetrabutylammonium bromide, tetraethylammonium bromide, trioctylmethylammonium chloride, and tributylbenzylammonium chloride.

[a9] The polymerizable composition for a polythiourethane optical material as set forth in any one of [a1] to [a8], wherein the sulfonic acid represented by the general formula (2) is alkylsulfonic acid having 1 to 16 carbon atoms, benzenesulfonic acid, toluenesulfonic acid, or dodecylbenzenesulfonic acid.

[a10] The polymerizable composition for a polythiourethane optical material as set forth in [a9], wherein the sulfonic acid represented by the general formula (2) is methanesulfonic acid, toluenesulfonic acid, or dodecylbenzenesulfonic acid.

[a11] The polymerizable composition for a polythiourethane optical material as set forth in any one of [a1] to [a10], wherein the molar ratio of the compound of the general formula (1) to the zinc compound is 0.01 to 100, and the molar ratio of the compound of the general formula (2) to the compound of the general formula (1) is 0.01 to 100.

[a12] The polymerizable composition for a polythiourethane optical material as set forth in any one of [a1] to [a11], wherein the isocyanate is an isocyanate compound.

[a13] The polymerizable composition for a polythiourethane optical material as set forth in [a12], wherein the isocyanate compound is m-xylylene diisocyanate, 2,5-bis(isocyanatomethyl)-bicyclo[2.2.1]heptane, 2,6-bis(isocyanatomethyl)-bicyclo[2.2.1]heptane, bis(isocyanatomethyl)cyclohexane, or hexamethylene diisocyanate, and the active hydrogen compound is 4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, pentaerythritol tetrakis(3-mercaptopropionate), 1,1,3,3-tetrakis(mercaptomethylthio)propane, 1,1,2,2-tetrakis(mercaptomethylthio)ethane, 4,6-bis(mercaptomethylthio)-1,3-dithiane, or 2-(2,2-bis(mercaptodimethylthio)ethyl)-1,3-dithietane.

[a14] A polythiourethane optical material obtained by curing the polymerizable composition as set forth in any one of [a1] to [a13].

[a15] A plastic lens comprising the polythiourethane optical material as set forth in [a14].

[a16] A method for preparing a polythiourethane optical material, including cast-polymerizing the polymerizable composition as set forth in any one of [a1] to [a13].

[a17] The preparation method as set forth in [a16], wherein cast-polymerizing the polymerizable composition includes cast-polymerizing a polymerizable composition for a polythiourethane optical material containing 0.0005 parts by weight to 5 parts by weight of the sum of the zinc compound (a1), the compound of the general formula (1), and the compound of the general formula (2), based on 100 parts by weight of the total amount of the isocyanate and the active hydrogen compound.

[a18] A polymerization catalyst for a polythiourethane optical material, comprising:

one or two or more kinds of zinc compound selected from the group consisting of zinc dithiocarbamates, zinc sulfonates, zinc salts of mono- or di-alkyl phosphoric acid esters, bis(substituted acetylacetonato) zinc, and zinc halides, a compound represented by the following general formula (1):

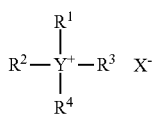
(1)

(wherein $R^1$, $R^2$, $R^3$, and $R^4$ each independently represent hydrogen, or linear-chained aliphatic residue, cyclic aliphatic residue, or aromatic organic residue which is a monovalent or higher valent. $R^1$, $R^2$, $R^3$, and $R^4$ may be bonded to each other to form a ring. X represents a halogen atom. Y represents a nitrogen or phosphorous atom.), a sulfonic acid represented by the following general formula (2):

(2)

(wherein n represents an integer of 1 or 2, and $R^5$ represents linear-chained aliphatic residue, branched aliphatic residue, cyclic aliphatic residue, or aromatic organic residue, which is a monovalent or higher valent and which may include a hydroxyl group or an amino group).

one or two or more kinds of isocyanates selected from an isocyanate compound and an isothiocyanate compound, and one or two or more kinds of active hydrogen compounds each having a mercapto group.

[a19] The polymerization catalyst for a polythiourethane optical material as set forth in [a18], wherein the zinc dithiocarbamate is represented by the following general formula (3):

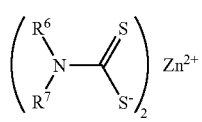
(3)

(wherein $R^6$ and $R^7$ represent an alkyl group having 1 to 10 carbon atoms, a phenylalkyl group having 7 to 10 carbon atoms, or an aryl group having 6 to 10 carbon atoms, and may be the same as or different from each other. Further, $R^6$ and $R^7$ may be bonded to each other to form a ring).

[a20] The polymerization catalyst for a polythiourethane optical material as set forth in [a19], wherein $R^6$ and $R^7$ in the general formula (3) each independently represent an alkyl group having 1 to 8 carbon atoms.

[a21] The polymerization catalyst for a polythiourethane optical material as set forth in any one of [a18] to [a20], wherein the zinc dithiocarbamate is one or two or more kinds selected from the group consisting of zinc dimethyl dithiocarbamate, zinc diethyl dithiocarbamate, and zinc di-n-butyl dithiocarbamate.

[a22] The polymerization catalyst for a polythiourethane optical material as set forth in any one of [a18] to [a21], wherein in the general formula (1),
Y is nitrogen, and
$R^1$, $R^2$, $R^3$, and $R^4$ are each independently selected from the group consisting of an alkyl group having 1 to 18 carbon atoms, a hydroxyalkyl group having 1 to 18 carbon atoms, a phenyl group, a phenylalkyl group having 7 to 18 carbon atoms, and an aminoalkyl group having 1 to 18 carbon atoms.

[a23] The polymerization catalyst for a polythiourethane optical material as set forth in [a22], wherein $R^1$, $R^2$, $R^3$, and $R^4$ in the general formula (1) are each independently selected from the group consisting of an alkyl group having 1 to 8 carbon atoms and a phenylalkyl group having 7 to 10 carbon atoms.

[a24] The polymerization catalyst for a polythiourethane optical material as set forth in [a23], wherein the compound of the general formula (1) is one or two or more kinds selected from the group consisting of a tetramethylammonium salt, a tetraethylammonium salt, a tetrapropylammonium salt, a tetrabutylammonium salt, a trioctylmethylammonium salt, and a tributylbenzylammonium salt.

[a25] The polymerization catalyst for a polythiourethane optical material as set forth in [a24], wherein the compound of the general formula (1) is one or two or more kinds selected from the group consisting of tetrabutylammonium chloride, tetrabutylammonium bromide, tetraethylammonium bromide, trioctylmethylammonium chloride, and tributylbenzylammonium chloride.

[a26] The polymerization catalyst for a polythiourethane optical material as set forth in any one of [a18] to [a25], wherein the sulfonic acid represented by the general formula (2) is alkylsulfonic acid having 1 to 16 carbon atoms, benzenesulfonic acid, toluenesulfonic acid, or dodecylbenzenesulfonic acid.

[a27] The polymerization catalyst for a polythiourethane optical material as set forth in [a26], wherein the sulfonic acid represented by the general formula (2) is methanesulfonic acid, toluenesulfonic acid, or dodecylbenzenesulfonic acid.

[a28] The polymerization catalyst for a polythiourethane optical material as set forth in any one of [a18] to [a27], wherein the molar ratio of the compound of the general formula (1) to the zinc compound is 0.01 to 100, and the molar ratio of the compound of the general formula (2) to the compound of the general formula (1) is 0.01 to 100.

[b1] A polymerizable composition for a polythiourethane optical material, including:

one or two or more kinds of zinc compound selected from the group consisting of zinc dithiocarbamates, zinc sulfonates, zinc salts of mono- or di-alkyl phosphoric acid esters, bis(substituted acetylacetonato) zinc, and zinc halides, a compound represented by the following general formula (1):

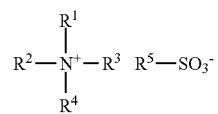
(1)

(wherein $R^1$, $R^2$, $R^3$, and $R^4$ each independently represent hydrogen, or linear-chained aliphatic residue, cyclic aliphatic residue, or aromatic organic residue which is a monovalent or higher valent. $R^1$, $R^2$, $R^3$ and $R^4$ may be bonded to each other to form a ring. $R^5$ represents a hydrogen atom, an alkyl group having 1 to 16 carbon atoms, or an aromatic hydrocarbon group which may have a substituent), one or two or more kinds selected from the group consisting of an isocyanate compound and an isothiocyanate compound, and one or two or more kinds of active hydrogen compounds each having a mercapto group.

[b2] The polymerizable composition for a polythiourethane optical material as set forth in [b1]; wherein the zinc compound is zinc chloride.

[b3] The polymerizable composition for a polythiourethane optical material as set forth in [b1] or [b2], wherein $R^1$, $R^2$, $R^3$, and $R^4$ in the general formula (1) each independently represent an alkyl group having 1 to 8 carbon atoms or a benzyl group, and $R^5$ represents an alkyl group having 1 to 3 carbon atoms.

[b4] The polymerizable composition for a polythiourethane optical material as set forth in [b3], wherein the compound of the general formula (1) is one or two or more kinds selected from the group consisting of tetramethylammonium sulfonates, tetraethylammonium sulfonates, tetrapropylammonium sulfonates, tetrabutylammonium sulfonates, trioctylmethylammonium sulfonates, and tributylbenzylammonium sulfonates.

[b5] The polymerizable composition for a polythiourethane optical material as set forth in [b4], wherein the compound of the general formula (1) is tetrabutylammonium methane sulfonate.

[b6] The polymerizable composition for a polythiourethane optical material as set forth in any one of [b1] to [b5], wherein the molar ratio of the compound of the general formula (1) to the zinc compound is 0.1 to 1000.

[b7] The polymerizable composition for a polythiourethane optical material as set forth in any one of [b1] to [b6], wherein the isocyanate is an isocyanate compound.

[b8] The polymerizable composition for a polythiourethane optical material as set forth in [b7], wherein the isocyanate compound is m-xylylene diisocyanate, 2,5-bis(isocyanatomethyl)-bicyclo[2.2.1]heptane, 2,6-bis(isocyanatomethyl)-bicyclo[2.2.1]heptane, bis(isocyanatomethyl)cyclohexane, or hexamethylene diisocyanate, and the active hydrogen compound is 4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, pentaerythritol tetrakis(3-mercaptopropionate), 1,1,3,3-tetrakis(mercaptomethylthio)propane, 1,1,2,2-tetrakis(mercaptomethylthio)ethane, 4,6-bis(mercaptomethylthio)-1,3-dithiane, or 2-(2,2-bis(mercaptodimethylthio)ethyl)-1,3-dithietane.

[b9] A polythiourethane optical material obtained by curing the polymerizable composition as set forth in any one of [b1] to [b8].

[b10] A plastic lens comprising the polythiourethane optical material as set forth in [b9].

[b11] A method for preparing a polythiourethane optical material, comprising cast-polymerizing the polymerizable composition as set forth in any one of [b1] to [b8].

[b12] The preparation method as set forth in [b11], wherein cast-polymerizing the polymerizable composition includes cast-polymerizing a polymerizable composition for a polythiourethane optical material containing a total amount 0.0005 parts by weight to 5 parts by weight of the zinc compound and the compound of the general formula (1), based on 100 parts by weight of the total amount of the isocyanate and the active hydrogen compound.

[b13] A polymerization catalyst for a polythiourethane optical material including:
one or two or more kinds of zinc compound selected from the group consisting of zinc dithiocarbamates, zinc sulfonates, zinc salts of mono- or di-alkyl phosphoric acid esters, bis(substituted acetylacetonato) zinc, and zinc halides, and a compound represented by the following general formula (1):

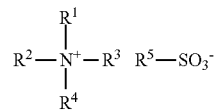

(1)

(wherein $R^1$, $R^2$, $R^3$, and $R^4$ each independently represent hydrogen, or linear-chained aliphatic residue, cyclic aliphatic residue, or aromatic organic residue which is a monovalent or higher valent. $R^1$, $R^2$, $R^3$, and $R^4$ may be bonded to each other to form a ring. $R^5$ represents a hydrogen atom, an alkyl group having 1 to 16 carbon atoms, or an aromatic hydrocarbon group which may have a substituent).

[b14] The polymerization catalyst for a polythiourethane optical material as set forth in [b13], wherein the zinc compound is zinc chloride.

[b15] The polymerization catalyst for a polythiourethane optical material as set forth in [b13] or [b14], wherein $R^1$, $R^2$, $R^3$, and $R^4$ in the general formula (1) each independently represent an alkyl group having 1 to 8 carbon atoms or a benzyl group, and $R^5$ represents an alkyl group having 1 to 3 carbon atoms.

[b16] The polymerization catalyst for a polythiourethane optical material as set forth in [b15], wherein the compound of the general formula (1) is one or two or more kinds selected from the group consisting of tetramethylammonium sulfonates, tetraethylammonium sulfonates, tetrapropylammonium sulfonates, tetrabutylammonium sulfonates, trioctylmethylammonium sulfonates, and tributylbenzylammonium sulfonates.

[b17] The polymerization catalyst for a polythiourethane optical material as set forth in [b16], wherein the compound of the general formula (1) is tetrabutylammonium methane sulfonate.

The invention claimed is:
1. A polymerizable composition for a polythiourethane optical material, comprising:
(A) a polymerization catalyst for a polythiourethane optical material,
(B) at least one compound selected from m-xylylene diisocyanate, 2,5-bis(isocyanatomethyl)-bicyclo[2.2.1]heptane, 2,6-bis(isocyanatomethyl)-bicyclo[2.2.1]heptane, 1,3-bis(isocyanatomethyl)cyclohexane, 1,4-bis(isocyanatomethyl)cyclohexane, and hexamethylene diisocyanate, and
(C) at least one compound selected from 4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, pentaerythritol tetrakis(3-mercaptopropionate), 1,1,3,3-tetrakis(mercaptomethylthio)propane, 1,1,2,2-tetrakis(mercaptomethylthio)ethane, 4,6-bis(mercaptomethylthio)-1,3-dithiane, and 2-(2,2-bis(mercaptodimethylthio)ethyl)-1,3-dithietane,
wherein said polymerization catalyst for a polythiourethane optical material (A) comprises
(a1) one or two or more kinds of zinc compound selected from the group consisting of zinc dithiocarbamates, zinc sulfonates, zinc salts of mono- or di-alkyl phosphoric acid esters, bis(substituted acetylacetonato) zinc, and zinc halides, (a2) a compound represented by the following general formula (1), and (a3) a sulfonic acid represented by the following general formula (2):

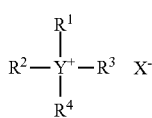

wherein $R^1$, $R^2$, $R^3$, and $R^4$ each independently represent hydrogen, or linear-chained aliphatic residue, cyclic aliphatic residue, or aromatic organic residue which is monovalent or higher valent, $R^1$, $R^2$, $R^3$, and $R^4$ may be bonded to each other to form a ring, X represents a halogen atom and Y represents a nitrogen or phosphorous atom, $$R^5\text{-}(SO_3H)_n \quad (2)$$

wherein n represents an integer of 1 or 2, and $R^5$ represents linear-chained aliphatic residue, branched aliphatic residue, cyclic aliphatic residue, or aromatic organic residue, which is a monovalent or higher valent and which may contain a hydroxyl group or an amino group wherein the molar ratio of the compound (a2) represented by the general formula (1) to the zinc compound (a1) is in the range 0.01 to 100, and the molar ratio of the sulfonic acid (a3) represented by the general formula (1) is in the range 0.01 to 100, wherein the total amount of the zinc compound (a1), the compound (a2) represented by the general formula (1), and the sulfonic acid (a3) represented by the general formula (2) is in the range of 0.0005 parts by weight to 5 parts by weight, based on 100 parts by weight of the total amount of the compound (B) and the compound (C).

2. The polymerizable composition for a polythiourethane optical material as set forth in claim 1,
wherein said zinc dithiocarbamate is represented by the following general formula (3):

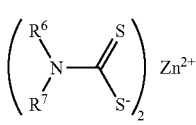

wherein $R^6$ and $R^7$ represent an alkyl group having 1 to 10 carbon atoms, a phenylalkyl group having 7 to 10 carbon atoms, or an aryl group having 6 to 10 carbon atoms, and may be the same as or different from each other, and $R^6$ and $R^7$ may be bonded to each other to form a ring.

3. The polymerizable composition for a polythiourethane optical material as set forth in claim 2,
wherein $R^6$ and $R^7$ in the general formula (3) each independently represent an alkyl group having 1 to 8 carbon atoms.

4. The polymerizable composition for a polythiourethane optical material as set forth in claim 1,
wherein said zinc dithiocarbamate is one or two or more kinds selected from the group consisting of zinc dimethyl dithiocarbamate, zinc diethyl dithiocarbamate, and zinc di-n-butyl dithiocarbamate.

5. The polymerizable composition for a polythiourethane optical material as set forth in claim 1,
wherein in the general formula (1),
Y is nitrogen, and
$R^1$, $R^2$, $R^3$, and $R^4$ are each independently selected from the group consisting of an alkyl group having 1 to 18 carbon atoms, a hydroxyalkyl group having 1 to 18 carbon atoms, a phenyl group, a phenylalkyl group having 7 to 18 carbon atoms, and an aminoalkyl group having 1 to 18 carbon atoms.

6. The polymerizable composition for a polythiourethane optical material as set forth in claim 5,
wherein $R^1$, $R^2$, $R^3$, and $R^4$ in the general formula (1) are each independently selected from the group consisting of an alkyl group having 1 to 8 carbon atoms and a phenylalkyl group having 7 to 10 carbon atoms.

7. The polymerizable composition for a polythiourethane optical material as set forth in claim 6,
wherein the compound (a2) represented by the general formula (1) is one or two or more kinds selected from the group consisting of a tetramethylammonium salt, a tetraethylammonium salt, a tetrapropylammonium salt, a tetrabutylammonium salt, a trioctylmethylammonium salt, and a tributylbenzylammonium salt.

8. The polymerizable composition for a polythiourethane optical material as set forth in claim 7,
wherein the compound (a2) represented by the general formula (1) is one or two or more kinds selected from the group consisting of tetrabutylammonium chloride, tetrabutylammonium bromide, tetraethylammonium bromide, trioctylmethylammonium chloride, and tributylbenzylammonium chloride.

9. The polymerizable composition for a polythiourethane optical material as set forth in claim 1,
wherein the sulfonic acid (a3) represented by the general formula (2) is alkylsulfonic acid having 1 to 16 carbon atoms, benzenesulfonic acid, toluenesulfonic acid, or dodecylbenzenesulfonic acid.

10. The polymerizable composition for a polythiourethane optical material as set forth in claim 9,
wherein the sulfonic acid (a3) represented by the general formula (2) is methanesulfonic acid, toluenesulfonic acid, or dodecylbenzenesulfonic acid.

11. A polythiourethane optical material obtained by curing the polymerizable composition as set forth in claim 1.

12. A plastic lens comprising the polythiourethane optical material as set forth in claim 11.

13. A method for preparing a polythiourethane optical material, comprising cast-polymerizing the polymerizable composition as set forth in claim 1.

14. The preparation method as set forth in claim 13,
wherein said cast-polymerizing said polymerizable composition comprises cast-polymerizing a polymerizable composition for a polythiourethane optical material containing 0.0005 parts by weight to 5 parts by weight of the sum of said zinc compound (a1), said compound (a2), and said sulfonic acid (a3), based on 100 parts by weight of the total amount of said compound (B) and said compound (C).

15. The preparation method as set forth in claim 13,
wherein said cast-polymerizing said polymerizable composition comprises cast-polymerizing a polymerizable composition for a polythiourethane optical material containing 0.0005 parts by weight to 5 parts by weight of the sum of said zinc compound (a1) and said compound (a4), based on 100 parts by weight of the total amount of said compound (B) and said compound (C).

* * * * *